US008174614B2

(12) United States Patent
Asamura et al.

(10) Patent No.: US 8,174,614 B2
(45) Date of Patent: May 8, 2012

(54) VIDEO SIGNAL PROCESSING APPARATUS, VIDEO SIGNAL PROCESSING METHOD, AND VIDEO SIGNAL DISPLAY APPARATUS

(75) Inventors: Masako Asamura, Tokyo (JP); Koji Minami, Tokyo (JP); Chihiro Sakuwa, Tokyo (JP); Toshihiro Gai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1242 days.

(21) Appl. No.: 11/884,211

(22) PCT Filed: Nov. 21, 2005

(86) PCT No.: PCT/JP2005/021330
§ 371 (c)(1),
(2), (4) Date: Aug. 13, 2007

(87) PCT Pub. No.: WO2006/095470
PCT Pub. Date: Sep. 14, 2006

(65) Prior Publication Data
US 2008/0151103 A1 Jun. 26, 2008

(30) Foreign Application Priority Data
Mar. 8, 2005 (JP) ................................. 2005-063555

(51) Int. Cl.
*H04N 7/01* (2006.01)
*H04N 9/64* (2006.01)

(52) U.S. Cl. ........ 348/448; 348/441; 348/451; 348/452; 348/453; 348/700

(58) Field of Classification Search .................. None
See application file for complete search history.

(56) References Cited

U.S. PATENT DOCUMENTS

| 6,965,414 | B2 | 11/2005 | Haraguchi | |
|---|---|---|---|---|
| 7,075,581 | B1 * | 7/2006 | Ozgen et al. | 348/448 |
| 7,375,760 | B2 * | 5/2008 | Kempf et al. | 348/441 |
| 7,405,766 | B1 * | 7/2008 | Chou et al. | 348/448 |
| 2003/0189667 | A1 * | 10/2003 | Chow | 348/441 |
| 2004/0008275 | A1 * | 1/2004 | Yang et al. | 348/441 |
| 2005/0018087 | A1 * | 1/2005 | Lee | 348/700 |

FOREIGN PATENT DOCUMENTS

JP          10-108218 A    4/1998
(Continued)

*Primary Examiner* — Jefferey Harold
*Assistant Examiner* — Sean Haiem
(74) *Attorney, Agent, or Firm* — Birch, Stewart. Kolasch & Birch, LLP

(57) ABSTRACT

A video signal processing apparatus, which can prevent degradation of picture quality in converting an interlaced scan video signal to a progressive scan video signal, includes an interframe correlation detection means (11); an interfield correlation detection means (12); a field resolution determination means (13) which generates a signal (filhv) indicative of a degree of high frequency components existing in a field; a pull-down sequence detection means (14) which generates a telecine detection signal (tci) indicating whether or not an input video signal is any of 2-3 pull-down telecine video signal and 2-2 pull-down telecine video signal and also generates a mixing ratio signal (tcmix) indicative of a mixing ratio used at the time of interpolation processing; an interpolation signal generation means (110) which mixes a plurality of kinds of interpolation signals (Im, It) in accordance with the telecine detection signal (tci) and the mixing ratio signal (tcmix); and a rate doubling conversion means (9) which generates the progressive scan video signal (Prog) from a delayed video signal (R) and an interpolation signal (I).

16 Claims, 30 Drawing Sheets

FOREIGN PATENT DOCUMENTS

| | | |
|---|---|---|
| JP | 10-112845 A | 4/1998 |
| JP | 2001-169252 A | 6/2001 |
| JP | 3389984 B2 | 1/2003 |
| JP | 2003-78926 A | 3/2003 |
| JP | 2004-96223 A | 3/2004 |
| JP | 2004-180242 A | 6/2004 |
| JP | 2004-242196 A | 8/2004 |
| JP | 2004-297476 A | 10/2004 |

* cited by examiner

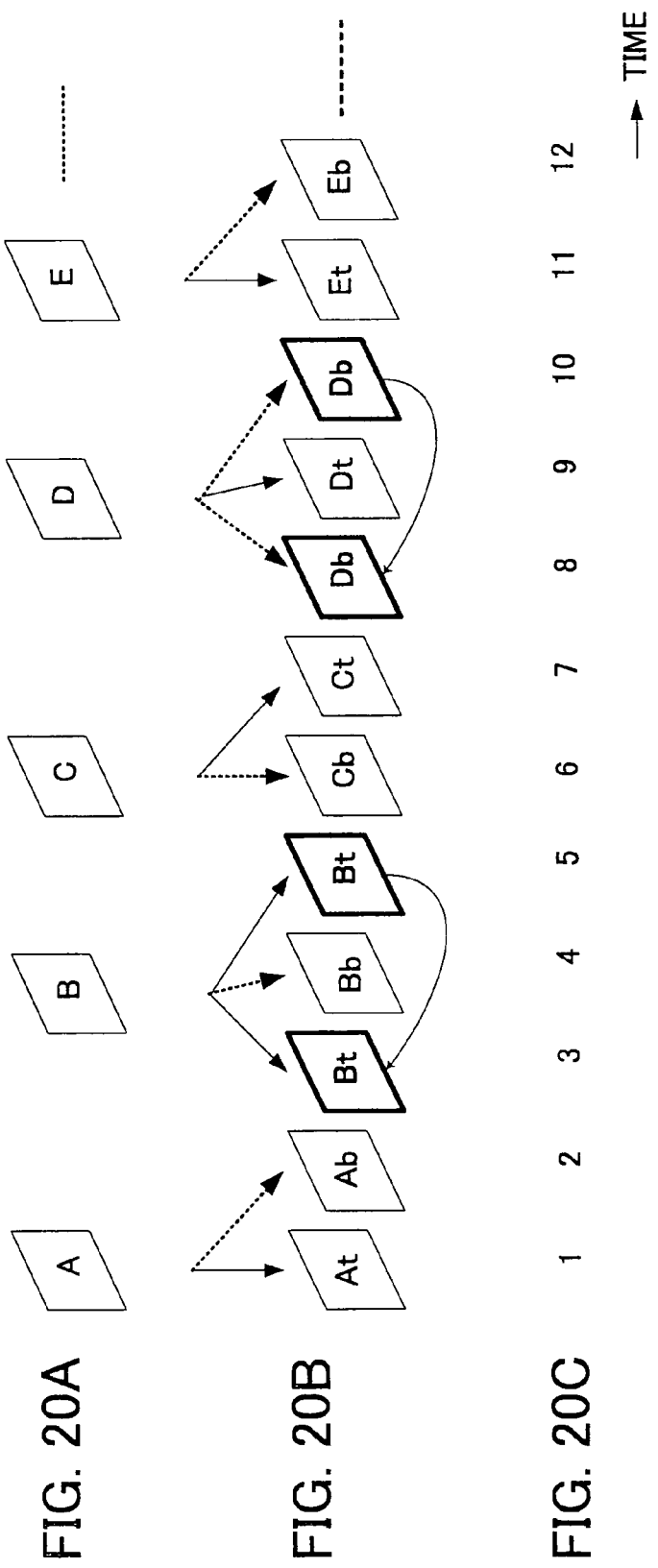

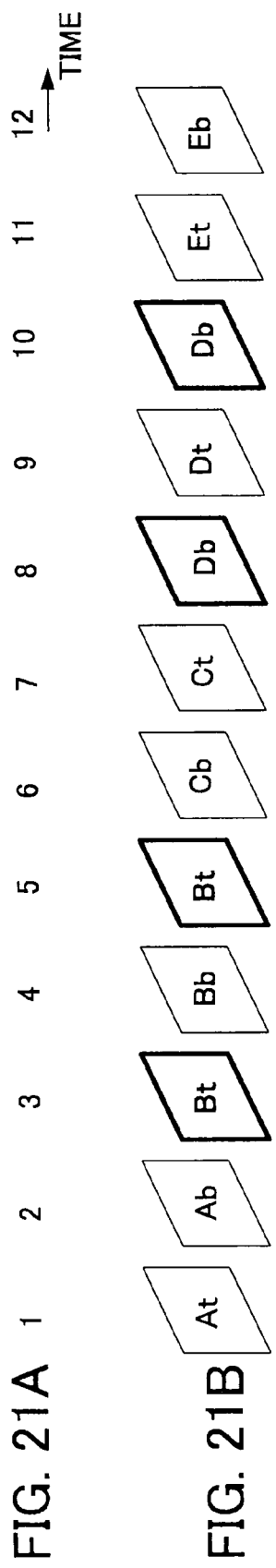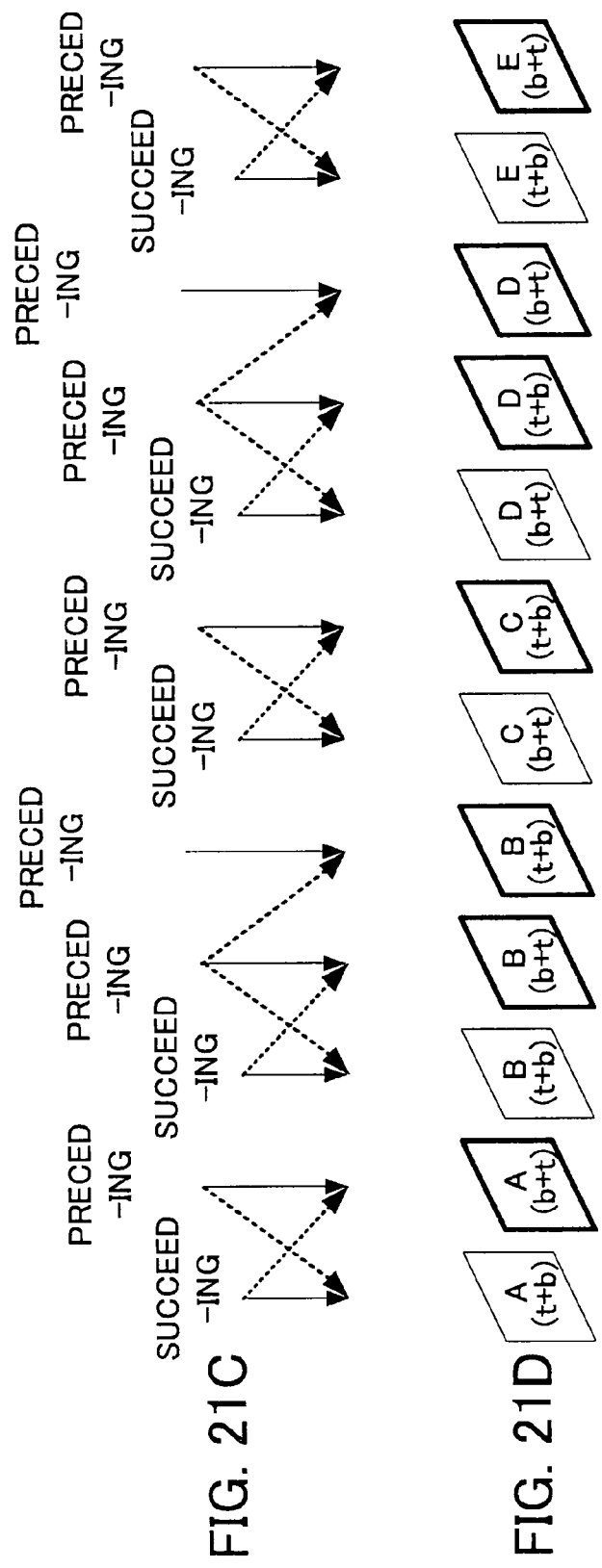

VIDEO SIGNAL PROCESSING APPARATUS, VIDEO SIGNAL PROCESSING METHOD, AND VIDEO SIGNAL DISPLAY APPARATUS

TECHNICAL FIELD

The present invention relates to a video signal processing apparatus and a video signal processing method for converting an interlaced scan video signal (i.e., interlaced video signal) to a progressive scan video signal (i.e., progressive video signal), and to a video signal display apparatus to which the video signal processing apparatus or the video signal processing method is applied. More particularly, the present invention relates to a video signal processing apparatus, a video signal processing method, and a video signal display apparatus for detecting whether or not an input signal is an interlaced scan video signal converted from a signal generated by a movie or cinema film, computer graphics, or the like using a 2-3 pull-down method or a 2-2 pull-down method and for converting an interlaced scan video signal to a progressive scan video signal.

BACKGROUND ART

There are various types of standard television signals such as an NTSC signal, a high definition television signal, and a PAL signal, which are interlaced scan video signals (i.e., interlaced video signals). A television signal such as an NTSC signal or a high definition television signal is an interlaced signal of 60 fields (i.e., 30 frames) per second, whereas a television signal such as a PAL signal is an interlaced signal of 50 fields (i.e., 25 frames) per second. Accordingly, when signals generated from a cinema film, computer graphics, or the like are converted to a television broadcast format to broadcast a program or are converted to a video package format, it is required to convert the signals having frame frequencies to the interlaced signals for television broadcast of 60 fields or 50 fields per second. This conversion is referred to as "telecine conversion".

A cinema film is photographed in the form of 24 frames per second. When telecine conversion from a cinema film signal to an interlaced signal of 60 fields per second is performed, it is necessary to perform 2-3 pull-down conversion, in which the first frame (or an odd-numbered frame) is converted to two fields and the second frame (or an even-numbered frame) is converted to three fields, and the same field as the field previous by two fields is repeated once every five fields. Through the 2-3 pull-down conversion, a video signal of 24 frames per second can be converted to an interlaced signal of 60 fields per second. This interlaced signal is a video signal subjected to 2-3 pull-down telecine conversion, which is referred to as a "2-3 pull-down signal". In the telecine conversion, 3-2 pull-down conversion may be performed in some cases so that the first frame is converted to three fields and the second frame is converted to two fields. However, processing of the 3-2 pull-down conversion is substantially the same as processing of the 2-3 pull-down conversion. Thus, in the present application, explanation in connection with 2-3 pull-down conversion includes not only a case of the 2-3 pull-down telecine conversion but also a case of the 3-2 pull-down telecine conversion.

Further, when a telecine conversion from a signal of a cinema film to an interlaced signal of 50 fields per second is performed, 2-2 pull-down conversion is carried out so that 25 frame video signals are generated by allocating a one-frame video signal of a cinema film to one frame of an interlaced signal and displaying twice only one frame of the cinema film, once per second, and each frame is composed of two fields. As a result, a video signal of 24 frames per second can be converted to an interlaced signal of 50 fields per second.

Furthermore, with respect to a video signal such as an animation signal created by computer graphics or a promotion video signal, a 2-2 pull-down conversion is carried out so that an original video signal of 30 frames-per second is created, one frame of the created original video signal is allocated to one frame and each frame is composed of two fields. Through the 2-2 pull-down conversion, a video signal of 30 frames per second can be converted to an interlaced signal of 60 fields per second. The interlaced signal of 50 fields per second converted from the video signal of 24 frames per second and the interlaced signal of 60 fields per second converted from the video signal of 30 frames per second, are video signals subjected to 2-2 pull-down telecine conversion. Thus, each of these interlaced signals is referred to as a "2-2 pull-down signal".

In these years, when an interlaced television signal is displayed with a high picture quality, the interlaced signal is converted to a progressive scan signal (progressive signal). This conversion is referred to as "I/P conversion". In I/P conversion, motion adaptive I/P conversion is generally known. In motion adaptive I/P conversion, interpolation (interfield interpolation) is performed by adding picture elements of the corresponding scan line of time-adjacent fields when a video picture is a still picture, and that interpolation (intrafield interpolation) called "motion adaptive I/P conversion" is performed by generating an interpolation signal with use of picture elements of adjacent scan lines in the same field when a video picture is a motion picture. Moreover, in I/P conversion, whether or not a video signal to be processed is a video signal subjected to telecine conversion, which is a 2-3 pull-down signal or a 2-2 pull-down signal and is referred to as a "telecine video signal", is detected, and a phase (a direction of each of fields converted from the same frame) of the pull-down signal is detected. This detection processing is referred to as "telecine detection". The telecine video signal is restored to a progressive signal before the telecine-conversion with use of a top field and a bottom field converted from the same frame in accordance with the detected phase of the pull-down signal, and then converted to a progressive scan video signal. Further, I/P conversion of a telecine video signal is referred to as "telecine interpolation".

In a conventional video signal processing apparatus which detects a telecine video signal and performs I/P conversion of the telecine video signal, there is proposed an apparatus which detects a difference between a field and another field earlier by one frame (i.e., earlier by two fields) and another difference between a field and another field earlier by one field (i.e., an adjacent field), and determines a sequence of a 2-3 pull-down signal or a sequence of a 2-2 pull-down signal in accordance with a repetitive period of each field included in a result of detection of the differences, thereby performing the telecine interpolation processing (e.g., see Patent Document 1).

In the case of the 2-3 pull-down signal, the same field as the field earlier by two fields is repeatedly converted once every five fields. Therefore, a still picture field, in which difference information between a field and another field earlier by one frame becomes zero or not larger than a predetermined value, is present once every five fields. Thus, when the apparatus determines a sequence of the 2-3 pull-down signal, the apparatus performs telecine detection by utilizing such a characteristic that a difference between two fields at an interval of one frame has a repetitive period of five fields.

In the case of the 2-2 pull-down signal, one frame is converted to two fields, and a difference between adjacent fields becomes zero or not larger than a predetermined value once every two fields. Thus, when the apparatus determines a sequence of the 2-2 pull-down signal, the apparatus performs telecine detection by utilizing such a characteristic that a difference between fields has a repetitive period of two fields.

Further, there is proposed an apparatus which detects a difference between adjacent fields to perform telecine detection and which determines a sequence using a difference between a field signal and an intrafield interpolation signal to prevent erroneous detection in the telecine detection, thereby performing I/P conversion (e.g., see Patent Document 2).

Furthermore, there is proposed an apparatus which generates a matching signal indicative of the matching in accordance with an intrafield interpolation signal of the current field and a difference between fields before and after the current field and mixes signals of the fields before and after the current field using the matching signal, thereby performing telecine interpolation processing (e.g., see Patent Document 3).

Patent Document 1 is Japanese Patent Application Kokai (Laid-Open) Publication No. 2003-78926 (FIG. 1 to FIG. 4), Patent Document 2 is Japanese Patent Application Kokai (Laid-Open) Publication No. 2004-96223 (FIG. 2), and Patent Document 3 is Japanese Patent Publication No. 3389984 (FIG. 1).

DISCLOSURE OF THE INVENTION

Problem to be Solved by the Invention

When telecine detection is carried out using a difference between adjacent fields, the detection is carried out depending on whether or not an odd-numbered field and an even-numbered field in one frame basically form the same video picture. However, since the video signal is an interlaced signal, vertical-direction line positions of picture elements in adjacent two fields are shifted by a half line distance, so that the picture elements in adjacent two fields are not at the same position, and even when the picture elements in adjacent two fields are compared in a signal level, they have not always the same level.

Therefore, when the above-described conventional apparatus performs telecine detection using the difference between adjacent fields, there is some possibility to detect a sequence erroneously, because detection accuracy of the difference information is not perfect. Further, when many edit points exists in the course of a telecine video signal or when a signal other than the telecine video signal is mixedly included in the telecine video signal due to editing for TV broadcast or the like or due to insertion of a CM (commercial) or a telop (television opaque projector), the apparatus may not detect a discontinuity in the sequence due to the fact that the 2-3 or 2-2 pull-down field sequence (phase) is shifted or missing in the telecine detection. For this reason, the apparatus has a problem that the apparatus performs I/P conversion using a signal of a field positioned in a wrong direction side as an interpolation signal, resulting in the degradation of picture quality caused by a so-called combing phenomenon that an output picture is displayed in the form of a comb and in a failure of good I/P conversion.

Therefore, the present invention has been made in order to solve the above-mentioned problems. It is an object of the present invention to provide a video signal processing apparatus, a video signal processing method, and a video signal display apparatus, which can eliminate an erroneous sequence detection and avoid degradation of picture quality caused by a combing phenomenon when converting an interlaced scan video signal subjected to 2-3 or 2-2 pull-down conversion to a progressive scan video signal.

Means of Solution of the Problems

According to the present invention, a video signal processing apparatus for converting an interlaced scan video signal to a progressive scan video signal, includes: a field delay means which delays the interlaced scan video signal by a period of one or several fields; an interframe correlation detection means which detects an interframe correlation between a target field of the interlaced scan video signal and a field prior to the target field by one frame, thereby outputting a signal indicative of strength of the interframe correlation between the fields in accordance with a result of the detecting of the interframe correlation; an interfield correlation detection means which detects an interfield correlation between a target field of the interlaced scan video signal and a field prior to the target field by one field, thereby outputting a signal indicative of strength of the interfield correlation between the fields in accordance with a result of the detecting of the interfield correlation; a field resolution determination means which detects high frequency components in the target field of the interlaced scan video signal, thereby outputting a signal indicative of a degree of the high frequency components existing in the target field in accordance with a result of the detecting of the high frequency components; a pull-down sequence detection means which detects whether or not the interlaced scan video signal satisfies a field sequence condition of a video signal subjected to telecine conversion in accordance with the signal indicative of the strength of the interframe correlation and the signal indicative of the strength of the interfield correlation, thereby generating a telecine detection signal in accordance with a result of the detecting of the pull-down sequence detection means to output the telecine detection signal, and thereby generating a mixing ratio signal indicative of a mixing ratio of signals for interpolation in accordance with a result of the detecting of the pull-down sequence detection means and the degree of the high frequency components existing in the target field to output the mixing ratio signal; an interpolation signal generation means which generates a plurality of kinds of signals in accordance with the interlaced scan video signal and an interlaced scan video signal delayed by the field delay means, and mixes the plurality of kinds of signals in accordance with the telecine detection signal and the mixing ratio signal, thereby generating an interpolation signal to output the interpolation signal; and a conversion means which generates the progressive scan video signal in accordance with the interlaced scan video signal and the interpolation signal outputted from the interpolation signal generation means.

Further, according to the present invention, a video signal processing method of converting an interlaced scan video signal to a progressive scan video signal, includes the steps of: delaying the interlaced scan video signal by a period of one or several fields; detecting an interframe correlation between a target field of the interlaced scan video signal and a field prior to the target field by one frame, thereby outputting a signal indicative of strength of the interframe correlation between the fields in accordance with a result of the detecting of the interframe correlation; detecting an interfield correlation between a target field of the interlaced scan video signal and a field prior to the target field by one field, thereby outputting a signal indicative of strength of the interfield correlation between the fields in accordance with a result of the detecting of the interfield correlation; detecting high frequency components in the target field of the interlaced scan video signal, thereby outputting a signal indicative of a degree of the high frequency components existing in the target field in accordance with a result of the detecting of the high frequency components; detecting whether or not the interlaced scan video signal satisfies a field sequence condition of a video signal subjected to telecine conversion in accordance with the signal indicative of the strength of the interframe correlation and the signal indicative of the strength of the interfield correlation, thereby generating a telecine detection signal in accordance with a result of the detecting to output the telecine detection signal, and thereby generating a mixing ratio signal indicative of a mixing ratio of signals for interpolation in accordance with a result of the detecting and the degree of the high frequency components existing in the target field to output the mixing ratio signal; generating a plurality of kinds of signals in accordance with the interlaced scan video signal and the interlaced scan video signal delayed by the field delay means, and mixing the plurality of kinds of signals in accordance with the telecine detection signal and the mixing ratio signal, thereby generating an interpolation signal to output the interpolation signal; and generating the progressive scan video signal in accordance with the interlaced scan video signal and the interpolation signal generated by the mixing step.

Furthermore, a video signal display apparatus of the present invention includes the above-mentioned video signal processing apparatus, a display means which displays an image, and a display processing means which causes the display means to display the image based on the progressive scan video signal outputted from the video signal processing apparatus.

Effects of the Invention

In the video signal processing apparatus and the video signal processing method of the present invention, it is detected in accordance with interframe difference information and interfield difference information whether or not the sequentially inputted interlaced scan video signal satisfies a repetitive sequence condition of a 2-3 or 2-2 pull-down signal, and the sequence is monitored throughout a relatively long period (a field) by measuring an occurrence frequency of each sequence to output a telecine detection signal based on a predictive control flag which is an index indicative of a certainty of being a telecine video signal. In addition, a mixing ratio signal indicative of a mixing ratio of signals for interpolation (a telecine interpolation signal and a motion adaptive interpolation signal) is generated by determining a degree of high frequency components existing in each field, the telecine interpolation signal and a motion adaptive interpolation signal based on motion adaptive interpolation are mixed in accordance with the generated mixing ratio signal to generate a telecine interpolation signal, and the generated telecine interpolation signal is outputted. Thus the reliability of the telecine detection signal is increased, interpolation scan line signals selected in accordance with the telecine detection signal can be suitably selected, and the interpolation signal is mixed in accordance with the mixing ratio signal. As a result, the present invention can advantageously avoid erroneous detection of the sequences of 2-3 pull-down signal and 2-2 pull-down signal, reduce a generation frequency of picture quality degradation caused by a combing phenomenon generated when erroneously detecting the sequences, and convert a video signal subjected to telecine conversion to a good progressive scan video signal.

Further, the video signal display apparatus of the present invention has an advantage of being able to display a picture of high quality based on a good progressive scan video signal and to reduce occurrence of degradation of the picture quality due to combing phenomenon.

BRIEF DESCRIPTION OF THE DRAWINGS

FIGS. 20A to 20C are diagrams showing an example of 2-3 pull-down telecine conversion, wherein FIG. 20A shows a film image of 24 frames per second, FIG. 20B shows a 2-3 pull-down signal of 60 fields per second, and FIG. 20C shows field numbers;

FIGS. 21A to 21D are explanatory diagrams showing a relationship between telecine interpolation and an interpolation phase flag 'tcf' when a 2-3 pull-down signal is detected and subjected to I/P conversion, wherein FIG. 21A shows field numbers, FIG. 21B shows an inputted interlaced scan video signal which is a 2-3 pull-down signal, FIG. 21C shows the interpolation phases, and FIG. 21D shows an outputted progressive scan video signal;

FIGS. 24A to 24J are explanatory diagrams showing operation of the 2-3 field sequence detection means of the 2-3 sequence detection means in the video signal processing apparatus according to the first embodiment, wherein FIG. 24A shows field numbers, FIG. 24B shows an interlaced scan video signal which is a 2-3 pull-down signal, FIG. 24C shows a result of the detection of the frame still picture 'stl1', FIG. 24D shows a count value of the successive frame motion pictures 'frcnt', FIG. 24E shows a result of the detection of the field still picture 'filstl', FIG. 24F shows a count value of the successive field motion pictures 'filcnt', FIG. 24G shows a count value 'seq' which is an output of a sequence phase counter, FIG. 24H shows a result of the detection of the 2-3 sequence condition 'detfl', FIG. 24I shows an output of a telecine startup counter 'oncnt', and FIG. 24J shows a 2-3 sequence detection signal 'tci0';

FIGS. 25A to 25C are diagrams showing an example of telecine conversion using a 2-2 pull-down method, wherein FIG. 25A shows a video signal of 30 frames per second, FIG. 25B shows a 2-2 pull-down signal of 60 fields per second, and FIG. 25C shows field numbers;

FIGS. 26A to 26D are explanatory diagrams showing a relationship between the telecine interpolation and the interpolation phase flag when a 2-2 pull-down signal is detected and subjected to I/P conversion, wherein FIG. 26A shows field numbers, FIG. 26B shows an interlaced scan video signal which is a 2-2 pull-down signal, FIG. 26C shows the interpolation phases, and FIG. 26D shows a progressive scan video signal;

FIGS. 29A to 29J are explanatory diagrams showing processes of the 2-2 field sequence detection means of the 2-2 sequence detection means in the video signal processing apparatus according to the first embodiment, wherein FIG. 29A shows field numbers, FIG. 29B shows an interlaced scan video signal which is a 2-2 pull-down signal, FIG. 29C shows a result of the detection of the frame still picture 'frstl', FIG. 29D shows a result of the same-frame determination 'frdiff', FIG. 29E shows a result of the detection of the field still picture 'filstl2', FIG. 29F shows a count value of the successive field motion pictures 'filcnt2', FIG. 29G shows a count value of the 2-2 sequence phase 'seq2', FIG. 29H shows a result of the detection of the 2-2 sequence condition 'detfl2', FIG. 29I shows an output of a sequence-start-counter 'oncnt2', and FIG. 29J shows a 2-2 sequence detection signal 'tci1'.

Figure 1:
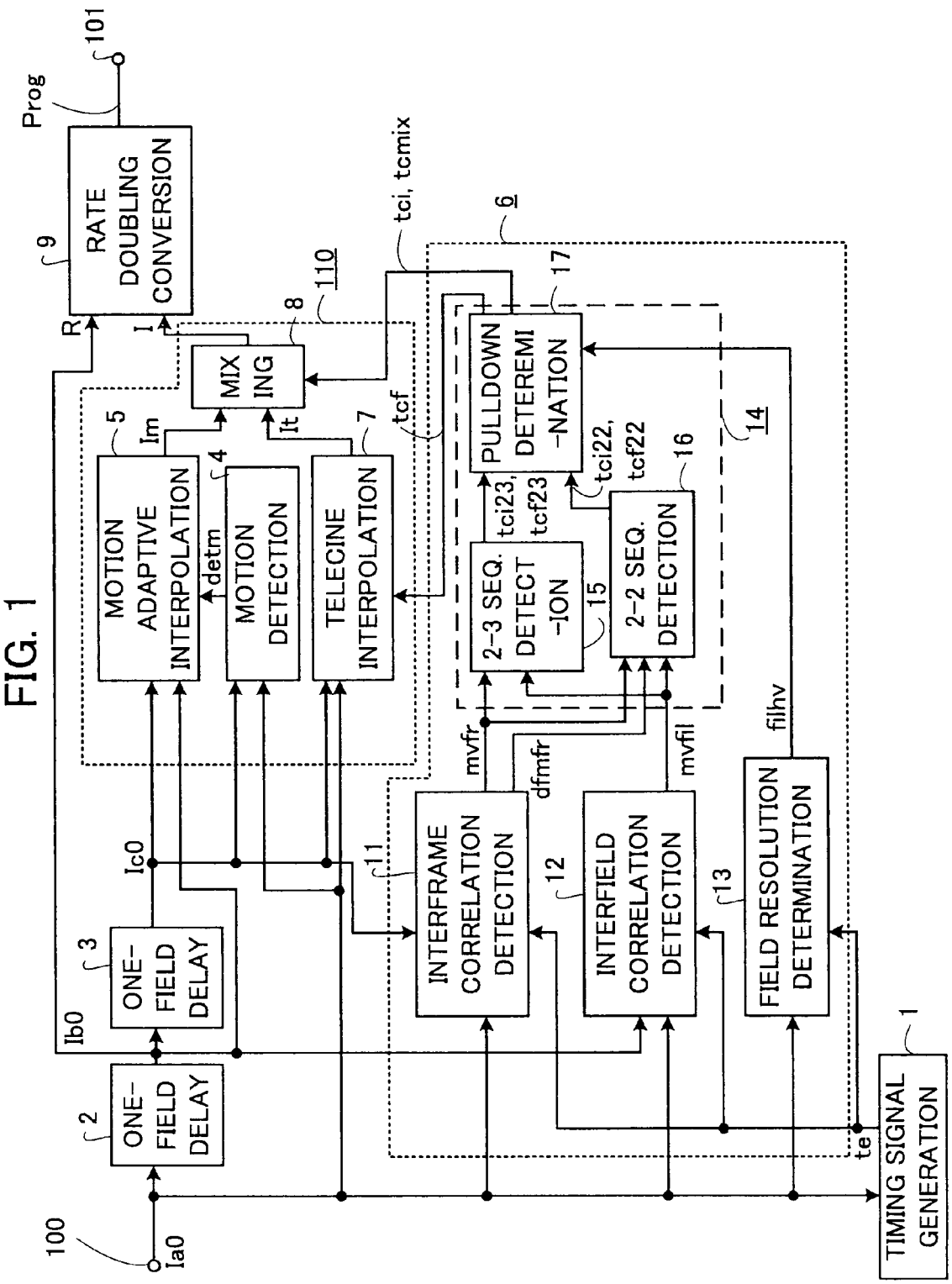
FIG. 1 is a block diagram showing an exemplary configuration of a video signal processing apparatus according to the first embodiment of the present invention.

DESCRIPTION OF REFERENCE NUMERALS AND SYMBOLS 1 timing signal generation means; 2 and 3 one-field delay means; 110 interpolation signal generation means; 4 motion detection means; 5 motion adaptive interpolation processing means; 6 telecine detection means; 7 telecine interpolation processing means; 8 mixing means; 9 rate doubling conversion means; 11 interframe correlation detection means; 12 interfield correlation detection means; 13 field resolution determination means; 14 pull-down sequence detection means; 15 2-3 sequence detection means; 16 2-2 sequence detection means; 17 pull-down determination means; 21 difference detection means; 22 comparison means; 23 in-predetermined-area accumulation counter; 24 delay means; 25 absolute-value-of-difference calculation means; 31 1H delay means; 32$a$ and 32$b$ difference detection means; 33 selection means; 34 vertical difference detection means; 35 vertical edge determination means; 36 and 36$b$ comparison means; 37 and 37$b$ in-predetermined-area accumulation counter; 41 1H delay means; 42 horizontal high-frequency-component extraction means; 43 vertical high-frequency-component extraction means; 44 maximum value selection means; 45 comparison means; 46 in-predetermined-area accumulation counter; 51 2-3 field sequence detection means; 52 occurrence frequency detection means; 53 2-3 predictive control means; 54 selection means; 121$a$, 121$b$ and 121$c$ still picture detection means; 122 field-still-picture detection means; 123 and 124 motion picture field counter; 125 sequence condition detection means; 126 sequence determination means; 127 sequence phase detection means; 128 reset detection means; 131 telecine startup counter; 132 sequence-detection-signal generation means; 133 sequence phase counter; 134 interpolation-phase-flag generation means; 135 successive frame motion-picture detection means; 136 successive field motion-picture detection means; 137 successive still-picture detection means; 138 comparison means; 139 sequence shift detection means; 140 in-sequence still-picture counter; 141 comparison means; 142 phase determination means; 143 scene change detection means; 144 reset signal generation means; 151 sequence-determination number-of-times detection means; 152 predictive-control-flag generation means; 153 occurrence frequency counter; 154 count value adjustment means; 61 2-2 field sequence detection means; 62 occurrence frequency detection means; 63 2-2 predictive control means; 64 selection means; 161 still picture detection means; 162 same-frame determination means; 163 field-still-picture detection means; 164 motion picture field counter; 165 sequence condition detection means; 166 sequence phase detection means; 167 sequence determination means; 168 reset detection means; 171 sequence phase generation means; 172 interpolation-phase-flag generation means; 173 sequence startup counter; 174 sequence-detection-signal generation means; 175 successive motion-picture detection means; 176 phase determination means; 177 comparison means; 178 scene change detection means; 179 reset signal generation means; 181 sequence-determination number-of-times detection means; 182 predictive-control-flag generation means; 183 occurrence frequency counter; 184 comparison means; 185 count value adjustment means; 191 telecine determination means; 192 phase flag selection means; 193 interpolation-mixing-ratio conversion means; 194 mixing ratio switch means; 195 nonlinear conversion means; 196 clip means; 100, 200 input terminal; 101 output terminal; 201 input signal processing means; 202 display processing means; 203 display means; 'Ia0' current field signal (interlaced scan video signal or input video signal); 'Ib0' and 'R' one-field delayed signal; 'Ic0' delayed signal; 'Im' interpolation signal (interpolation scan line signal); 'It' telecine interpolation signal; 'I' interpolation signal; 'Prog' progressive scan video signal; 'mvfr' interframe motion-picture-element cumulative value; 'dfmvfr' motion-picture-element cumulative difference value; 'mvfil' interfield motion-picture-element cumulative value; 'detm' motion detection signal; 'filhv' high-frequency-picture-element cumulative value; 'tci23' 2-3 sequence detection signal; 'tcf23' 2-3 sequence phase flag; 'tci22' 2-2 sequence detection signal; 'tcf22' 2-2 sequence phase flag; 'tci' telecine detection signal; 'tcf' interpolation phase flag; 'tcmix' interpolation mixing ratio signal.

BEST MODE FOR CARRYING OUT THE INVENTION

A video signal processing apparatus, a video signal processing method, and a video signal display apparatus according to the embodiments of the present invention include: an interframe correlation detection means which detects a correlation between a field and another field earlier by one frame, thereby outputting a signal indicative of strength of interframe correlation in accordance with a result of this detection; an interfield correlation detection means which detects a correlation between a field and another field earlier by one field, thereby outputting a signal indicative of strength of interfield correlation in accordance with a result of this detection; and a field resolution determination means which detects high frequency components in a field, thereby outputting a signal indicative of a degree of the high frequency components existing in this field in accordance with a result of this detection. In the apparatus and the method, the apparatus detects whether or not an input video signal satisfies a field sequence condition of a telecine converted video signal in accordance with the signal indicative of the strength of the interframe correlation and the signal indicative of the strength of the interfield correlation, generates a telecine detection signal in accordance with a result of this detection to output it, and generates a mixing ratio signal indicative of a mixing ratio of interpolation signals in accordance with the result of the detection and the signal indicative of the degree of the high frequency components existing in the field. The apparatus selects any or both of the interpolation signal based on the motion adaptive processing and the interpolation signal based on the telecine interpolation or mixes them in accordance with the telecine detection signal and the mixing ratio signal to generate an interpolation signal, thereby performing I/P conversion. In the present application, constituent elements expressed by "... means" may be implemented by an electric circuit (hardware) or may be implemented by software.

First Embodiment

FIG. 1 is a block diagram showing an exemplary configuration of a video signal processing apparatus according to the first embodiment (i.e., an apparatus which is able to perform a video signal processing method according to the first embodiment) of the present invention.

As shown in FIG. 1, the video signal processing apparatus according to the first embodiment includes an input terminal 100, to which an interlaced scan video signal 'Ia0' (also referred to as an "input video signal" or a "current field signal") is sequentially inputted; a timing signal generation means 1; a one-field delay means 2 which delays the interlaced scan video signal 'Ia0' by one field; a one-field delay means 3 which delays a one-field delayed signal 'Ib0' outputted from the one-field delay means 2 by one field; a telecine detection means 6 which detects whether or not the sequentially inputted interlaced scan video signal 'Ia0' is a telecine video signal; an interpolation signal generation means 110 which generates an interpolation signal (also referred to as an "interpolation scan line signal") by performing telecine interpolation processing in accordance with the detection signal from the telecine detection means 6; a rate doubling conversion means 9 which inserts the interpolation signal 'I' outputted from the interpolation signal generation means 110 in between scan lines of a corresponding actual scan line signal 'R', and performs rate-doubling processing of the interpolated signal to generate a progressive scan video signal 'Prog', thereby outputting the progressive scan video signal; and an output terminal 101, from which the progressive scan video signal 'Prog' is outputted.

The interpolation signal generation means 110 for generating the interpolation signal 'I', includes a motion detection means 4 which detects a motion in accordance with an interframe difference of the video signal; a motion adaptive interpolation processing means 5 which performs scan line interpolation processing depending on the motion in accordance with an output 'detm' of the motion detection means 4; a telecine interpolation processing means 7 which performs scan line interpolation processing depending on a 2-3 or 2-2 pull-down signal in accordance with a signal 'tcf' outputted from the telecine detection means 6; and a mixing means 8 which mixes a signal outputted from the motion adaptive interpolation processing means 5 and a signal outputted from the telecine interpolation processing means 7 in accordance with signals 'tci' and 'tcmix' from the telecine detection means 6.

Further, the telecine detection means 6 detects whether or not the input video signal is a telecine video signal and detects an interpolation sequence phase. The telecine detection means 6 includes an interframe correlation detection means 11 which detects an interframe correlation from information on a difference between a field and a previous field earlier by one frame; an interfield correlation detection means 12 which detects an interfield correlation from information on a difference between a field and a previous field earlier by one field; a field resolution determination means 13 which determines a degree of high frequency components existing in the current field; and a pull-down sequence detection means 14. The pull-down sequence detection means 14 of the telecine detection means 6 detects whether or not the input video signal is a telecine video signal to output a telecine detection signal 'tci', and determines a pull-down sequence to output the interpolation phase flag 'tcf' of the sequence and a mixing ratio signal 'tcmix' indicative of a mixing ratio of the interpolation signals (signals for interpolation) used in the mixing means 8 of the interpolation signal generation means 110. The pull-down sequence detection means 14 of the telecine detection means 6 includes a 2-3 sequence detection means 15 which detects a sequence of a 2-3 pull-down signal; a 2-2 sequence detection means 16 which detects a sequence of a 2-2 pull-down signal; and a pull-down determination means 17 which determines whether or not the input video signal is a telecine video signal in accordance with results of the detecting by the 2-3 sequence detection means 15 and the 2-2 sequence detection means 16.

The timing signal generation means 1 separates vertical and horizontal synchronization signals from the interlaced scan video signal 'Ia0' which are received from the input terminal 100, and generates a timing signal in accordance with the separated synchronization signals. In this embodiment, for example, the timing signal generation means 1 generates an area signal 'te' indicative of a predetermined region in one field.

The one-field delay means 2 delays the interlaced scan video signal 'Ia0' received from the input terminal 100 by one field. The one-field delay means 3 delays the one-field delayed signal 'Ib0' received from the one-field delay means 2 further by one field to output a two-field delayed signal 'Ic0'.

The current field signal 'Ia0' from the input terminal 100, the one-field delayed signal 'Ib0' from the one-field delay means 2, and the two-field delayed signal 'Ic0' from the one-field delay means 3 are inputted to the telecine detection means 6. The telecine detection means 6 detects whether or not the input video signal is a video signal which satisfies a repetition condition of a field sequence in the 2-3 or 2-2 pull-down signal in accordance with the interframe correlation (also referred to as "interframe difference information") between a field and a previous field earlier by one frame and the interfield correlation (also referred to as "interfield difference information") between a field and a previous field earlier by one field and detects an occurrence frequency of a telecine sequence in the input video signal (i.e., determines a certainty of being the telecine video signal), thereby generating the telecine detection signal 'tci' indicative of detection of the telecine video signal and the interpolation phase flag 'tcf' indicative of the sequence phase (i.e., a direction of fields converted from the same frame) in accordance with the results of the detecting to output the generated signals. The telecine detection means 6 sets a value of the telecine detection signal 'tci', for example, at a value of one (i.e., tci=1) when detecting that the input video signal 'Ia0' is a telecine video signal; whereas the telecine detection means 6 sets a value of the telecine detection signal 'tci', for example, at a value of zero (i.e., tci=0) when detecting that the input video signal 'Ia0' is not a telecine video signal. When the preceding field is the same field, the telecine detection means sets a value of the interpolation phase flag 'tcf', for example, at a value of one (i.e., tcf=1); whereas when the succeeding field is the same field, the telecine detection means sets a value of the interpolation phase flag 'tcf', for example, at a value of zero (i.e., tcf=0).

Further, the telecine detection means 6 detects high frequency components in each field of the input video signal and determines a degree of high frequency components existing in the entire field as a resolution, thereby outputting a mixing ratio signal 'tcmix' indicative of a mixing ratio of the interpolation signals in accordance with a result of the determination. When a mixing ratio of the telecine interpolation signal 'It' is 100% (i.e., when the interpolation signal 'I' is generated only from the telecine interpolation signal 'It') in the mixing means 8 of the interpolation signal generation means 110, the telecine detection means 6 sets a value of the mixing ratio signal 'tcmix', for example, at a value of one hundred (i.e., tcmix=100). When the interpolation signal 'I' is generated only from the interpolation signal 'Im' outputted from the motion adaptive interpolation processing means 5, the telecine detection means sets a value of the mixing ratio signal 'tcmix', for example, at a value of zero (i.e., tcmix=0). More specifically, when the mixing ratio is 50% (i.e., the mixing ratio is 50 to 50) for example, the telecine detection means sets a value of the mixing ratio signal 'tcmix', for example, at a value of fifty (i.e., tcmix=50), and the mixing means 8 mixes the interpolation signal 'Im' and the telecine interpolation signal 'It' in the same ratio.

The interpolation phase flag 'tcf' from the telecine detection means 6 is sent to the telecine interpolation processing means 7 of the interpolation signal generation means 110, whereas the telecine detection signal 'tci' and the mixing ratio signal 'tcmix' are sent to the mixing means 8 of the interpolation signal generation means 110. The detailed configuration of the above-mentioned telecine detection means 6 will be described later.

The interpolation signal generation means 110 receives the current field signal 'Ia0' from the input terminal 100, the one-field delayed signal 'Ib0' from the one-field delay means 2, and the two-field delayed signal 'Ic0' from the one-field delay means 3, and generates an interpolation signal 'I' in accordance with these received signals to output it. The interpolation signal generation means 110 performs processing for interpolation of the normal video signal at the motion adaptive interpolation processing means 5, and performs processing for telecine interpolation of the telecine video signal at the telecine interpolation processing means 7. The interpolation signal generation means 110 selects either of the interpolation signals or mixes the interpolation signals in accordance with the telecine detection signal 'tci' and the mixing ratio signal 'tcmix' from the telecine detection means 6, thereby generating the interpolation signal 'I' to output it to the rate doubling conversion means 9.

The motion detection means 4 of the interpolation signal generation means 110 receives the current field signal 'Ia0' and the two-field delayed signal 'Ic0' from the one-field delay means 3 and finds difference information between the signals in these two fields. The motion detection means 4 detects a motion in the video signal for one frame period in accordance with the obtained difference information, and sends a motion detection signal 'detm' indicative of the motion in the video signal to the motion adaptive interpolation processing means 5.

The motion adaptive interpolation processing means 5 of the interpolation signal generation means 110 performs motion adaptive I/P conversion on the one-field delayed signal 'Ib0' received from the one-field delay means 2 and the two-field delayed signal 'Ic0' received from the one-field delay means 3 in accordance with the motion detection signal 'detm' outputted from the motion detection means 4. The operation of generating the interpolation scan line signal is carried out over the one-field delayed signal 'Ib0'. The motion adaptive interpolation processing means 5 performs interfield interpolation processing by adding picture elements of corresponding scan lines from the two-field delayed signal 'Ic0' which is a signal of a previous field in time or performs intrafield interpolation processing using signals of picture elements positioned at vertically-up or -down points on the one-field delayed signal 'Ib0' in accordance with the motion detection signal 'detm', thereby outputting an interpolation scan line signal (i.e., interpolation signal) 'Im'.

The telecine interpolation processing means 7 of the interpolation signal generation means 110 receives the current field signal 'Ia0' and the two-field delayed signal 'Ic0' outputted from the one-field delay means 3, and selects a field signal corresponding to the conversion phase of 2-3 or 2-2 pull-down from the current field signal 'Ia0' or the two-field delayed signal 'Ic0' in accordance with the interpolation phase flag 'tcf' from the telecine detection means 6, thereby outputting the selected field signal as an interpolation signal (referred to as a "telecine interpolation signal") 'It' in the telecine video signal.

The mixing means 8 of the interpolation signal generation means 110 mixes the interpolation signal 'Im' outputted from the motion adaptive interpolation processing means 5 and the telecine interpolation signal 'It' outputted from the telecine interpolation processing means 7 in accordance with the telecine detection signal 'tci' and the mixing ratio signal 'tcmix' outputted from the telecine detection means 6, and sends the mixed signal as an interpolation signal 'I' to the rate doubling conversion means 9. The telecine detection signal 'tci' is a signal indicative of a result of the detection of whether or not the input video signal 'Ia0' is a telecine video signal. The mixing ratio signal 'tcmix' is determined in accordance with a result of the determination of a resolution indicative of a degree of high frequency components existing throughout each field of the input video signal 'Ia0', and is a signal indicative of a mixing ratio of the interpolation in the interpolation signals. When the telecine detection signal 'tci' is not a telecine video signal (i.e., when tci=0 in the first embodiment), the mixing means 8 determines that the input video signal is a normal video signal and selects the interpolation signal 'Im' outputted from the motion adaptive interpolation processing means 5 even when the mixing ratio signal 'tcmix' has a mixing ratio of any value, thereby outputting the selected signal as the interpolation signal 'I'. In other words, this case corresponds to a case where a mixing ratio of the telecine interpolation signal 'It' is 0%. On the other hand, when the telecine detection signal 'tci' is a telecine video signal (i.e., when tci=1 in the first embodiment), the mixing means 8 adaptively mixes the interpolation signal 'Im' and the telecine interpolation signal 'It' in accordance with the mixing ratio indicated by the mixing ratio signal 'tcmix', thereby outputting a mixed signal as the interpolation signal 'I'.

The rate doubling conversion means 9 receives a one-field delayed signal 'R' (i.e., 'Ib0') as the actual scan line signal of an interpolation target field, from the one-field delay means 2 and, and the interpolation signal 'I' (i.e., a mixed signal produced from the interpolation signal 'Im' and the telecine interpolation signal 'It'). The rate doubling conversion means 9 inserts the interpolation signal in between the corresponding scan lines of the actual scan line signal and performs rate doubling processing, thereby generating a progressive scan video signal 'Prog' to output it. The progressive scan video signal 'Prog' that is an output of the rate doubling conversion means 9 is outputted from an output terminal 101.

Next, a configuration of the telecine detection means 6 will be described in detail.

Figure 2:
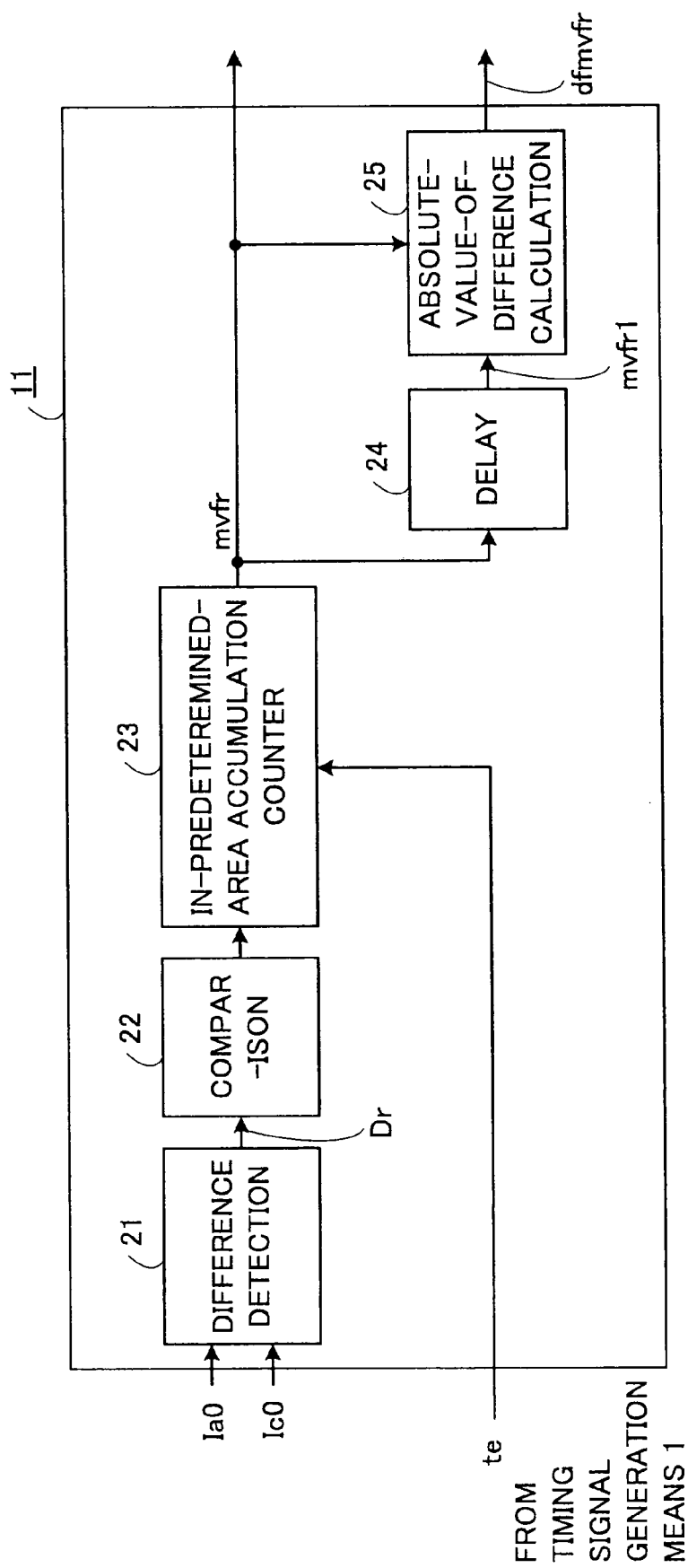
FIG. 2 is a block diagram showing an exemplary configuration of an interframe correlation detection means in the video signal processing apparatus according to the first embodiment.

Referring to FIG. 1, the interframe correlation detection means 11 of the telecine detection means 6 receives the current field signal 'Ia0' from the input terminal 100 and the two-field delayed signal 'Ic0' from the one-field delay means 3, and detects an interframe correlation in accordance with the area signal 'te' indicative of a predetermined area in one field from the timing signal generation means 1, thereby outputting an interframe motion-picture-element cumulative value 'mvfr' which is obtained every one field period, as a value indicative of strength of the correlation for one frame period. The interframe correlation detection means 11 also calculates an absolute value of the difference 'dfmfr' (i.e., an absolute value of the difference between the interframe motion-picture-element cumulative value 'mvfr' and an interframe motion-picture-element cumulative value 'mvfr1' delayed by one field) of the interframe motion-picture-element cumulative value 'mvfr' between adjacent two fields to output it. FIG. 2 is a block diagram showing an exemplary configuration of the interframe correlation detection means 11. The interframe correlation detection means 11 includes a difference detection means 21, a comparison means 22, an in-predetermined-area accumulation counter 23, a delay means 24, and an absolute-value-of-difference calculation means 25.

Figure 3:
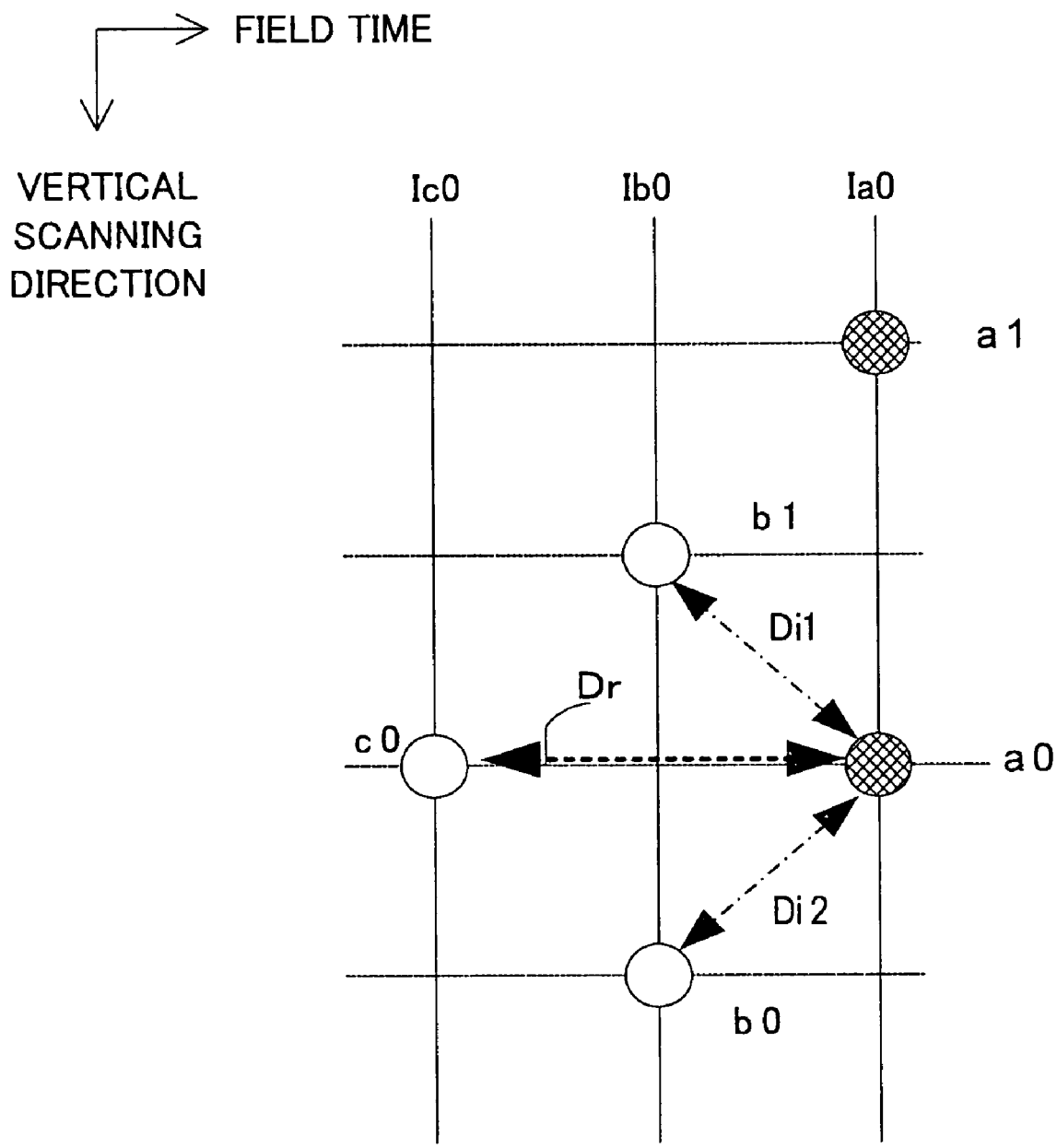
FIG. 3 is an explanatory diagram showing a positional relationship in a vertical direction among picture elements in each field in the video signal processing apparatus according to the first embodiment.

Referring to FIG. 2, the difference detection means 21 of the interframe correlation detection means 11 receives the current field signal 'Ia0' through the input terminal 100 and the two-field delayed signal 'Ic0' supplied from the one-field delay means 3. The difference detection means 21 calculates a difference between picture elements of the current field signal 'Ia0' and picture elements of the two-field delayed signal 'Ic0' and calculates an absolute value of the difference, thereby detecting the interframe difference information 'Dr' to output it. Since the input video signal is an interlaced signal in this embodiment, a positional relationship in the vertical direction between picture elements in successive fields of the input video signal is as shown in FIG. 3. As shown in FIG. 3, a picture element 'a0' of the current field signal 'Ia0' and a picture element 'c0' of the two-field delayed signal 'Ic0', positions in the vertical direction of which are the same, are positioned on the same line, and an interframe correlation can be defined accurately as a difference value. The difference detection means 21 detects interframe difference information 'Dr' from the absolute value of the difference |a0-c0|.

The comparison means 22 of the interframe correlation detection means 11 receives the interframe difference information 'Dr' from the difference detection means 21. The comparison means 22 compares the interframe difference information 'Dr' supplied from the difference detection means 21 with a predetermined threshold, and outputs a result of the comparison. For example, when the interframe difference information 'Dr' is smaller than the predetermined threshold, the comparison means determines that the picture element is a still picture element. When the interframe difference information 'Dr' has a value larger than the predetermined threshold, the comparison means determines that the picture element is a motion picture element. The interframe difference information 'Dr' outputs a binary value as the result of the comparison. The binary value is, for example, zero when the picture element is determined as a still picture element and one when the picture element is determined as a motion picture element. The binary value is not limited to the above-mentioned values, and may be other values so long as the values indicate a result of the determination as a still picture element or a motion picture element by the comparison.

The in-predetermined-area accumulation counter 23 of the interframe correlation detection means 11 receives a binary value as a still picture element or a motion picture element from the comparison means 22 and the area signal 'te' indicative of the predetermined area in one field from the timing signal generation means 1. The in-predetermined-area accumulation counter 23 accumulates number of the picture elements as the motion picture elements in the area defined by the area signal 'te' indicative of the predetermined area in one field from the timing signal generation means 1 in accordance with the binary value as a still picture element or a motion picture element. More specifically, when a value of one determined as the motion picture element from the comparison means 22 is accumulated throughout the area defined by the area signal 'te', and the interframe motion-picture-element cumulative value 'mvfr' in the area is outputted every one field period as a value (number of the motion picture elements or a motion picture element cumulative value) corresponding to number of the motion picture elements in one field. The interframe motion-picture-element cumulative value 'mvfr' as the result of the accumulation indicates the strength of the interframe correlation for one frame period in accordance with the interframe difference information, which is referred to as an interframe motion-picture-element cumulative value 'mvfr' hereinafter. With respect to the interframe motion-picture-element cumulative value 'mvfr', when the correlation is strong (i.e., in the case of a still picture), number of the motion picture elements in one field is small, whereas when the correlation is weak (i.e., in the case of a motion picture with a large motion), number of the motion picture elements in one field is large.

Some video signals contain a cinema material called a letter box such as a black signal part (no picture part) existing in upper and lower strip parts on the display screen. In this case, the area signal 'te' is generated by the timing signal generation means 1, for example, as a signal indicative of the duration of picture elements other than the upper and lower strip parts and the picture blanking duration in one field. Accordingly, the in-predetermined-area accumulation counter 23 outputs the number of the motion picture elements in an area other than the upper and lower strip parts and the picture blanking duration, as the number of the motion picture elements in one field, thus preventing erroneous determination.

The delay means 24 of the interframe correlation detection means 11 receives every one field period duration the interframe motion-picture-element cumulative value 'mvfr' outputted from the in-predetermined-area accumulation counter 23. The delay means 24 delays the interframe motion-picture-element cumulative value 'mvfr' by one field to output the interframe motion-picture-element cumulative value 'mvfr1' delayed by one field.

The absolute-value-of-difference calculation means 25 of the interframe correlation detection means 11 receives the interframe motion-picture-element cumulative value 'mvfr' outputted from the in-predetermined-area accumulation counter 23 and the interframe motion-picture-element cumulative value 'mvfr1' delayed by one field from the delay means 24. The absolute-value-of-difference calculation means 25 calculates an absolute value of a difference between the interframe motion-picture-element cumulative value 'mvfr' and the interframe motion-picture-element cumulative value 'mvfr1' that is a one-field delayed signal of the interframe motion-picture-element cumulative value 'mvfr' to output the absolute value of the difference as a motion-picture-element cumulative difference value 'dfmvfr'. When one frame is set to correspond to two fields in the 2-2 pulldown signal, the motion-picture-element cumulative difference value 'dfmvfr' between fields generated from the same frame is relatively small; whereas the motion-picture-element cumulative difference value 'dfmvfr' between fields generated from different frames is large.

Figure 4:
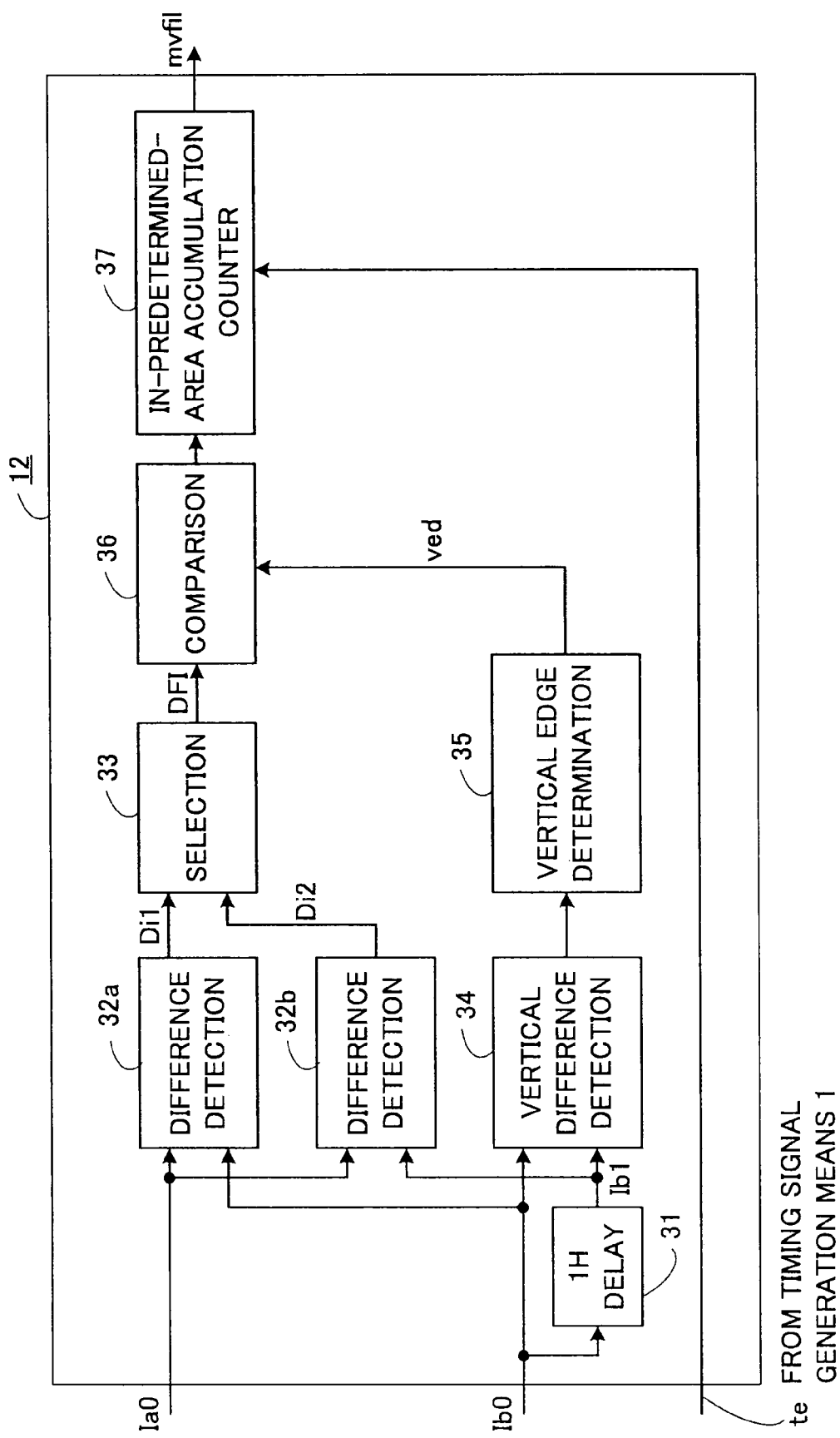
FIG. 4 is a block diagram showing an exemplary configuration of an interfield correlation detection means in the video signal processing apparatus according to the first embodiment.

The interfield correlation detection means 12 of the telecine detection means 6 receives the current field signal 'Ia0' from the input terminal 100 and the one-field delayed signal 'Ib0' from the one-field delay means 2, detects an interfield correlation (between adjacent fields) in accordance with the area signal 'te' indicative of the predetermined area in one field from the timing signal generation means 1, and outputs an interfield motion-picture-element cumulative value 'mvfil' of one field duration as a value indicative of the strength of the interfield correlation. FIG. 4 is a block diagram showing an exemplary configuration of the interfield correlation detection means 12. The interfield correlation detection means 12 includes a 1H delay means 31, first and second difference detection means 32a and 32b, a selection means 33, a vertical difference detection means 34, a vertical edge determination means 35, a comparison means 36, and an in-predetermined-area accumulation counter 37.

Referring to FIG. 4, the 1H delay means 31 of the interfield correlation detection means 12 receives the one-field delayed signal 'Ib0' from the one-field delay means 2. The 1H delay means 31 delays the one-field delayed signal 'Ib0' by one horizontal scan duration (also referred to "one line" or "1H"), and outputs a 1H delayed signal 'Ib1' of a one-field delayed signal 'Ib0'.

The first difference detection means 32a (also referred to as a "difference detection means 32a" in FIG. 4) of the interfield correlation detection means 12 receives the current field signal 'Ia0' from the input terminal 100 and the one-field delayed signal 'Ib0' from the one-field delay means 2. The second difference detection means 32b (also referred to as a "difference detection means 32b" in FIG. 4) receives the current field signal 'Ia0' and the 1H delayed signal 'Ib1' of the one-field delayed signal 'Ib0' from the 1H delay means 31. The first difference detection means 32a calculates a difference between the current field signal 'Ia0' and the one-field delayed signal 'Ib0' and finds an absolute value of the difference, thereby detecting difference information 'Di1' to output it. The second difference detection means 32b calculates a difference between the current field signal 'Ia0' and the 1H delayed signal 'Ib1' and finds an absolute value of the difference, thereby detecting difference information 'Di2' to output it.

From the positional relationship of picture elements in a vertical scanning direction in the fields of the input video signal shown in FIG. 3, with respect to a picture element 'a0' of the current field signal 'Ia0', a picture element 'b0' of the one-field delayed signal 'Ib0' and a picture element 'b1' of the 1H delayed signal 'Ib1' are positioned in the illustrated positional relationship. Since the picture elements 'b0' and 'b1' are located at upper and lower positions in the vertical scanning direction and the picture elements are displayed by the interlaced scan video signal, the picture elements 'b0' and 'b1' are mutually shifted from the picture element 'a0' by ½ lines and located at upper and lower positions of the picture element 'a0'. The first difference detection means 32a detects the difference information 'Di1' based on an absolute value of the difference |a0-b0|, and the second difference detection means 32b detects the difference information 'Di2' based on an absolute value of the difference |a0-b1|.

The selection means 33 of the interfield correlation detection means 12 receives the difference information 'Di1' and 'Di2' from the first and second difference detection means 32a and 32b. The selection means 33 compares the difference information 'Di1' from the first difference detection means 32a with the difference information 'Di2' from the second difference detection means 32b, selects minimum one of the both, and outputs it as interfield difference information 'DFI'. In this connection, in the selection of the interfield difference information 'DFI', this selection is not limited to selection of the minimum one as described above. A value obtained from an average of values based on the difference information 'Di1' and the difference information 'Di2' may be selected. In either case, erroneous detection of an interfield difference caused by the shift of ½ lines between the picture element 'a0' and the picture element 'b0' and between the picture element 'a0' and the picture element 'b1' in FIG. 3 can be prevented.

The vertical difference detection means 34 of the interfield correlation detection means 12 receives the one-field delayed signal 'Ib0' from the one-field delay means 2 and the 1H delayed signal 'Ib1' of the one-field delayed signal 'Ib0' from the 1H delay means 31. The vertical difference detection means 34 calculates a difference between picture elements of the one-field delayed signal 'Ib0' and the 1H delayed signal 'Ib1' positioned at the upper and lower positions in the vertical scanning direction and finds an absolute value of the difference, thereby detecting it as vertical difference information to output it.

The vertical edge determination means 35 of the interfield correlation detection means 12 receives the vertical difference information from the vertical difference detection means 34. The vertical edge determination means 35 compares a value based on the vertical difference information from the vertical difference detection means 34 with a predetermined threshold, and outputs a result of the comparison as a vertical edge flag 'ved'. In the comparison, when the value based on the vertical difference information is smaller than the predetermined threshold, the vertical edge determination means 35 determines the picture element 'a0' not to be an edge part (i.e., a flat part). When the value based on the vertical difference information is larger than the predetermined threshold, the vertical edge determination means 35 determines it as a vertical edge part and outputs a binary value as the vertical edge flag 'ved'. For example, when the vertical edge determination means 35 determines it as a flat part, the vertical edge flag 'ved' is set to have a value of zero (i.e., ved=0), whereas when the vertical edge determination means 35 determines it as a vertical edge part, the vertical edge flag 'ved' is set to have a value of one (i.e., ved=1). In this connection, the value of the vertical edge flag 'ved' is not limited to the above-mentioned example. The value of the vertical edge flag 'ved' may have another value so long as the value indicates a result of each picture element determined as the vertical edge part or as the no vertical edge part through comparison.

The comparison means 36 of the interfield correlation detection means 12 receives the interfield difference information 'DFI' from the selection means 33 and the vertical edge flag 'ved' outputted from the vertical edge determination means 35. The comparison means 36 determines whether a picture element which is a picture element of the flat part and not a picture element of the vertical edge part is a still picture element or a motion picture element in accordance with the interfield difference information 'DFI' from the selection means 33 and the vertical edge flag 'ved' from the vertical edge determination means 35, thereby outputting a binary value as a result of the determination. In other words, with regard to the picture element when ved=0, that is, when the vertical edge flag 'ved' from the vertical edge determination means 35 indicates the flat part, the comparison means compares a value based on the interfield difference information 'DFI' from the selection means 33 with the predetermined threshold, and outputs a binary value as a result of the comparison. In the comparison, for example, when the value based on the interfield difference information 'DFI' is smaller than the predetermined threshold, the comparison means determines that the picture element is a still picture element and outputs a binary value. When the value based on the interfield difference information 'DFI' is larger than the predetermined threshold, the comparison means determines that the picture element is a motion picture element and outputs a binary value. For example, when the picture element is determined as a still picture element, the binary value is set at a value of zero. When the picture element is determined as a motion picture element, the binary value is set at a value of one. When the vertical edge flag 'ved' from the vertical edge determination means 35 indicates the vertical edge part, that is, when ved=1, on the other hand, the comparison means outputs a value of zero as a still picture regardless of the result of the comparison in the first embodiment. In this connection, the binary values are not limited to the above-mentioned values, and other values may be used so long as the value to be used indicates a result of the determination of each picture element, that is, a still picture element or a motion picture element through the comparison. Further, when the vertical edge flag 'ved' indicates the vertical edge part, the output value can also be set at a value (e.g., a value of two) other than the above-mentioned binary value. A value indicating a result of the comparison by the comparison means 36 may be any value indicating a result of determining whether the picture element, which is a picture element of the flat part and is not a picture element of the vertical edge part, is a still picture element or a motion picture element.

The in-predetermined-area accumulation counter 37 of the interfield correlation detection means 12 receives the binary value for the flat part picture element from the comparison means 36 and the area signal 'te' indicative of the predetermined area in one field from the timing signal generation means 1. The in-predetermined-area accumulation counter 37 accumulates number of the picture elements, each of which has a value indicative of a motion picture element, in the area defined by the area signal 'te' indicating the predetermined area in one field from the timing signal generation means 1 in accordance with the value from the comparison means 36. More specifically, the in-predetermined-area accumulation counter 37 accumulates number of the picture elements, each of which has a value of one indicative of a motion picture element sent from the comparison means 36, throughout the entire area defined by the area signal 'te', and outputs a motion picture element cumulative value 'mvfil' in the area, which is number of the motion picture elements in one field, every one field period. The motion picture element cumulative value 'mvfil' as a result of the accumulation indicates the strength of an interfield correlation in accordance with the interfield difference information, and is hereinafter referred to as an interfield motion-picture-element cumulative value 'mvfil'. Since the comparison means 36 of the interfield correlation detection means 12 receives the value of one indicating a motion picture element other than picture elements of the vertical edge part and the interfield motion-picture-element cumulative value 'mvfil' indicates a cumulative value of the values indicating motion picture elements other than picture elements of the vertical edge part, erroneous detection at the vertical edge part can be prevented when the interfield correlation is detected. When the interfield correlation is strong (i.e., in the case of a still picture), the number of the motion picture elements in one field becomes small, whereas when the interfield correlation is weak (i.e., in the case of a motion picture having a large motion), the number of the motion picture elements in one field becomes large.

Figure 5:
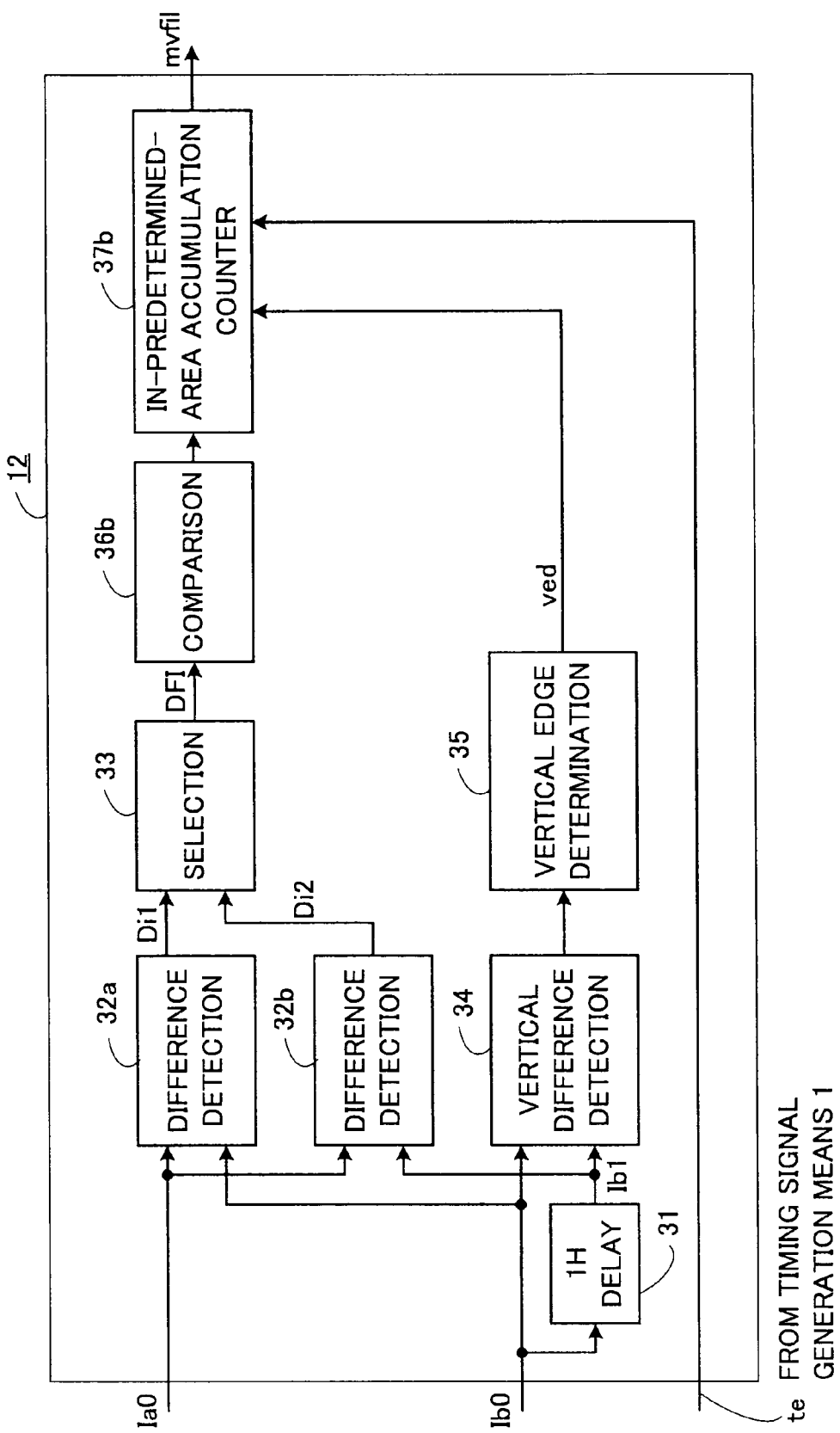
FIG. 5 is a block diagram showing another exemplary configuration of an interfield correlation detection means in the video signal processing apparatus according to the first embodiment.

The above-mentioned explanation has been made in connection with the case where the comparison means 36 of the interfield correlation detection means 12 performs the comparing processing on the picture elements of a flat part that is not a vertical edge part to output a binary signal indicative of the result of the comparison and the in-predetermined-area accumulation counter 37 accumulates the number of the motion picture elements. However, the interfield correlation detection means 12 may also have a configuration shown in FIG. 5. Referring to FIG. 5, when a comparison means 36b determines whether the interfield difference information 'DFI' indicates a still picture element or a motion picture element and an in-predetermined-area accumulation counter 37b receives the vertical edge flag 'ved' outputted from the vertical edge determination means 35, the counter can also accumulate the number of the motion picture elements for a flat part (i.e., ved=0) that is not a vertical edge part. As in the similar manner to the case shown in FIG. 4, the in-predetermined-area accumulation counter 37b outputs the interfield motion-picture-element cumulative value 'mvfil' of the picture elements in the area, which is defined by the area signal 'te' and does not include the vertical-direction edge part, which is the number of the motion picture elements in one field on a field-by-field basis. The area signal 'te' is generated by the timing signal generation means 1 as a signal indicative of a picture element duration other than the upper and lower strip parts and a picture blanking period in one field. Thus, the in-predetermined-area accumulation counter 37 or 37b outputs the number of the motion picture elements in an area other than the upper and lower strip parts and the picture blanking period as the number of the motion picture elements in one field, thereby preventing erroneous determination.

Figure 6:
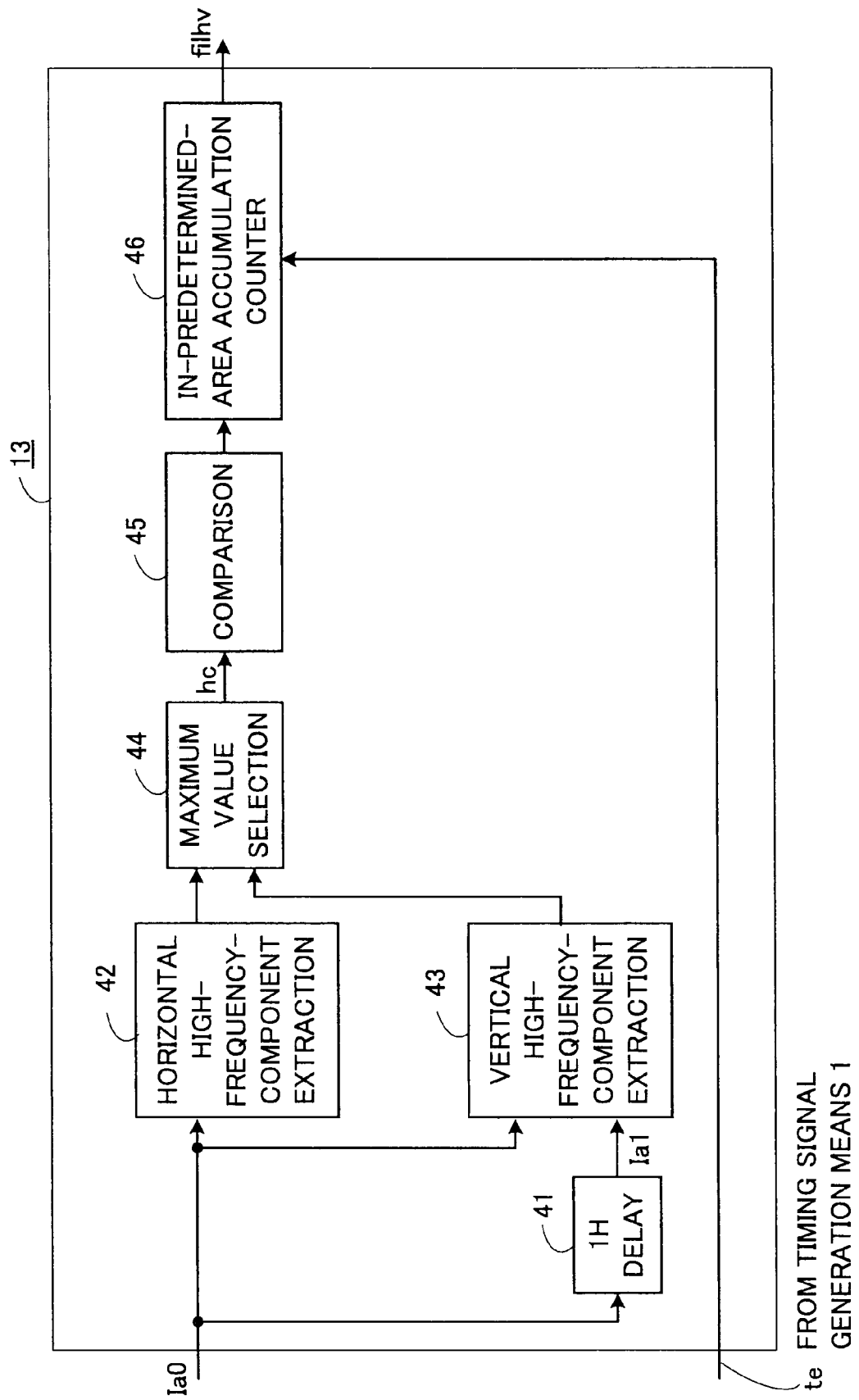
FIG. 6 is a block diagram showing an exemplary configuration of a field resolution determination means in the video signal processing apparatus according to the first embodiment.

The field resolution determination means 13 of the telecine detection means 6 receives the current field signal 'Ia0' from the input terminal 100, determines a degree of entire high frequency components existing in the field in accordance with the area signal 'te' indicative of the predetermined area in one field received from the timing signal generation means 1, and outputs a value (also referred to as a value indicative of resolution) 'filhv' indicative of the degree of the high frequency components. FIG. 6 is a block diagram showing an exemplary configuration of the field resolution determination means 13. The field resolution determination means 13 includes a 1H delay means 41, a horizontal high-frequency-component extraction means 42, a vertical high-frequency-component extraction means 43, a maximum value selection means 44, a comparison means 45, and an in-predetermined-area accumulation counter 46.

When the interfield correlation of a high resolution video signal is detected, an erroneous detection of the interfield difference resulting from a ½ line shift may occur. Even when the interfield correlation of a low resolution video signal, that is, when a field is low resolution and of a blurred picture, an erroneous detection of the motion interfield difference that the interfield correlation is strong (a still picture) in spite of a motion picture may occur. To avoid this, the field resolution determination means 13 determines the degree of the high frequency components existing in the field, that is, the entire resolution in the field.

Referring to FIG. 6, the 1H delay means 41 of the field resolution determination means 13 receives the current field signal 'Ia0' from the input terminal 100. The 1H delay means 41 delays the current field signal 'Ia0' by one horizontal scan period to output a 1H delayed signal 'Ia1' of the current field signal 'Ia0'. Referring to FIG. 3 showing the positional relationship of picture elements of a vertical direction in each field of the input video signal, a picture element of the current field signal 'Ia0' is displayed at a position indicated by 'a0' and a picture element of the 1H delayed signal 'Ia1' is displayed at a position indicated by 'a1'. As shown in FIG. 3, the picture elements 'a0' and 'a1' are located on the lines in the current field respectively, and the lines are disposed at an upper position and a lower position in a vertical direction.

The horizontal high-frequency-component extraction means 42 of the field resolution determination means 13 receives the current field signal 'Ia0' from the input terminal 100. The horizontal high-frequency-component extraction means 42 extracts horizontal high frequency components in horizontal picture elements of the current field signal 'Ia0', and extracts absolute values (hereinafter referred to as horizontal high frequency components) of the extracted high frequency components to output them. For example, the horizontal high-frequency-component extraction means 42 extracts high frequency components (e.g., the absolute value of an output of the band pass filter) between a picture element of a target picture element position 'a0' as a center and adjacent picture elements, or extracts high frequency components (e.g., the absolute value of an output of the band pass filter) between a picture element of a target picture element position 'a0' and next adjacent picture elements.

The vertical high-frequency-component extraction means 43 of the field resolution determination means 13 receives the current field signal 'Ia0' from the input terminal 100 and the 1H delayed signal 'Ia1' outputted from the 1H delay means 41. The vertical high-frequency-component extraction means 43 extracts vertical-direction high frequency components (hereinafter referred to as vertical high frequency components) of the picture element 'a0' from the absolute value of a difference between picture elements of the current field signal 'Ia0' and the 1H delayed signal 'Ia1', and outputs the vertical high frequency components. In this connection, the vertical high-frequency-component extraction means 43 may extract vertical high frequency components (an absolute value of an output of the band pass filter) between a picture element located at the target picture element position 'a0' as a center and a picture element located in an upper or lower position of the target picture element position 'a0', so long as the vertical high-frequency-component extraction means 43 can extract the vertical-direction high frequency components at the target picture element position 'a0'.

The maximum value selection means 44 of the field resolution determination means 13 receives the horizontal high frequency components from the horizontal high-frequency-component extraction means 42 and the vertical high frequency components from the vertical high-frequency-component extraction means 43. The maximum value selection means 44 compares the horizontal high frequency components from the horizontal high-frequency-component extraction means 42 and the vertical high frequency components from the vertical high-frequency-component extraction means 43, and selects its maximum value, and outputs it as a horizontal and vertical high frequency components 'hc' (referred to as horizontal/vertical high frequency components).

In other words, the maximum value of the horizontal high frequency components and the vertical high frequency components in each picture element of the current field signal 'Ia0' is extracted as the horizontal/vertical high frequency components 'hc' which indicate the degree of the high frequency components and indicate a resolution.

The comparison means 45 of the field resolution determination means 13 receives the horizontal/vertical high frequency components 'hc' from the maximum value selection means 44. The comparison means 45 compares the horizontal/vertical high frequency components 'hc' from the maximum value selection means 44 with a predetermined threshold, determines whether or not each picture element has horizontal or vertical high frequency components (hereinafter referred to as a high frequency picture element), and outputs a binary value as a result of the determination. In the comparison, for example, when the horizontal/vertical high frequency components 'hc' are larger than the predetermined threshold, the comparison means determines that the picture element is a high frequency picture element. Otherwise, that is, when the horizontal/vertical high frequency components 'hc' are not larger than the predetermined threshold, the comparison means determines that the picture element has low frequency components, that is, is not the high frequency picture element, and outputs a binary value as a result of the determination. For example, the binary value is set at a value of one when the picture element is determined to be the high frequency picture element, and at a value of zero when the picture element is determined to be not the high frequency picture element. In this connection, the binary value is not limited to the above-mentioned example. The binary value may be other values so long as the value can indicate that the picture element is a high frequency picture element by comparison.

The in-predetermined-area accumulation counter 46 of the field resolution determination means 13 receives the binary value indicative of whether to be the high frequency picture element from the comparison means 45 and the area signal 'te' indicative of the predetermined area in one field from the timing signal generation means 1. The in-predetermined-area accumulation counter 46 accumulates number of the picture elements, each of which has a value indicative of the high frequency picture element in the area defined by the area signal 'te' indicative of the predetermined area in one field from the timing signal generation means 1 in accordance with the binary value indicative of the high frequency picture element from the comparison means 45. In other words, the in-predetermined-area accumulation counter 46 accumulates number of the picture elements each having a value of one determined as a high frequency picture element from the comparison means 45 throughout the area defined by the area signal 'te', and outputs a high-frequency-picture-element cumulative value 'filhv' in the area as a value (number of the high frequency picture elements or a cumulative value of the high frequency picture elements) corresponding to the number of the high frequency picture elements in one field on a field-by-field basis. The high-frequency-picture-element cumulative value 'filhv' as the result of the accumulation indicates the degree of the high frequency components existing in the target field, that is, indicates an entire resolution in the field. When the field has a high resolution and has a high degree of high frequency components present therein (i.e., when the picture has a high resolution), the number of the high frequency picture elements in one field becomes large. When the field has a low resolution (i.e., when the field has a small degree of high frequency components and the picture has a low resolution with less edge), the number of the high frequency picture elements in one field becomes small. Thus, the entire resolution indicating the degree of the high frequency components existing in the field can be determined from the high-frequency-picture-element cumulative value 'filhv'.

As has been described above, the area signal 'te' is generated by the timing signal generation means 1 as a signal indicative of a duration of picture elements other than the upper and lower strip parts and the picture blanking period in one field. Therefore, the in-predetermined-area accumulation counter 46 outputs the number of the high frequency picture elements in the area other than the upper and lower strip parts and the picture blanking period, as a number of the high frequency picture elements on one field, thus preventing erroneous determination of the degree of the high frequency components existing in the target field.

Next, the pull-down sequence detection means 14 of the telecine detection means 6 in FIG. 1 receives the interframe motion-picture-element cumulative value 'mvfr' and the motion-picture-element cumulative difference value 'dfmvfr' from the interframe correlation detection means 11, the interfield motion-picture-element cumulative value 'mvfil' from the interfield correlation detection means 12, and the high-frequency-picture-element cumulative value 'filhv' from the field resolution determination means 13. The pull-down sequence detection means 14, in accordance with the interframe motion-picture-element cumulative value 'mvfr', the motion-picture-element cumulative difference value 'dfmvfr', and the interfield motion-picture-element cumulative value 'mvfil' that have been received, detects whether or not the input video signal is a telecine video signal and also detects a pull-down sequence, and outputs the telecine detection signal 'tci' and the interpolation phase flag 'tcf'. In accordance with the high-frequency-picture-element cumulative value 'filhv' from the field resolution determination means 13, the pull-down sequence detection means 14 also generates a mixing ratio signal 'tcmix' indicative of a mixing ratio of the interpolation signals for use in the mixing means 8 of the interpolation signal generation means 110 to output it.

The operation of the pull-down sequence detection means 14 is carried out on a field-by-field basis. Processing of each block of the 2-3 sequence detection means 15, the 2-2 sequence detection means 16, and the pull-down determination means 17, which are provided for detecting the pull-down sequence, is performed on a field-by-field basis and at the timing of a field pulse based on a vertical synchronization signal.

The 2-3 sequence detection means 15 of the pull-down sequence detection means 14 receives the interframe motion-picture-element cumulative value 'mvfr' from the interframe correlation detection means 11 and the interfield motion-picture-element cumulative value 'mvfil' from the interfield correlation detection means 12. The 2-3 sequence detection means 15, in accordance with the interframe motion-picture-element cumulative value 'mvfr' and the interfield motion-picture-element cumulative value 'mvfil', detects whether or not to be the 2-3 pull-down sequence in accordance with repetition condition of the five-field sequence of a 2-3 pull-down signal, detects the occurrence frequency of the 2-3 pull-down sequence, determines the certainty, and predictively controls a result of the detection of the 2-3 pull-down signal. The 2-3 sequence detection means 15 outputs a 2-3 pull-down detection signal 'tci23' (e.g., tci23=1 when detecting that the input video signal is a 2-3 pull-down signal and tci23=0 when detecting that the input video signal is not a 2-3 pull-down signal) and a 2-3 phase flag 'tcf23' (e.g., tcf23=1 when the previous field is the same field and tcf23=0 when the subsequent field is the same field) indicative of the phase of the 2-3 pull-down.

Figure 7:
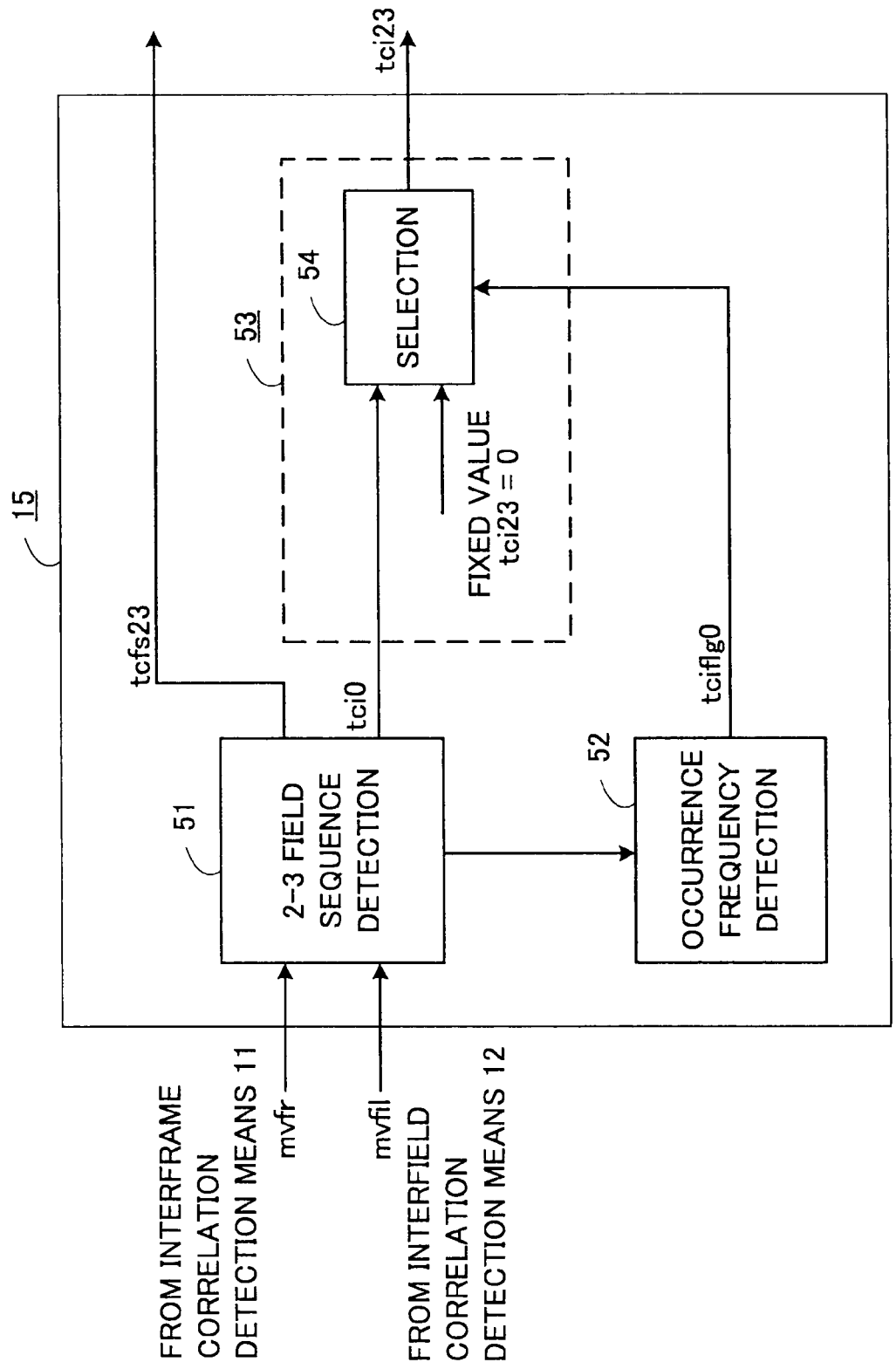
FIG. 7 is a block diagram showing an exemplary configuration of a 2-3 sequence detection means in the video signal processing apparatus according to the first embodiment.

FIG. 7 is a block diagram showing an exemplary configuration of the 2-3 sequence detection means 15 of the pull-down sequence detection means 14 in the first embodiment. Referring to FIG. 7, the 2-3 sequence detection means 15 in the first embodiment includes a 2-3 field sequence detection means 51, an occurrence frequency detection means 52, and a 2-3 predictive control means 53.

The 2-3 field sequence detection means 51 of the 2-3 sequence detection means 15 receives the interframe motion-picture-element cumulative value 'mvfr' from the interframe correlation detection means 11 and the interfield motion-picture-element cumulative value 'mvfil' from the interfield correlation detection means 12. The 2-3 field sequence detection means 51 determines whether or not the field is a still picture field in accordance with each of the received interframe motion-picture-element cumulative value 'mvfr' and interfield motion-picture-element cumulative value 'mvfil', detects whether or not the input video signal is a video signal satisfying the repetition condition of the five-field sequence in accordance with a result of the determination, and detects the sequence phase of the 2-3 pull-down in accordance with the result of the determination.

Figure 8:
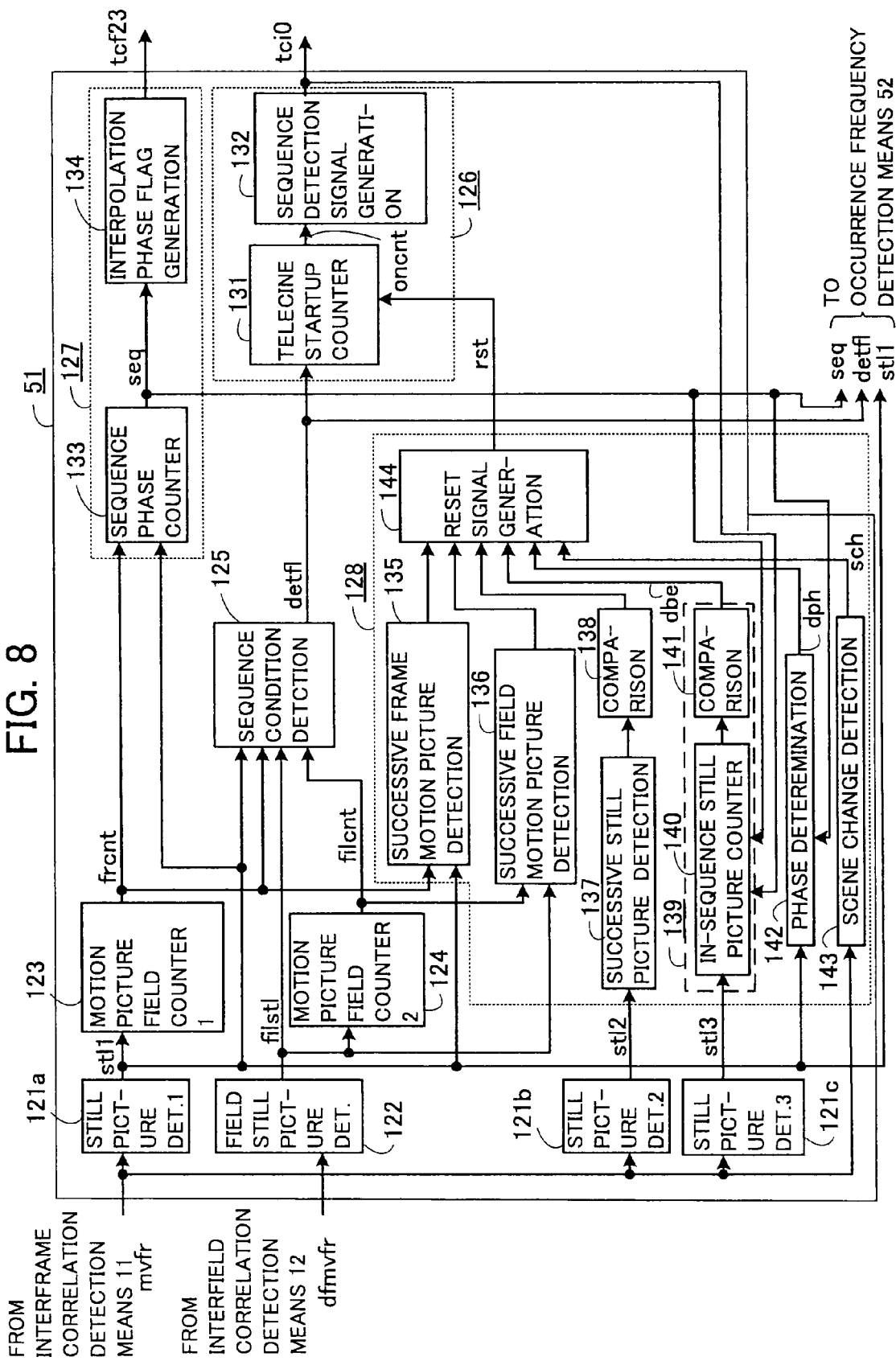
FIG. 8 is a block diagram showing an exemplary configuration of a 2-3 field sequence detection means of the 2-3 sequence detection means in the video signal processing apparatus according to the first embodiment.

FIG. 8 is a block diagram showing an exemplary configuration of the 2-3 field sequence detection means 51 of the 2-3 sequence detection means 15. As shown in FIG. 8, the 2-3 field sequence detection means 51 includes first, second, and third still picture detection means 121a, 121b, and 121c, which are expressed in FIG. 8 as "STILL PICTURE DET.1", "STILL PICTURE DET.2", and "STILL PICTURE DET.3" respectively; a field-still-picture detection means 122; first and second motion picture field counters 123 and 124, which are expressed in FIG. 8 as "MOTION PICTURE FIELD COUNTER 1" and "MOTION PICTURE FIELD COUNTER 2" respectively; a sequence condition detection means 125 which detects the repetition condition of a 2-3 pull-down sequence; a sequence determination means 126 which counts the repetition of the sequence and determines whether or not to be the sequence in the 2-3 pull-down signal (hereinafter also referred to as "2-3 sequence"); a sequence phase determination means 127 which detects a phase of the 2-3 sequence; and a reset detection means 128 which detects that the sequence condition are not satisfied.

As shown in FIG. 8, the sequence determination means 126 of the 2-3 field sequence detection means 51 includes a telecine startup counter 131 and a sequence-detection-signal generation means 132. Further, the sequence phase determination means 127 includes a sequence phase counter 133 and an interpolation-phase-flag generation means 134. Furthermore, the reset detection means 128 includes a successive frame motion-picture detection means 135, a successive field motion-picture detection means 136, a successive still-picture detection means 137, a comparison means 138, a sequence shift detection means 139 having an in-sequence still-picture counter 140 and a comparison means 141, a phase determination means 142, a scene change detection means 143, and a reset signal generation means 144.

In the 2-3 pull-down signal as the telecine video signal, two frames correspond to two fields and three fields respectively, and in a field sequence of the 2-3 pull-down signal, the same field as the field previous by two fields is repeated once every five fields. Therefore, a field (i.e., a still picture), whose interframe motion-picture-element cumulative value 'mvfr' based on the interfield difference information is a value of zero or not larger than the predetermined value, is present periodically once every five fields.

Figure 9:
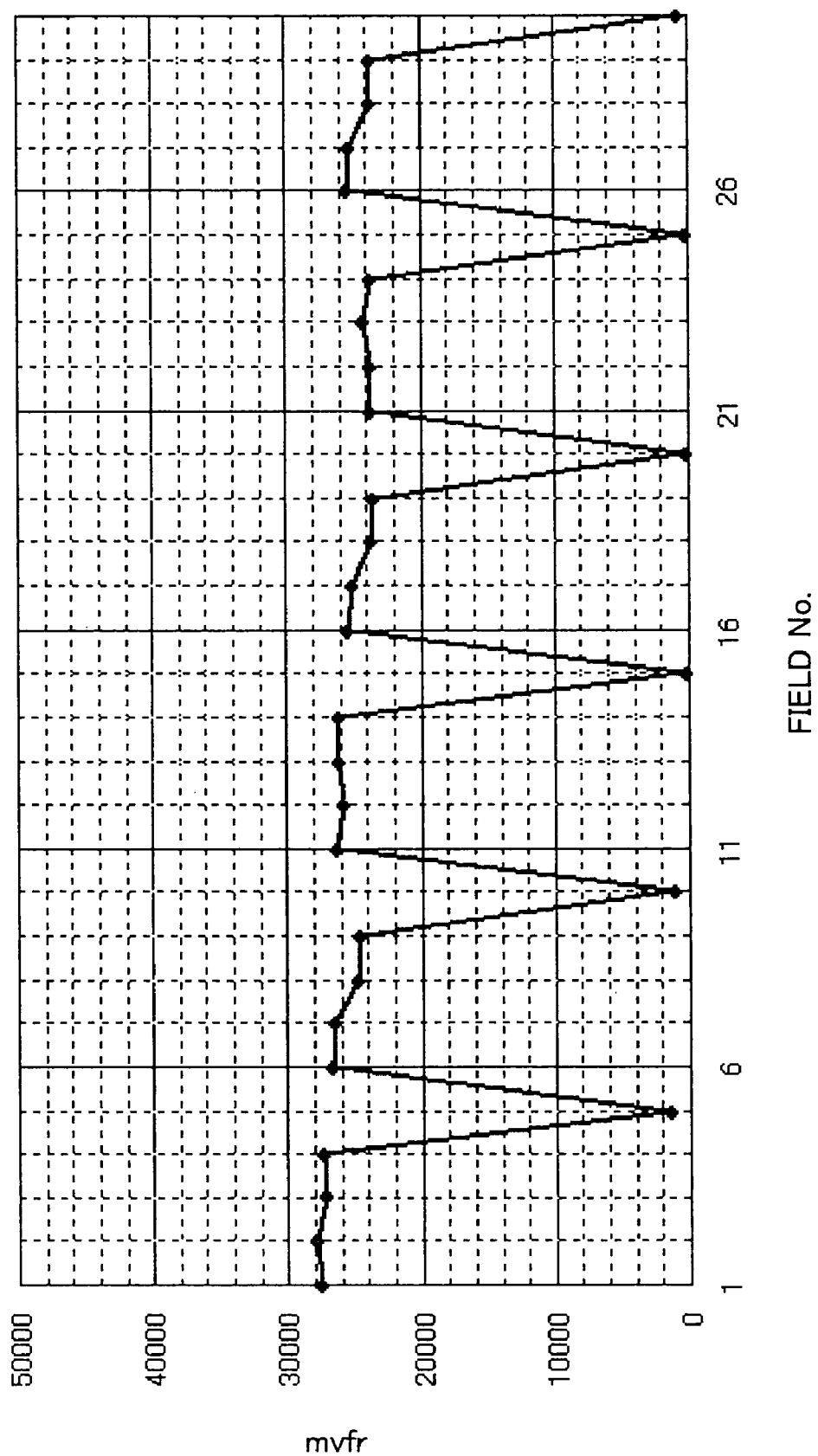
FIG. 9 is a diagram showing a relationship (in the case of a 2-3 pull-down signal) between an interframe motion-picture-element cumulative value 'mvfr' (a vertical axis) outputted from the interframe correlation detection means and a field number (a horizontal axis) in the video signal processing apparatus according to the first embodiment.

FIG. 9 is a diagram showing a relationship between the interframe motion-picture-element cumulative value 'mvfr' (a vertical axis) outputted from the interframe correlation detection means 11 and a field number (time or a horizontal axis) when the 2-3 pull-down signal is an input video signal. FIG. 9 shows a case where the interframe correlation detection means 11 performs processing of a field picture based on the 2-3 pull-down signal in accordance with picture simulation. As shown by the points of field Nos. 5, 10, . . . , 30 in FIG. 9, a still picture field, whose interframe motion-picture-element cumulative value 'mvfr' is a value of zero or not larger than the predetermined value, is present periodically once every five fields, and number of the motion picture-elements is large in consecutive four fields previous to the still picture field. The consecutive four fields are also referred to as motion pictures. In other words, in this field sequence, five fields including preceding four fields of the motion pictures and succeeding one field of the still picture are repeated.

Further, there are successive fields (i.e., still pictures), whose interfield motion-picture-element cumulative values 'mvfil' based on the interfield difference information are values of zero or not larger than a predetermined value, wherein the successive fields are composed of a field (i.e., any of fields of field Nos. 5, 10, . . . , 30 in FIG. 9) whose interframe motion-picture-element cumulative value 'mvfr' indicates a still picture that appears periodically once every five fields and a preceding field. In this sequence of five fields, there is no successive two or more fields that are fields (i.e., motion pictures) having the interfield motion-picture-element cumulative value 'mvfil' larger than the predetermined value.

Figure 10:
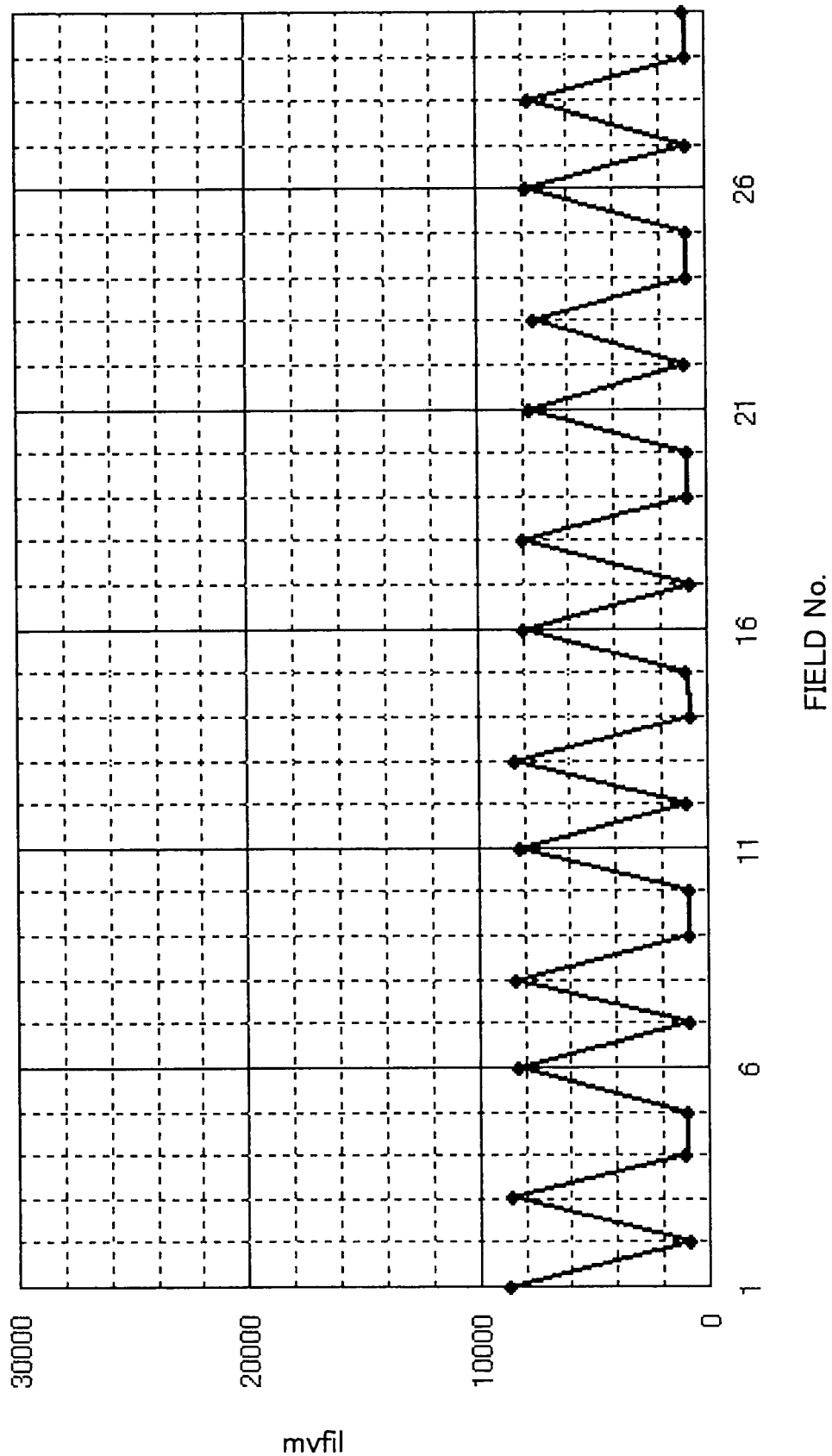
FIG. 10 is a diagram showing a relationship (in the case of a 2-3 pull-down signal) between an interfield motion-picture-element cumulative value 'mvfil' (a vertical axis) outputted from the interfield correlation detection means and a field number (a horizontal axis) in the video signal processing apparatus according to the first embodiment.

FIG. 10 is a diagram showing a relationship between the interfield motion-picture-element cumulative value 'mvfil' (a vertical axis) outputted from the interfield correlation detection means 12 and a field number (time or a horizontal axis). FIG. 10 shows a case where the interfield correlation detection means 12 performs processing of a field picture based on the 2-3 pull-down signal as shown in FIG. 9 by picture simulation. As shown by the points of field Nos. 4 and 5, field Nos. 9 and 10, . . . , field Nos. 29 and 30 in FIG. 10, the interframe motion-picture-element cumulative values 'mvfr' of successive two fields become zero or not larger than the predetermined value, i.e., a value of the still picture field periodically once every five fields, and in the five-field sequence, a sequence where a still field appears next to a motion picture is repeated.

Thus, in accordance with the interframe motion-picture-element cumulative value 'mvfr', detection of the condition of being the 2-3 sequence can be carried out by detecting a repetitive sequence of five fields of successive four motion picture fields followed by one still picture field. In order to detect the condition of being the 2-3 pull-down signal more reliably, further, the detection can be achieved by detecting, in addition to the condition based on the interframe motion-picture-element cumulative value 'mvfr', a repetition of five fields including two successive fields which have an interframe motion-picture-element cumulative value 'mvfr' indicative of a still picture field. The two successive fields is composed of a field having an interframe motion-picture-element cumulative value 'mvfr' indicative of a still picture field appearing at intervals of once every five fields and a subsequent field.

The 2-3 field sequence detection means 51 detects whether or not a field of the input video signal is a still picture field in accordance with each of the interframe motion-picture-element cumulative value 'mvfr' and the interfield motion-picture-element cumulative value 'mvfil', detects whether or not the input video signal satisfies the condition of being the 2-3 sequence by detecting the still picture appearing once every five fields and detecting the successive still pictures based on the interfield difference information, and outputs a detection signal 'tci0' indicative of the result of the detection (i.e., the result of the detection of 2-3 sequence) and a 2-3 phase flag 'tcf23' indicative of a phase upon telecine interpolation.

Further, the occurrence frequency detection means 52 detects an occurrence frequency of the 2-3 sequence with use of the same condition of the detection of the 2-3 sequence as the 2-3 field sequence detection means 51. The 2-3 field sequence detection means 51 outputs a result of the detection of the 2-3 sequence condition 'detfl', a result of the detection of the frame still picture 'stl1', and a phase count value 'seq' detected by the 2-3 field sequence detection means 51 to the occurrence frequency detection means 52.

Referring to FIG. 8, the interframe motion-picture-element cumulative value 'mvfr' of one field unit inputted from the interframe correlation detection means 11 to the 2-3 field sequence detection means 51 is sent to the first, second, and third still picture detection means 121a, 121b and 121c and to the scene change detection means 143 of the reset detection means 128.

Each of the first, second and third still picture detection means 121a, 121b and 121c compares the interframe motion-picture-element cumulative value 'mvfr' received from the interframe correlation detection means 11 with a predetermined threshold, and detects whether or not the field is a still picture field. When the received interframe motion-picture-element cumulative value 'mvfr' is smaller than the predetermined threshold (i.e., when the number of the motion picture elements based on the interfield difference information in one field is smaller than the predetermined number), each of the first, second and third still picture detection means 121a, 121b and 121c detects that the field is a still picture field. When the interframe motion-picture-element cumulative value 'mvfr' is larger than the predetermined threshold (i.e., when the number of the contained motion picture elements is larger than the predetermined threshold in one field), each of the first, second and third still picture detection means 121a, 121b and 121c can also detect that the field is a motion picture field; whereas otherwise, each of the first, second and third still picture detection means 121a, 121b and 121c can detect it as a still picture. In the first embodiment, explanation will be made on the assumption that the still picture field detected in accordance with the interframe motion-picture-element cumulative value 'mvfr' is referred to as a "frame still picture"; whereas the motion picture field is hereinafter referred to as a "frame motion picture".

The first still picture detection means 121a compares the interframe motion-picture-element cumulative value 'mvfr' with a predetermined threshold STL_TH1. When the received interframe motion-picture-element cumulative value 'mvfr' is smaller than the predetermined threshold STL_TH1, the first still picture detection means 121a detects that the field is a still picture field and sets a value of the result of the detection 'stl1' at a value of one (i.e., stl1=1, which indicates a frame still picture); whereas otherwise, the first still picture detection means 121a sets a value of the result of the detection 'stl1' at a value of zero (i.e., stl1=0, which indicates a frame motion picture). In this case, the predetermined threshold STL_TH1 for detection of a still picture is set at such a value as to be able to detect a still picture field appearing in the same field once every five fields in the 2-3 sequence.

Similarly, the second still picture detection means 121b compares the interframe motion-picture-element cumulative value 'mvfr' with a predetermined threshold STL_TH2. When the received interframe motion-picture-element cumulative value 'mvfr' is smaller than the predetermined threshold STL_TH2, the second still picture detection means 121b detects that the field is a still picture field and sets a value of the result of the detection 'stl2' at a value of one (i.e., stl2=1, which indicates a frame still picture); whereas otherwise, the second still picture detection means 121b sets a value of the result of the detection 'stl2' at a value of zero (i.e., stl2=0, which indicates a frame motion picture). The predetermined threshold STL_TH2 for detection of the still picture can be set at such a value as to be able to detect successive still pictures, to consider insertion of still picture elements such as subtitles or to be able to detect only a complete still picture. In this case, the predetermined threshold STL_TH2 can be set at the same value as the predetermined threshold in the first still picture detection means 121a.

Further, the third still picture detection means 121c compares the interframe motion-picture-element cumulative value 'mvfr' with a predetermined threshold STL_TH3. When the received interframe motion-picture-element cumulative value 'mvfr' is smaller than the predetermined threshold STL_TH3, the third still picture detection means 121c detect that the field is a still picture field and sets a value of a result of the detection 'stl3' at a value of one (i.e., stl3=1, which indicates a frame still picture); whereas otherwise, the third still picture detection means 121c sets a value of the result of the detection 'stl3' at a value of zero (i.e., stl3=0, which indicates a frame motion picture). The predetermined threshold STL_TH3 for detection of the still picture is set at such a value as to be capable of detecting the field different from the frame still picture appearing once every five fields as a still picture field in the 2-3 sequence. The predetermined threshold STL_TH3 can also be set at the same value as the predetermined threshold in the first still picture detection means 121a.

In order to detect the 2-3 sequence of five fields, the result of the detection 'stl1' outputted from the first still picture detection means 121a is sent to the first motion picture field counter 123, the sequence condition detection means 125, the sequence phase determination means 127, and also to the successive frame motion-picture detection means 135 and the phase determination means 142 of the reset detection means 128, and is also sent to the occurrence frequency detection means 52. The result of the detection 'stl2' outputted from the second still picture detection means 121b is sent to the successive still-picture detection means 137 of the reset detection means 128, and the result of the detection 'stl3' outputted from the third still picture detection means 121c is sent to the sequence shift detection means 139 of the reset detection means 128.

The field-still-picture detection means 122 receives the interfield motion-picture-element cumulative value 'mvfil' of one field unit inputted from the interfield correlation detection means 12 to the 2-3 field sequence detection means 51. The field-still-picture detection means 122 compares the interfield motion-picture-element cumulative value 'mvfil' received from the interfield correlation detection means 12 with a predetermined threshold, and detects whether or not the field is a still picture field. When the received interfield motion-picture-element cumulative value 'mvfil' is smaller than a predetermined threshold (i.e., when the number of the motion picture elements based on the interfield difference information in one field is smaller than a predetermined number), the field-still-picture detection means detects that the field is a still picture field. In this case, when the interfield motion-picture-element cumulative value 'mvfil' is larger than the predetermined threshold (i.e., when the number of the contained motion picture elements in one field is larger than the predetermined threshold), the field-still-picture detection means can detect that the field is a motion picture field. Otherwise, the field-still-picture detection means can detect that the field is a still picture field. In the first embodiment, explanation will be made on the assumption that a still picture field detected from the interfield motion-picture-element cumulative value 'mvfil' is referred to as a "field still picture" and a motion picture field is referred to as a "field motion picture".

The field-still-picture detection means 122 compares the interfield motion-picture-element cumulative value 'mvfil' with a predetermined threshold FIL_TH1. When the received interfield motion-picture-element cumulative value 'mvfil' is smaller than the predetermined threshold FIL_TH1, the field-still-picture detection means 122 detects that the field is a field still picture, and sets a result of the detection 'filstl' at a value of one (i.e., filstl=1, which indicates a field still picture). Otherwise, the field-still-picture detection means sets the result of the detection 'filstl' at a value of zero (i.e., filstl=0, which indicates a field motion picture). The result of the detection 'filstl' outputted from the field-still-picture detection means 122 is sent to the second motion picture field counter 124, the sequence condition detection means 125, and the successive field motion-picture detection means 136 of the reset detection means 128.

The first motion picture field counter 123 receives the result of the detection of the frame still picture 'stl1' from the first still picture detection means 121*a*. The first motion picture field counter 123, in accordance with the received result of the detection 'stl1', counts the number of the successive frame motion pictures until the previous field, and outputs the number 'frcnt' of frame motion picture fields. In other words, when the received result of the detection 'stl1' has a value of one indicating a frame still picture (i.e., when stl1=1), the first motion picture field counter 123 resets its own count. When the received result of the detection has a value of zero indicative of a motion picture (when stl1=0), the first motion picture field counter counts and outputs the counted number 'frcnt' of frame motion pictures at the timing of the next field.

The second motion picture field counter 124 receives the result of the detection of the field still picture 'filstl' from the field-still-picture detection means 122. The second motion picture field counter 124, in accordance with the received result of the detection 'filstl', counts the number of the successive field motion pictures, and outputs the number of successive field motion pictures 'filcnt' until the previous field. In other words, when the received result of the detection 'filstl' has a value of one indicative of a field still picture (i.e., when filstl=1), the second motion picture field counter 124 resets its own count. When the received result of the detection has a value of zero indicative of a motion picture (when filstl=0), the second motion picture field counter counts the counted number 'filcnt' of successive field motion pictures, and outputs it.

The sequence condition detection means 125 receives the result of the detection of the frame still picture 'stl1' from the first still picture detection means 121*a*, the count value of the successive frame motion pictures 'frcnt' until the previous field from the first motion picture field counter 123, the result of the detection of the field still picture 'filstl' from the field-still-picture detection means 122, and the count value of the successive field motion pictures 'filcnt' until the previous field from the second motion picture field counter 124. When detecting a field which is a frame still picture subsequent to successive four frame motion picture fields and which is one of the detected successive two fields, the sequence condition detection means 125 determines the field as a complete still picture field appearing once every five fields in the 2-3 pull-down signal to detect a 2-3 sequence condition, and outputs the result of the detection 'detfl' of the 2-3 sequence condition indicative of detected sequence condition. In other words, in accordance with the result of the detection of the frame still picture 'stl1', the count value of the successive frame motion pictures 'frcnt', the result of the detection of the field still picture 'filstl', and the count value of the successive field motion pictures 'filcnt', the sequence condition detection means 125 detects a field satisfying four conditions that a result of the detection of the frame still picture 'stl1' has a value of one (i.e., a frame still picture), a count value of the successive frame motion pictures 'frcnt' has a value of four (i.e., four fields of the frame motion pictures are successive until the previous field), a result of the detection of the field still picture 'filstl' has a value of one (i.e., a field still picture), and a count value of the successive field motion pictures 'filcnt' has a value of zero (i.e., the previous field is also a field still picture). When detecting a field satisfying the above-mentioned sequence conditions, the sequence condition detection means 125 sets a result of the detection of the 2-3 sequence condition 'detfl' at a value of one (i.e., detfl=1). Otherwise, the sequence condition detection means 125 sets a result of the detection 'detfl' at a value of zero (i.e., detfl=0).

The sequence condition detection means 125 in the first embodiment detects a field meeting the sequence condition in accordance with the result of the detection of the frame still picture 'stl1', the count value of the successive frame motion pictures 'frcnt', the result of the detection of the field still picture 'filstl', and the count value of the successive field motion pictures 'filcnt'. However, the sequence condition detection means can also detect the 2-3 sequence condition, by detecting a field meeting only two conditions that the result of the detection of the frame still picture 'stl1' has a value of one (a frame still picture) and the count value of the successive frame motion pictures 'frcnt' until the previous field has a value of four.

The sequence phase determination means 127 receives the result of the detection of the frame still picture 'stl1' from the first still picture detection means 121*a* and the count value of the successive frame motion pictures 'frcnt' until the previous field from the first motion picture field counter 123, detects a phase of the 2-3 sequence of repetition of five fields as a unit, and outputs a count value 'seq' indicative of the phase of the five-field sequence and a 2-3 phase flag 'tcf23'.

The sequence phase counter 133 of the sequence phase determination means 127 receives the result of the detection of the frame still picture 'stl1' from the first still picture detection means 121*a* and the count value of the successive frame motion pictures 'frcnt' until the previous field from the first motion picture field counter 123. The sequence phase counter 133 repeatedly counts in each field from zero to four as a period of five fields, and in accordance with the result of the detection of the frame still picture 'stl1' and the count value of the successive frame motion pictures 'frcnt', resets the repetitive period counter. In other words, when the result of the detection of the frame still picture 'stl1' has a value of one (a frame still picture) and the count value of the successive frame motion pictures 'frcnt' until the previous field has a value of four, the sequence phase counter 133 determines that the field is a complete still picture field appearing once every five fields in the 2-3 pull-down signal and resets the counter value to zero. Thereafter the sequence phase counter 133 counts for each field when the result of the detection of the frame still picture 'stl1' has a value of one and until the count value of the successive frame motion pictures 'frcnt' has a value of four (i.e., while the count value 'seq' is between one and four inclusive).

Since the count value 'seq' of the sequence phase counter 133 is repeated at intervals of five fields and reset in synchronism with the complete still picture field appearing once every five fields in the 2-3 pull-down signal, the count value 'seq' indicates a phase of the 2-3 sequence. The count value 'seq' as the phase of the 2-3 sequence is sent to the interpolation-phase-flag generation means 134. The count value 'seq' is also outputted to the sequence shift detection means 139, the phase determination means 142, and the occurrence frequency detection means 52 of the reset detection means 128.

The interpolation-phase-flag generation means 134 of the sequence phase determination means 127 receives the count value 'seq' from the sequence phase counter 133 and generates a 2-3 phase flag 'tcf23' indicative of the direction of the field converted from the same frame in telecine interpolation processing. The count value 'seq' from the sequence phase counter 133 is a signal having a repetition of five fields as a unit and is synchronized with the phase of the 2-3 pull-down. Thus in order for the field direction upon interpolation to be indicated by the count value 'seq', for example, in the field phase of performing telecine interpolation processing from the preceding field in time, the 2-3 phase flag 'tcf23' is set at a value of one. In the field of performing telecine interpolation processing from the succeeding field in time, the 2-3 phase flag 'tcf23' is set at a value of zero. In this connection, the value of the 2-3 phase flag 'tcf23' is not limited to the above-mentioned values. Other values may be set so long as the values can distinguish between the telecine interpolation from the previous field and the telecine interpolation from the subsequent field. The 2-3 phase flag 'tcf23' outputted from the interpolation-phase-flag generation means 134 is sent to the pull-down determination means 17.

Next, the reset detection means 128 receives the results of the detection of the frame still picture 'stl1', 'stl2', and 'stl3' from the first, second, and third still picture detection means 121a, 121b, and 121c, the count value of the successive frame motion pictures 'frcnt' from the first motion picture field counter 123, the result of the detection of the field still picture 'filstl' from the field-still-picture detection means 122, the result of the detection of the field still picture 'filstl' from the second motion picture field counter 124, and the interframe motion-picture-element cumulative value 'mvfr' from the interframe correlation detection means 11. The reset detection means 128 also receives the count value 'seq' from the sequence phase counter 133 and the detection signal 'tci0' indicative of the result of the detection of the in-predetermined-area accumulation counter 23 by the sequence determination means 126. The reset detection means 128, in accordance with the received respective signals, detects a case where the input video signal does not meet the 2-3 sequence condition. When the input video signal does not meet the 2-3 sequence condition, the reset detection means generates a reset signal 'rst' for resetting the 2-3 sequence detection signal (i.e., for setting the input video signal not to be based on the 2-3 sequence) to output it. Explanation will be made as to each of blocks provided in the reset detection means 128.

The successive frame motion-picture detection means 135 of the reset detection means 128 receives the result of the detection of the frame still picture 'stl1' from the first still picture detection means 121a and the count value of the successive frame motion pictures 'frcnt' from the first motion picture field counter 123. The successive frame motion-picture detection means 135 detects a case where the count value of the successive frame motion pictures 'frcnt' has a value of four and the result of the detection of the frame still picture 'stl1' has a value of zero (a motion picture), and outputs a result of the detection. Since the same field is present once every five fields in the 2-3 pull-down signal, the number of the successive fields of the frame motion picture does not exceed five. Accordingly when the detected field is a motion picture element (i.e., stl1=0) based on the result of the detection of the frame still picture 'stl1' and the count value of the successive frame motion pictures 'frcnt' until the previous field is four (i.e., frcnt=4), this means that five fields of frame motion pictures are successive. For this reason, when the count value of the successive frame motion pictures 'frcnt' has a value of four and the result of the detection of the frame still picture 'stl1' has a value of zero (a frame motion picture), the successive frame motion-picture detection means outputs and sends a result of the detection of, for example, one as a signal indicative of reset of the 2-3 sequence detection signal to the reset signal generation means 144.

The successive field motion-picture detection means 136 of the reset detection means 128 receives the result of the detection of the field still picture 'filstl' from the field-still-picture detection means 122 and the count value of the successive field motion pictures 'filcnt' from the second motion picture field counter 124. The successive field motion-picture detection means 136 detects a case where the count value of the successive field motion pictures 'filcnt' has a value of one and the result of the detection of the field still picture 'filstl' has a value of zero (a motion picture), and outputs a result of the detection. In the 2-3 pull-down signal, since two frames are converted respectively to two and three fields and a field next to the field motion picture is a field still picture, the number of the successive fields of the field motion pictures does not exceed two. Accordingly, when the detected field is a motion picture based on the result of the detection of the field still picture 'filstl' (i.e., filstl=0) and the count value of the successive field motion pictures 'filcnt' until the previous field has a value of one (i.e., filcnt=1), this means that two motion picture fields are successive. For this reason, when the count value of the successive field motion pictures 'filcnt' has a value of one and the result of the detection of the field still picture 'filstl' has a value of zero (a field motion picture), the successive field motion-picture detection means 136 outputs and sends a result of the detection of, for example, one as a signal indicative of reset of the 2-3 sequence detection signal to the reset signal generation means 144.

The successive still-picture detection means 137 of the reset detection means 128 receives the result of the detection of the frame still picture 'stl2' from the second still picture detection means 121b. The successive still-picture detection means 137, in accordance with the result of the detection of the frame still picture 'stl2', counts the number of the successive fields of the frame motion pictures. More specifically, the successive still-picture detection means 137 resets the count value to zero when the result of the detection of the frame still picture 'stl2' has a value of zero (motion picture), and counts a case where the result of the detection of the frame still picture 'stl2' has a value of one (still picture). The count value of the successive still-picture detection means 137 is outputted to the comparison means 138 of the reset detection means 128.

The comparison means 138 of the reset detection means 128 receives the count value of the successive still pictures from the successive still-picture detection means 137, compares the count value of the successive still pictures with a predetermined threshold, and detects a case where the count value of the successive still pictures is not smaller than the predetermined threshold. When the successive frame still pictures count is not smaller than the predetermined threshold, the comparison means 138 sends a result of the detection of, for example, a value of one as a signal indicative of reset of the 2-3 sequence detection signal to the reset signal generation means 144. With respect to the predetermined threshold for comparison, when a repetition sequence of, for example, five fields in the 2-3 pull-down signal is considered and thus the number of the successive fields of the frame motion pictures is five or higher, the comparison means 138 outputs the result of the detection of a value of one to the reset signal generation means 144.

During detection of the 2-3 sequence, the sequence shift detection means 139 of the reset detection means 128 detects the presence of a frame still picture in a field in the course of a sequence different from a frame still picture appearing once every five fields to detect a shift in the phase of the field sequence. The sequence shift detection means 139 includes the in-sequence still-picture counter 140 and the comparison means 141.

The in-sequence still-picture counter 140 receives the result of the detection of the frame still picture 'stl3' from the third still picture detection means 121*c*, the count value 'seq' from the sequence phase counter 133, and the 2-3 sequence detection signal 'tci0' from the sequence determination means 126. When the 2-3 sequence detection signal 'tci0' from the sequence determination means 126 indicates the 2-3 sequence, the in-sequence still-picture counter 140 counts the field corresponding to a value of one (a still picture) of the result of the detection of the frame still picture 'stl3' received from the third still picture detection means 121*c*. However, the counting of fields forming the frame still picture is carried out at intervals of one period of the count value 'seq' synchronized with the 2-3 sequence phase, and the count value is reset to zero at a position of a frame still picture appearing once every five fields. Thus the in-sequence still-picture counter 140 detects fields of the frame still picture in the sequence which is different from the field at the position of the frame still picture appearing once every five fields in the 2-3 pull-down signal, and outputs the number of such fields. The count value of the in-sequence still-picture counter 140 is outputted to the comparison means 141 of the sequence shift detection means 139.

The comparison means 141 of the sequence shift detection means 139 compares the count value from the in-sequence still-picture counter 140 with a predetermined threshold. When the count value is not smaller than the predetermined threshold, the comparison means 141 outputs a result of the detection of the frame still picture in the course of the sequence of five fields as a signal (e.g., a value of one) indicative of reset of the 2-3 sequence detection signal. In the case of the 2-3 pull-down signal, a complete frame still picture appears once every five fields. Thus, when the comparison means detects the presence of a frame still picture at a field different from the complete frame still picture in the course of the sequence, the comparison means 141 can determine that the sequence is changed, the regularity of the sequence is disturbed, and the 2-3 pull-down phase is shifted. Thus the comparison means 141 outputs the result of the detection as a result of the detection 'dbe' indicative of a shift in the 2-3 pull-down phase. In this case, the predetermined threshold in the comparison of the comparison means 141 is set at, for example, a value of one. The output 'dbe' from the comparison means 141 of the sequence shift detection means 139 is outputted to the reset signal generation means 144.

The phase determination means 142 of the reset detection means 128 receives the result of the detection of the frame still picture 'stl1' from the first still picture detection means 121*a* and the count value 'seq' from the sequence phase counter 133. The phase determination means 142 detects the presence of a frame motion picture at the position of the field of the frame still picture appearing once every five fields of the 2-3 sequence. In other words, the phase determination means 142 detects a case where the result of the detection of the frame still picture 'stl1' has a value of zero (a motion picture) at the position of the frame still picture appearing once every five fields at intervals of one period of the count value 'seq' synchronized with the 2-3 sequence phase, and outputs a result of the detection 'dph'. In the 2-3 pull-down signal, a frame still picture appears once every five fields. However, when the detected field based on the result of the detection of the frame still picture 'stl1' is a motion picture (i.e., stl1=0), this means that the phase was shifted from the 2-3 sequence. Accordingly, when the result of the detection of the frame still picture 'stl1' has a value of zero (a frame motion picture) at the position of a frame still picture appearing once every five fields in the 2-3 pull-down signal, the phase determination means sends the result of the detection 'dph' of, for example, a value of one as a signal indicative of reset of the 2-3 sequence detection signal to the reset signal generation means 144.

The scene change detection means 143 of the reset detection means 128 receives the interframe motion-picture-element cumulative value 'mvfr' from the interframe correlation detection means 11. The scene change detection means 143 compares the interframe motion-picture-element cumulative value 'mvfr' with a predetermined threshold 'STH', and detects a scene change in the field in accordance with a result of the comparison.

In this case, an editing point in a video signal is generally a scene change with a high possibility. Thus most picture elements in the field are determined as motion picture elements. For this reason, the interframe motion-picture-element cumulative value 'mvfr' based on the interframe difference information is changed more largely than a value in the commonly-used sequence.

When the interframe motion-picture-element cumulative value 'mvfr' is larger than the predetermined threshold 'STH' (i.e., when the number of the motion picture elements in one field is larger than a predetermined threshold), the scene change detection means 143 determines the presence of a scene change in the field, and outputs a result of the detection of the scene change 'sch' having a value of one. Otherwise, the scene change detection means 143 outputs the result of the detection of the scene change 'sch' having a value of zero to the reset signal generation means 144.

The reset signal generation means 144 of the reset detection means 128 receives the result of the detection of a count value of the successive frame motion pictures from the successive frame motion-picture detection means 135, the result of the detection of a count value of the successive field motion pictures from the successive field motion-picture detection means 136, a result of the detection of a count value of the successive still pictures from the comparison means 138, the signal 'dbe' indicative of a phase shift of the sequence from the sequence shift detection means 139, the result of the detection 'dph' from the phase determination means 142, and the result of the detection of the scene change 'sch' from a scene change detection means 143. When a changeover from the 2-3 pull-down signal or a phase shift takes place or when the 2-3 sequence condition are not satisfied, the reset signal generation means 144 generates a reset signal to reset the 2-3 sequence detection signal (i.e., to set the 2-3 sequence detection signal at a value indicating that the input video signal does not meet the 2-3 sequence condition) in accordance with any of the received results of the detecting. For example, when any one or more of the result of the detection of a count value of the successive frame motion pictures from the successive frame motion-picture detection means 135, the result of the detection of a count value of the successive field motion pictures from the successive field motion-picture detection means 136, the result of the detection of a count value of the successive still pictures from the comparison means 138, the result of the detection 'dph' from the phase determination means 142, the signal 'dbe' indicative of the phase shift of the sequence from the sequence shift detection means 139, and the result of the detection of the scene change 'sch' from the scene change detection means 143, have a value of one; the reset signal generation means 144 sets the reset signal 'rst' at a value of one. Otherwise, the reset signal generation means 144 sets the reset signal 'rst' at a value of zero. In this case, in any of situations when a predetermined number of the successive frame motion or still picture fields (five fields) are detected, when successive two fields of motion picture fields were successive, when a frame motion picture was detected with the phase of a frame still picture, when the 2-3 pull-down phase was shifted during detection of the 2-3 pull-down signal, and when a scene change was detected, the reset signal generation means 144 sets the reset signal 'rst' at a value of one.

The generation of the reset signal 'rst' in the reset signal generation means 144 is not limited to the above-mentioned condition. For example, when a plurality of results including the result of the detection of a count value of the successive frame motion pictures from the successive frame motion-picture detection means 135, the result of the detection of a count value of the successive field motion pictures from the successive field motion-picture detection means 136, the result of the detection of a count value of the successive still pictures of the comparison means 138, the result of the detection 'dph' from the phase determination means 142, the signal 'dbe' indicative of the phase shift of the sequence from the sequence shift detection means 139, and the result of the detection of the scene change 'sch' from the scene change detection means 143, has a value of one respectively, and when any two or more of the result of the detections of the above-mentioned plurality of results have a value of one; the reset signal generation means 144 may output the reset signal 'rst' having a value of one. In accordance with the result of the detection of a count value of the successive frame motion pictures from the successive frame motion-picture detection means 135, the result of the detection of a count value of the successive field motion pictures from the successive field motion-picture detection means 136, the result of the detection of a count value of the successive still pictures of the comparison means 138, the result of the detection 'dph' from the phase determination means 142, and the result of the detection of the scene change 'sch' from the scene change detection means 143; when successive predetermined frame motion or still picture fields (five fields) were detected, when successive two fields of motion picture fields were detected, when a frame motion picture was detected with the phase of the frame still picture, or when a scene change was detected; the reset signal generation means can set the reset signal 'rst' at a value of one as output condition.

The sequence determination means 126 receives the result of the detection of the 2-3 sequence condition 'detfl' from the sequence condition detection means 125 and the reset signal 'rst' from the reset signal generation means 144 of the reset detection means 128. The sequence determination means 126 detects the repetition of the 2-3 sequence condition from the result of the detection of the 2-3 sequence condition 'detfl', determines whether or not to be the 2-3 sequence, and outputs a 2-3 sequence detection signal 'tci0' indicative of a result of the 2-3 sequence detection. Explanation will be made as to each of the blocks provided in the sequence determination means 126.

The telecine startup counter 131 of the sequence determination means 126 receives the result of the detection of the 2-3 sequence condition 'detfl' from the sequence condition detection means 125 and the reset signal 'rst' from the reset signal generation means 144 of the reset detection means 128 as a reset signal. In accordance with the result of the detection of the 2-3 sequence condition 'detfl', when detecting fields meeting the 2-3 sequence condition, that is, when detecting five fields of the 2-3 sequence, the telecine startup counter 131 counts. When the reset signal 'rst' from the reset signal generation means 144 has a value of one (i.e., rst=1), the telecine startup counter 131 resets the count value of the 2-3 sequence 'oncnt' to zero. In other words, when the value of the result of the detection of the 2-3 sequence condition 'detfl' has a value of one, the telecine startup counter 131 detects the sequence condition of the five fields in the 2-3 pull-down signal, and counts the number of times of repetition of the fields when the result of the detection of the 2-3 sequence condition 'detfl' has a value of one. The telecine startup counter 131, when receiving the reset signal 'rst' having a value of one from the reset signal generation means 144, determines that the input video signal is not a 2-3 pull-down signal, and sets the count value at a value of zero. After resetting the count value by the reset signal 'rst', the telecine startup counter 131 again waits for an input of a field when the result of the detection of the 2-3 sequence condition 'detfl' has again a value of one, starts counting number of times of repetition of the sequence from zero. The count value of the 2-3 sequence 'oncnt' from the telecine startup counter 131 is outputted to the sequence-detection-signal generation means 132.

The sequence-detection-signal generation means 132 receives the count value of the 2-3 sequence 'oncnt' from the telecine startup counter 131. The sequence-detection-signal generation means 132 compares the count value of the 2-3 sequence 'oncnt' from the telecine startup counter 131 with a predetermined threshold (referred to as a startup count value) 'TH1'. When the count value of the 2-3 sequence 'oncnt' is not smaller than the startup count value 'TH1', that is, when five fields of the 2-3 sequence is detected continuously by a predetermined number of times, the sequence-detection-signal generation means 132 sets the 2-3 sequence detection signal 'tci0' indicative of a result of the 2-3 sequence detection at a value of one. When the count value of the 2-3 sequence 'oncnt' is smaller than the startup count value 'TH1', the sequence-detection-signal generation means 132 sets the detection signal 'tci0' at a value of zero and outputs it. The situations when the 2-3 sequence detection signal 'tci0' has a value of zero include a situation when the 2-3 sequence is not counted (when the 2-3 sequence detection signal is not a 2-3 pull-down signal) and a situation when the startup count value was reset to zero before being detected. The startup count value 'TH1' indicates number of times of repetition of the sequence until the input video signal is detected as the 2-3 sequence and a count value until the 2-3 sequence detection signal 'tci0' is started. In this connection, the value of the 2-3 sequence detection signal is not limited to the above-mentioned example. For example, another value may be employed so long as the value can distinguish between the situation when the 2-3 sequence is detected continuously by a predetermined number of times and the other situation. The 2-3 sequence detection signal 'tci0' which is the output of the sequence-detection-signal generation means 132 is sent to the sequence shift detection means 139 and also to the 2-3 predictive control means 53.

Referring to FIG. 7, next, the occurrence frequency detection means 52 of the 2-3 sequence detection means 15 receives the result of the detection of the 2-3 sequence condition 'detfl' outputted from the 2-3 field sequence detection means 51, the result of the detection of the frame still picture 'stl1', and the count value of the 2-3 sequence phase 'seq'. The occurrence frequency detection means 52 determines whether or not the input video signal satisfies the 2-3 sequence condition (i.e., the certainty of being the 2-3 pull-down signal), by monitoring the sequence of the input video signal, thereby detecting an occurrence frequency of the 2-3 sequence.

Figure 11:
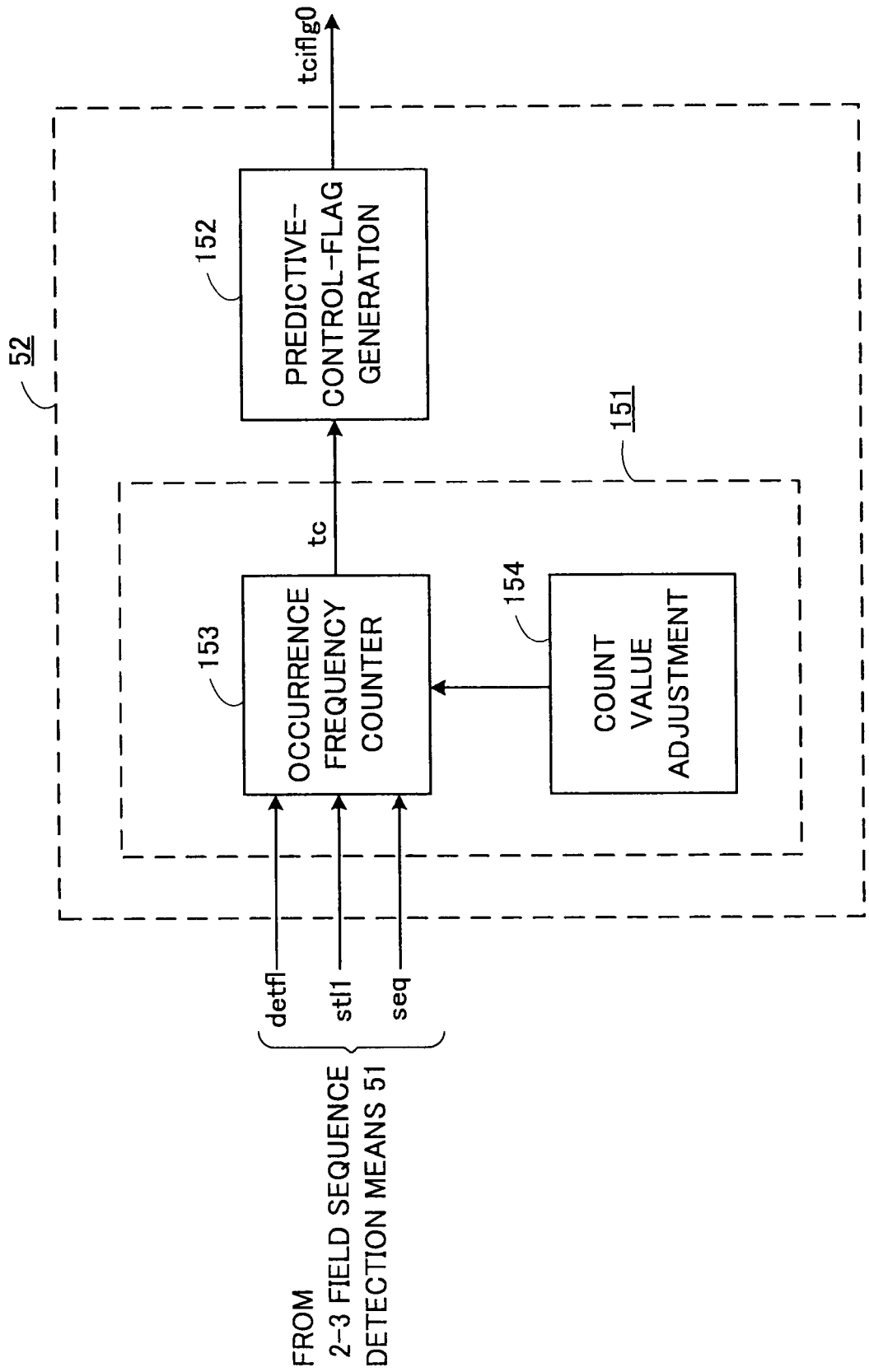
FIG. 11 is a block diagram showing an exemplary configuration of an occurrence frequency detection means of the 2-3 sequence detection means in the video signal processing apparatus according to the first embodiment.

FIG. 11 is a block diagram showing an exemplary configuration of the occurrence frequency detection means 52 in the first embodiment. Referring to FIG. 11, the occurrence frequency detection means 52 receives the result of the detection of the 2-3 sequence condition 'detfl', the result of the detection of the frame still picture 'stl1', and the count value of the 2-3 sequence phase 'seq' from the 2-3 field sequence detection means 51. However, the occurrence frequency detection means 52 may include similar means for obtaining the result of the detection of the 2-3 sequence condition 'detfl', the result of the detection of the frame still picture 'stl1', and the count value of the 2-3 sequence phase 'seq' in the 2-3 field sequence detection means 51. In this case, the occurrence frequency detection means 52 receives the interframe motion-picture-element cumulative value 'mvfr' from the interframe correlation detection means 11 and the interfield motion-picture-element cumulative value 'mvfil' from the interfield correlation detection means 12 and detects conditions for the 2-3 sequence detection.

The following explanation will be made in connection with a case where the occurrence frequency detection means 52 receives the result of the detection of the 2-3 sequence condition 'detfl', the result of the detection of the frame still picture 'stl1', and the count value of the 2-3 sequence phase 'seq' from the 2-3 field sequence detection means 51.

As shown in FIG. 11, the occurrence frequency detection means 52 of the 2-3 sequence detection means 15 in the first embodiment includes a sequence-determination number-of-times detection means 151 and a predictive-control-flag generation means 152. The sequence-determination number-of-times detection means 151 monitors the 2-3 sequence condition in the input video signal for a relatively long period of time (a field), and counts the number of times of determining that the input video signal satisfies 2-3 sequence condition. The sequence-determination number-of-times detection means 151 includes an occurrence frequency counter 153 and a count value adjustment means 154. The predictive-control-flag generation means 152 compares a count value 'tc' outputted from the sequence-determination number-of-times detection means 151 with a predetermined threshold 'PTH1', and outputs a result of the comparison as a predictive control signal 'tciflg0' which is an index indicative of a certainty that the input video signal is a 2-3 pull-down signal (i.e., determines a certainty of being a 2-3 pull-down signal and outputs a result of the determination).

First of all, the sequence-determination number-of-times detection means 151 receives the result of the detection of the 2-3 sequence condition 'detfl', the result of the detection of the frame still picture 'stl1', and the count value of the 2-3 sequence phase 'seq', which are outputted from the 2-3 field sequence detection means 51. The sequence-determination number-of-times detection means 151 monitors the 2-3 sequence condition in the input video signal throughout a relatively long field and counts the number of times of determining that the input video signal satisfies 2-3 sequence condition. The sequence-determination number-of-times detection means 151 adds a predetermined value to the count value when the 2-3 sequence condition are detected and, on the other hand, subtracts a predetermined value from the count value when the 2-3 sequence condition are not detected at intervals of five fields and the determination that the input video signal is a signal of the 2-3 sequence is not made.

The occurrence frequency counter 153 of the sequence-determination number-of-times detection means 151 receives the result of the detection of the 2-3 sequence condition 'detfl', the result of the detection of the frame still picture 'stl1', and the count value of the 2-3 sequence phase 'seq', which are outputted from the 2-3 field sequence detection means 51, and also receives a set value established by the count value adjustment means 154.

The occurrence frequency counter 153 is an up/down counter which adds a predetermined value 'Ad' or subtracts a predetermined value 'Su' in accordance with the result of the detection of the 2-3 sequence condition 'detfl', the result of the detection of the frame still picture 'stl1', and the count value of the 2-3 sequence phase 'seq'. The occurrence frequency counter 153 monitors the 2-3 sequence condition in the input video signal throughout a relatively long period of time (a field), and counts the number of times of determining that the input video signal satisfies 2-3 sequence condition. When fields satisfying the 2-3 sequence condition were detected, that is, when the result of the detection of the 2-3 sequence condition 'detfl' has a value of one, the occurrence frequency counter 153 adds the predetermined value 'Ad' to the count value 'tc' (i.e., tc←tc+Ad). Even when the field is in the phase of the fifth field (i.e., the count value of the 2-3 sequence phase 'seq' has a value of zero and the field is at the position of a frame still picture appearing once every five fields) but when the result of the detection of the frame still picture 'stl1' has a value of zero (a frame motion picture) and the determination that the input video signal is a signal of the 2-3 sequence is not made; the occurrence frequency counter 153 subtracts the predetermined value 'Su' from the count value 'tc' (i.e., tc←tc−Su). When the field is in the phase of the fifth field (a count value 'seq' is zero) and the result of the detection of the frame still picture 'stl1' has a value of one (i.e., in the case of a frame still picture), the occurrence frequency counter 153 does not add nor subtract the count value 'tc' (i.e., tc←tc±0) even when the result of the detection of the 2-3 sequence condition 'detfl' has a value of zero and the 2-3 sequence condition are not detected. This is because the result of the detection of the frame still picture 'stl1' has a value of one at the position of a field still picture appearing once every five fields, it cannot be determined whether or not to be the 2-3 sequence.

The count value adjustment means 154 adjust a balance ratio between the addition value 'Ad' and the subtraction value 'Su' in the count value of the occurrence frequency counter 153. For example, the count value adjustment means 154 outputs to the occurrence frequency counter 153 a value corresponding to the subtraction value 'Su' when the addition value 'Ad' is one. By making the subtraction value 'Su' when the input video signal is determined not to meet the 2-3 sequence condition larger than the addition value 'Ad' when the input video signal is determined to meet the 2-3 sequence condition, an up/down variation width in the count value of the number of times of the sequence determination can be adjusted. In other words, the balance ratio between the addition value 'Ad' and the subtraction value 'Su' to be set by the count value adjustment means 154 enables adjustment of a degree of determining that the input video signal satisfies 2-3 sequence condition. The addition value and the subtraction value in the count value of the occurrence frequency counter 153 are set in accordance with the value outputted from the count value adjustment means 154.

The count value (count value of the occurrence frequency) 'tc' which is the number of times of the sequence determination of the occurrence frequency counter 153 is sent to the predictive-control-flag generation means 152.

Next, the predictive-control-flag generation means 152 receives the count value of the occurrence frequency 'tc' from the sequence-determination number-of-times detection means 151, determines a certainty of being the 2-3 pull-down signal, and outputs a predictive control signal 'tciflg0' indicative of a result of the determination whether the input video signal has a certainty of being the 2-3 pull-down signal.

The predictive-control-flag generation means 152 receives the count value of the occurrence frequency 'tc' from the occurrence frequency counter 153. The predictive-control-flag generation means 152 compares the count value of the occurrence frequency 'tc' from the occurrence frequency counter 153 with a predetermined threshold (an effective count value) 'PTH1', and determines a certainty of being the 2-3 pull-down signal. The predictive-control-flag generation means 152 compares the count value of the occurrence frequency 'tc' with the effective count value 'PTH1', and when the count value of the occurrence frequency 'tc' is not smaller than the effective count value 'PTH1', determines as the 2-3 pull-down signal, and sets the predictive control signal 'tciflg0' at a value of one. When the count value of the occurrence frequency 'tc' is smaller than the effective count value 'PTH1', the predictive-control-flag generation means 152 determines not to be likely to be the 2-3 pull-down signal, does not generate the predictive control signal 'tciflg0', and sets the predictive control signal 'tciflg0' at a value of zero. The predictive control signal 'tciflg0' which is the output of the predictive-control-flag generation means 152 is sent to the 2-3 predictive control means 53.

The effective count value 'PTH1' in the predictive-control-flag generation means 152 is a count value which is used to set an occurrence frequency (number of times of the 2-3 sequence determination) until determined as the 2-3 pull-down signal for the count value of the occurrence frequency 'tc' outputted from the occurrence frequency counter 153 and to determine a certainty of being the 2-3 pull-down signal. With use of the effective count value 'PTH1', a time until determined as the 2-3 pull-down signal can be adjusted.

Referring to FIG. 7, next, the 2-3 predictive control means 53 of the 2-3 sequence detection means 15 receives the 2-3 sequence detection signal 'tci0' which is the output of the 2-3 field sequence detection means 51 and the predictive control signal 'tciflg0' outputted from the occurrence frequency detection means 52. The 2-3 predictive control means 53, in accordance with the predictive control signal 'tciflg0' indicative of a certainty of being the 2-3 pull-down signal determined in the occurrence frequency detection means 52, controls a result of the 2-3 sequence detection of the 2-3 field sequence detection means 51, and outputs a 2-3 pull-down detection signal 'tci23' indicative of detection of the 2-3 pull-down signal. As shown in FIG. 7, the 2-3 predictive control means 53 includes a selection means 54 for controlling the 2-3 sequence detection signal 'tci0' of the 2-3 field sequence detection means 51.

The selection means 54 of the 2-3 predictive control means 53 receives the 2-3 sequence detection signal 'tci0' which is the output of the 2-3 field sequence detection means 51 and the predictive control signal 'tciflg0' outputted from the occurrence frequency detection means 52, and in accordance with the predictive control signal 'tciflg0' received from the occurrence frequency detection means 52, switches between the 2-3 sequence detection signal 'tci0' from the occurrence frequency detection means 52 and a fixed signal. When receiving the predictive control signal 'tciflg0' having a value of one, the selection means 54 determines it as the 2-3 pull-down signal, selects the 2-3 sequence detection signal 'tci0' received from the 2-3 field sequence detection means 51, and outputs a 2-3 pull-down detection signal 'tci23' indicative of detection of the 2-3 pull-down signal. When the predictive control signal 'tciflg0' has a value of zero, on the other hand, this means that determination is made not to be likely to be the 2-3 pull-down signal or the time is in a field period (a time until the count value of the occurrence frequency 'tc' becomes not smaller than the effective count value 'PTH1') until determined as the 2-3 pull-down signal. Thus, the selection means 54 selects not the 2-3 sequence detection signal 'tci0' received from the 2-3 field sequence detection means 51 but the fixed value 'tci23' (having a value of zero). At this time, even when the 2-3 sequence detection signal 'tci0' temporarily satisfies the commonly-used 2-3 sequence condition and the 2-3 sequence detection signal 'tci0' has a value of one, the telecine interpolation processing is not started.

The 2-3 pull-down detection signal 'tci23' indicative of detection of the 2-3 pull-down signal controlled by the 2-3 predictive control means 53 is sent to the pull-down determination means together with the 2-3 phase flag 'tcf23' received from the 2-3 field sequence detection means 51.

Next, explanation will be made as to the configuration of the 2-2 sequence detection means 16 of the pull-down sequence detection means 14 in FIG. 1. The 2-2 sequence detection means 16 receives the interframe motion-picture-element cumulative value 'mvfr' and the motion-picture-element cumulative difference value 'dfmvfr' from the interframe correlation detection means 11 and the interfield motion-picture-element cumulative value 'mvfil' from the interfield correlation detection means 12. In accordance with the interframe motion-picture-element cumulative value 'mvfr', the motion-picture-element cumulative difference value 'dfmvfr', and the interfield motion-picture-element cumulative value 'mvfil' and in accordance with two-field repetition condition of a 2-2 pull-down signal; the 2-2 sequence detection means 16 detects whether or not to be the 2-2 pull-down signal, detects an occurrence frequency of the 2-2 pull-down sequence, determines a certainty, and predictively controls the result of the detection of the 2-2 pull-down signal. The 2-2 sequence detection means 16 sets a value of a 2-2 pull-down detection signal 'tci22' (e.g., sets to be tci22=1 when detecting that the input video signal is a 2-2 pull-down signal and sets to be tci22=0 when detecting that the input video signal is not a 2-2 pull-down signal), and outputs a 2-2 phase flag 'tcf22' indicative of the phase of the 2-2 pull-down (e.g., tcf22=1 when the previous field is the same field and tcf22=0 when the subsequent field is the same field).

Figure 12:
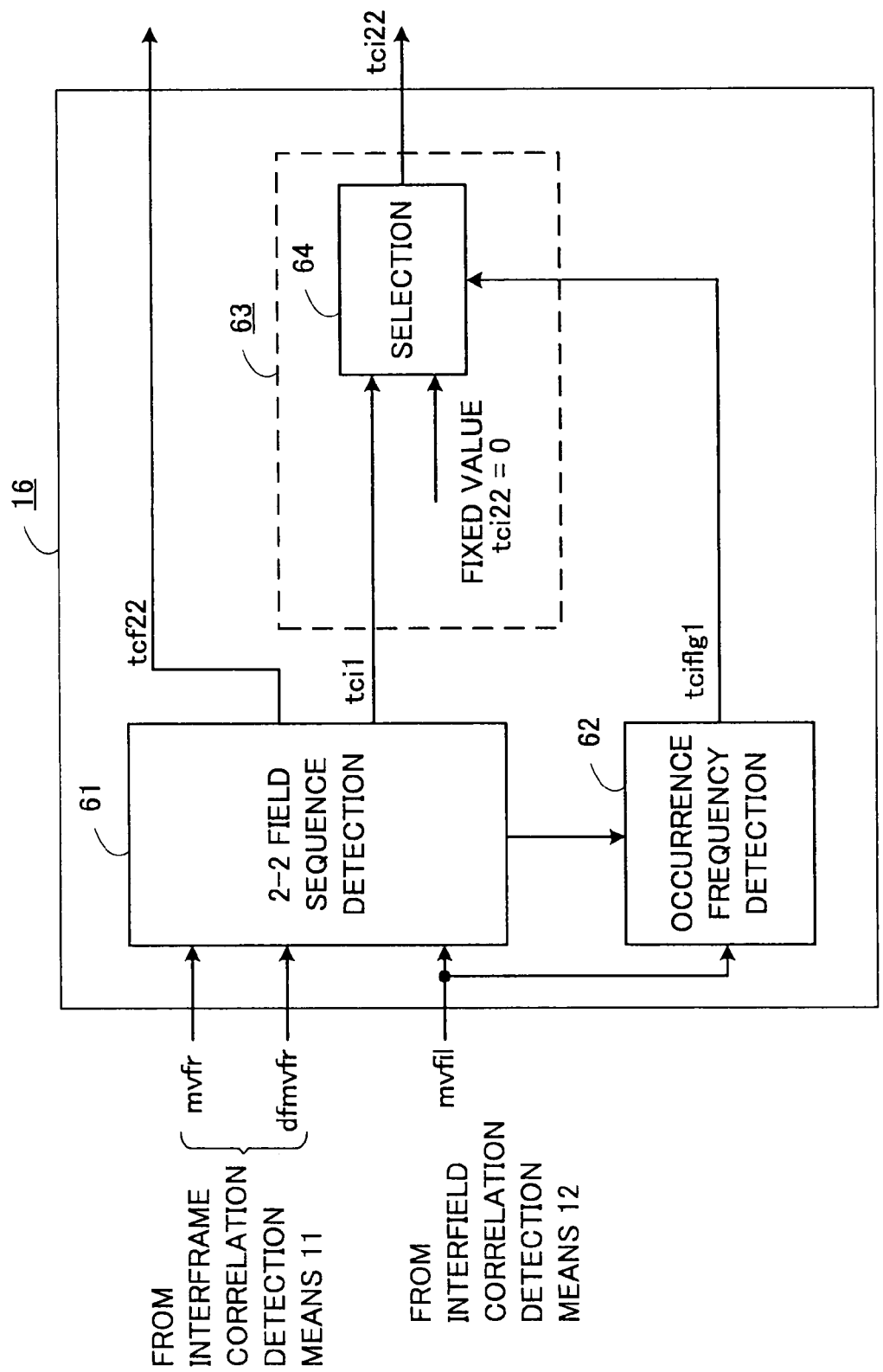
FIG. 12 is a block diagram showing an exemplary configuration of a 2-2 sequence detection means in the video signal processing apparatus according to the first embodiment.

FIG. 12 is a block diagram showing an exemplary configuration of the 2-2 sequence detection means 16 of the pull-down sequence detection means 14 in the first embodiment. Referring to FIG. 12, the 2-2 sequence detection means 16 in the first embodiment includes a 2-2 field sequence detection means 61, an occurrence frequency detection means 62, and a 2-2 predictive control means 63.

The 2-2 field sequence detection means 61 of the 2-2 sequence detection means 16 receives the interframe motion-picture-element cumulative value 'mvfr' and the motion-picture-element cumulative difference value 'dfmvfr' that are sent from the interframe correlation detection means 11, and the interfield motion-picture-element cumulative value 'mvfil' sent from the interfield correlation detection means 12. The 2-2 field sequence detection means 61 determines whether or not the field is a field still picture for each of the received interframe motion-picture-element cumulative value 'mvfr' and the interfield motion-picture-element cumulative value 'mvfil'. The 2-2 field sequence detection means 61 also determines whether the field is a field included in the same frame in accordance with the motion-picture-element cumulative difference value 'dfmvfr', and in accordance with a result of the determination, detects whether or not the input video signal satisfies the repetition condition of a sequence of two fields, and also detects the phase of the 2-2 pull-down sequence.

Figure 13:
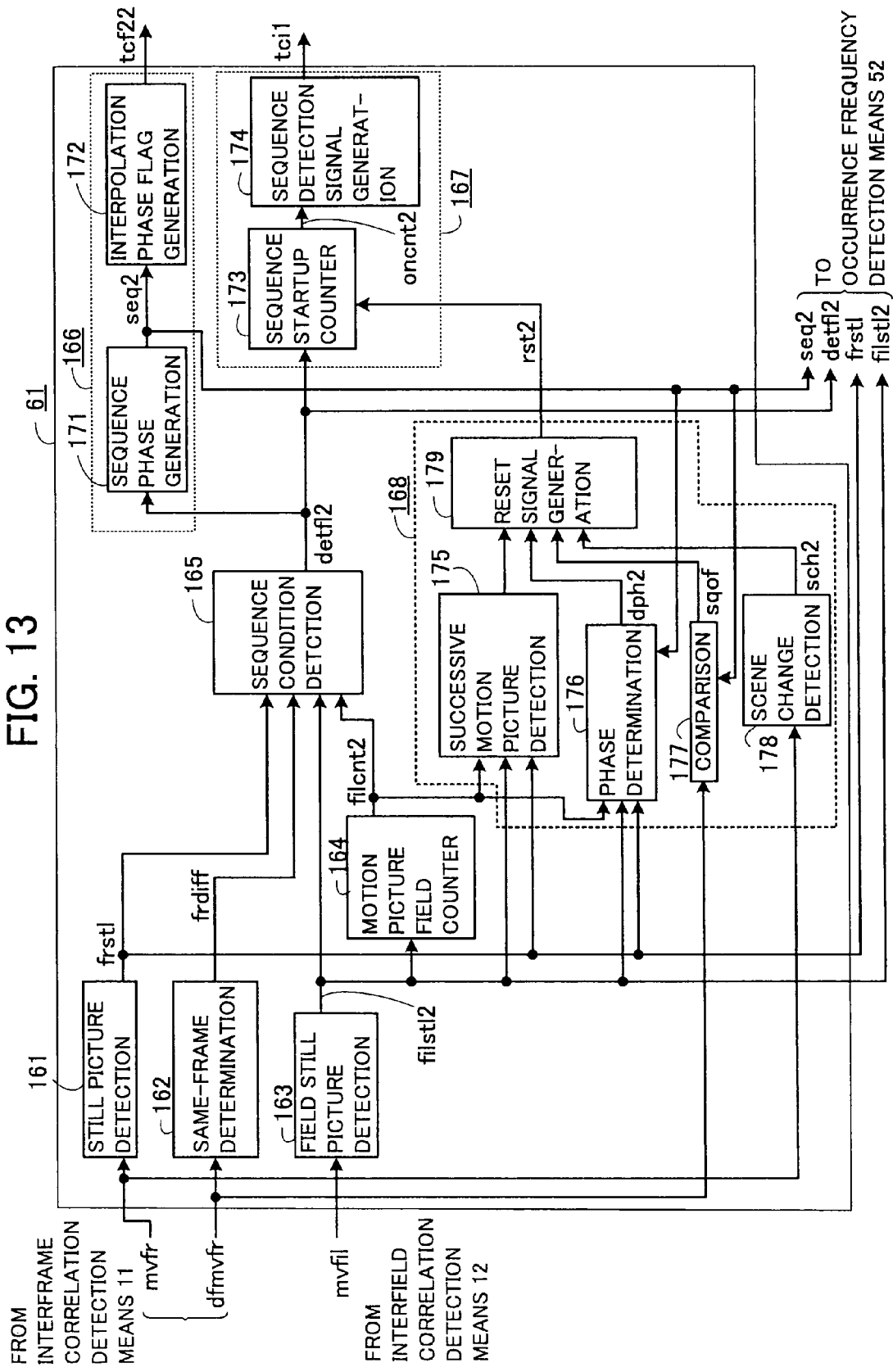
FIG. 13 is a block diagram showing an exemplary configuration of a 2-2 field sequence detection means of the 2-2 sequence detection means in the video signal processing apparatus according to the first embodiment.

FIG. 13 is a block diagram showing an exemplary configuration of the 2-2 field sequence detection means 61 of the 2-2 sequence detection means 16. As shown in FIG. 13, the 2-2 field sequence detection means 61 includes a still picture detection means 161, a same-frame determination means 162, a field-still-picture detection means 163, a motion picture field counter 164, a sequence condition detection means 165, a sequence determination means 167 which counts the number of times of repetition of the sequence and determines whether or not to be the sequence (hereinafter referred to as a 2-2 sequence) of the 2-2 pull-down signal, a sequence phase detection means 166 which detects the phase of the 2-2 sequence, and a reset detection means 168 which detects that the input video signal does not satisfies the sequence condition.

As shown in FIG. 13, the sequence determination means 167 of the 2-2 field sequence detection means 61 includes a sequence startup counter 173 and a sequence-detection-signal generation means 174. The sequence phase detection means 166 includes a sequence phase generation means 171 and an interpolation-phase-flag generation means 172. Further, the reset detection means 168 includes a successive motion-picture detection means 175, a phase determination means 176, a comparison means 177, a scene change detection means 178, and a reset signal generation means 179.

The 2-2 pull-down signal as a telecine video signal, in which one frame corresponds to two fields, has a sequence of repetition of two fields. In the case of the 2-2 pull-down signal, the interframe motion-picture-element cumulative value 'mvfr' based on the interframe difference information indicates that, when the signal is a motion video signal, fields each having large number of the motion picture elements are successive. Further, the motion-picture-element cumulative difference value 'dfmvfr' as a difference in interframe motion-picture-element cumulative value between fields indicates that a field having a relatively small number of the motion picture elements not larger than a predetermined value is present at intervals of once every two fields. Between adjacent fields converted from the same frame of the 2-2 pull-down signal, the motion-picture-element cumulative difference value 'dfmvfr' has a relatively small value.

Figure 14:
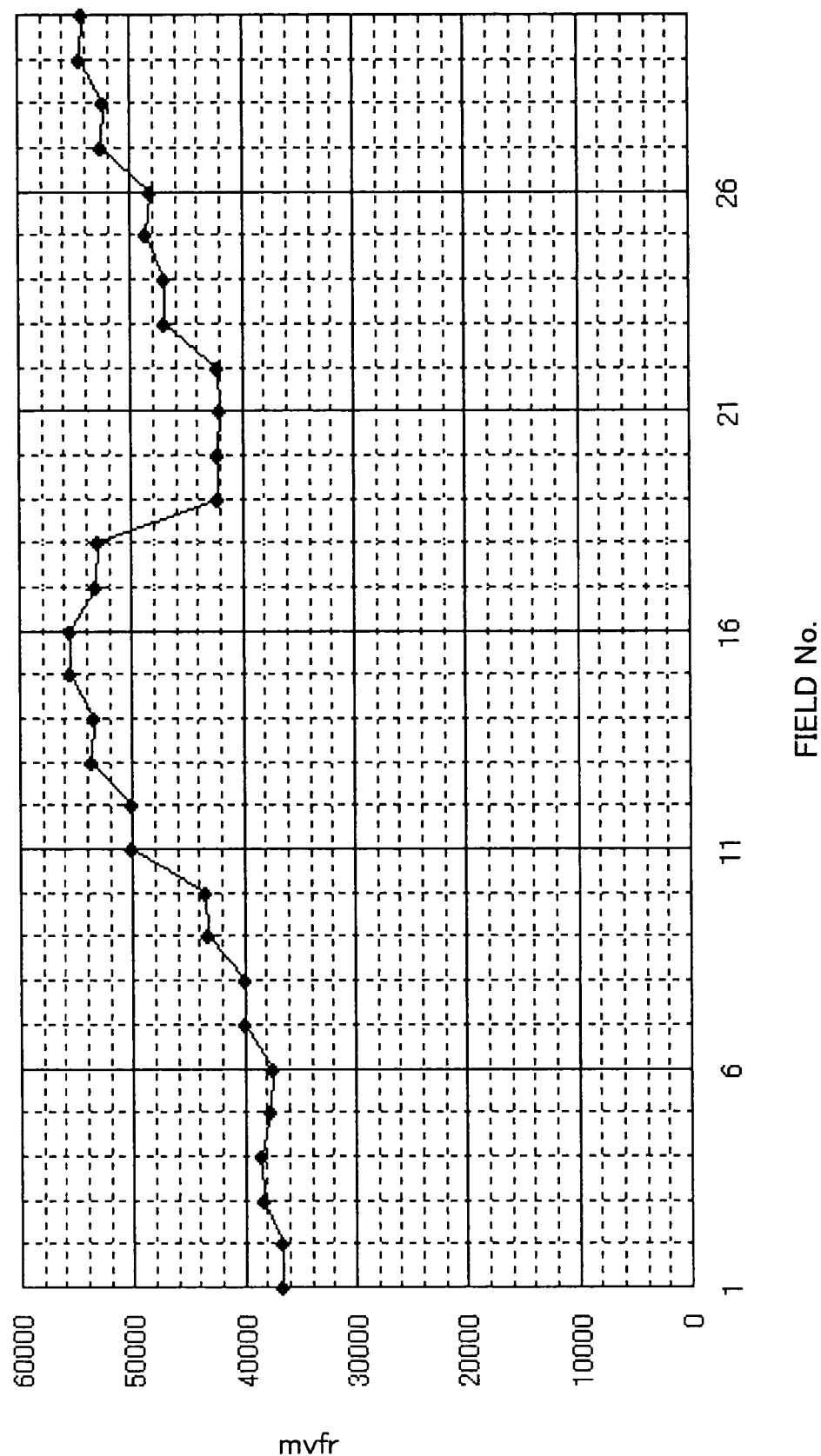
FIG. 14 is a diagram showing a relationship (in the case of a 2-2 pull-down signal) between the interframe motion-picture-element cumulative value 'mvfr' (a vertical axis) outputted from the interframe correlation detection means and a field number (a horizontal axis) in the video signal processing apparatus according to the first embodiment.

FIG. 14 is a diagram showing a relationship between the interframe motion-picture-element cumulative value 'mvfr' (a vertical axis) outputted from the interframe correlation detection means 11 and a field number (time, i.e., horizontal axis) when an input video signal is a 2-2 pull-down signal. Referring to FIG. 14, a picture simulation is shown when a field picture from the 2-2 pull-down signal is processed by the interframe correlation detection means 11. As shown in FIG. 14, the interframe motion-picture-element cumulative value 'mvfr' indicates that successive fields (each referred to as a motion picture field) each having large number of the motion picture elements.

Figure 15:
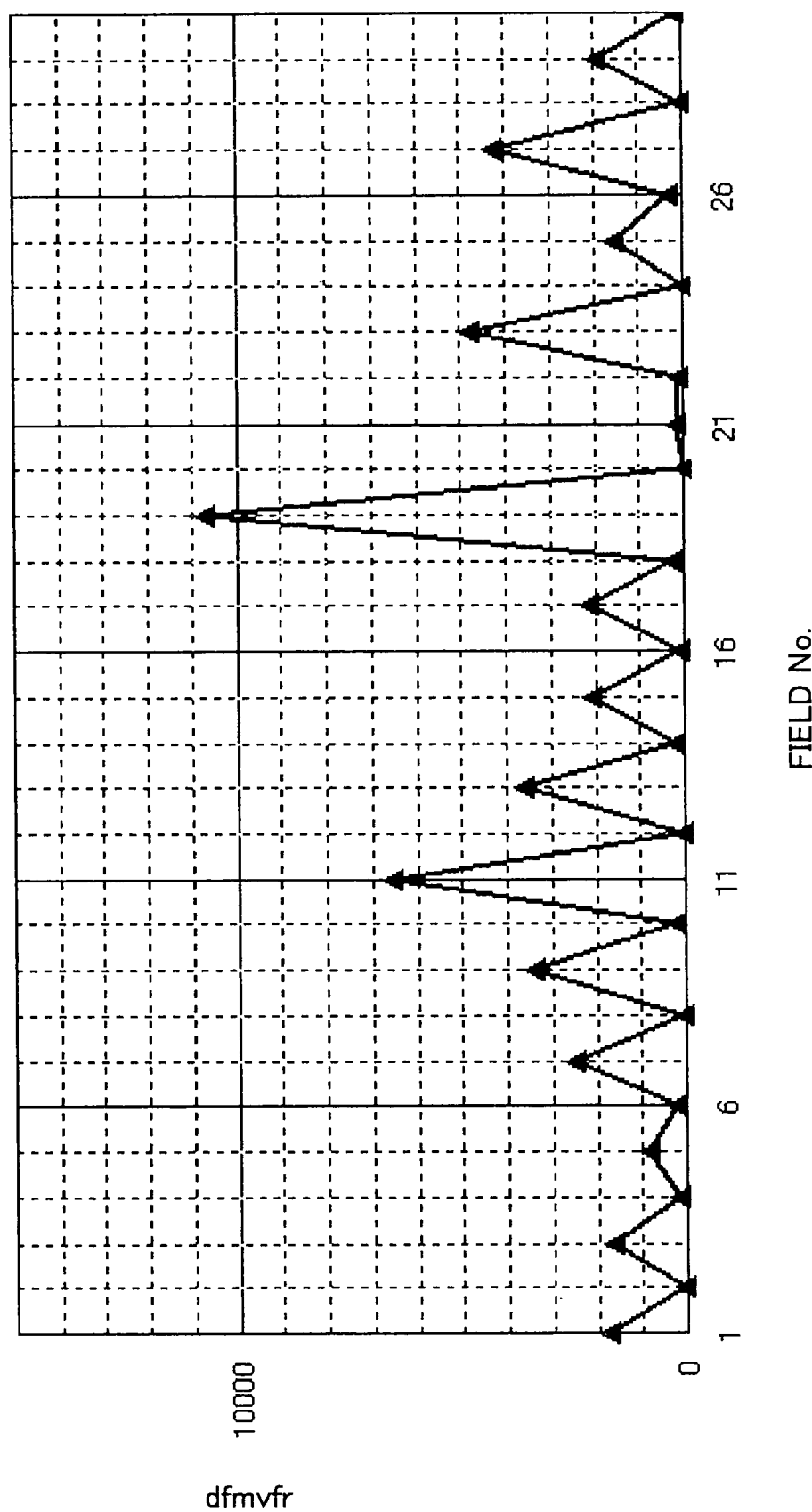
FIG. 15 is a diagram showing a relationship (in the case of a 2-2 pull-down signal) between a motion-picture-element cumulative difference value 'dfmvfr' (a vertical axis) outputted from the interframe correlation detection means and a field number (a horizontal axis) in the video signal processing apparatus according to the first embodiment.

FIG. 15 is a diagram showing a relationship between the motion-picture-element cumulative difference value 'dfmvfr' (a vertical axis) outputted from the interframe correlation detection means 11 and a field number (time, i.e., horizontal axis). Referring to FIG. 15, a picture simulation is shown when field pictures from the 2-2 pull-down signal are processed by the interframe correlation detection means 11 as in the similar manner to the case shown in FIG. 14. Referring to FIG. 15, as shown by the points of field Nos. 2, 4, . . . , 30, the motion-picture-element cumulative difference value 'dfmvfr' indicates that fields having a value of zero or not larger than a predetermined value are repeated at intervals of two fields.

Further, in the fields (i.e., field Nos. 2, 4, . . . , 30 in FIG. 15) having a relatively small value of the motion-picture-element cumulative difference value 'dfmvfr' at intervals of two fields, there are the fields (still pictures) having the interfield motion-picture-element cumulative value 'mvfil' based on the interfield difference information having a value of zero or not larger than a predetermined value. Furthermore, in the previous fields, there are the fields (motion pictures) having the interfield motion-picture-element cumulative value 'mvfil' having a value larger than the predetermined value. In other words, the motion picture field and the still picture field are alternately repeated.

Figure 16:
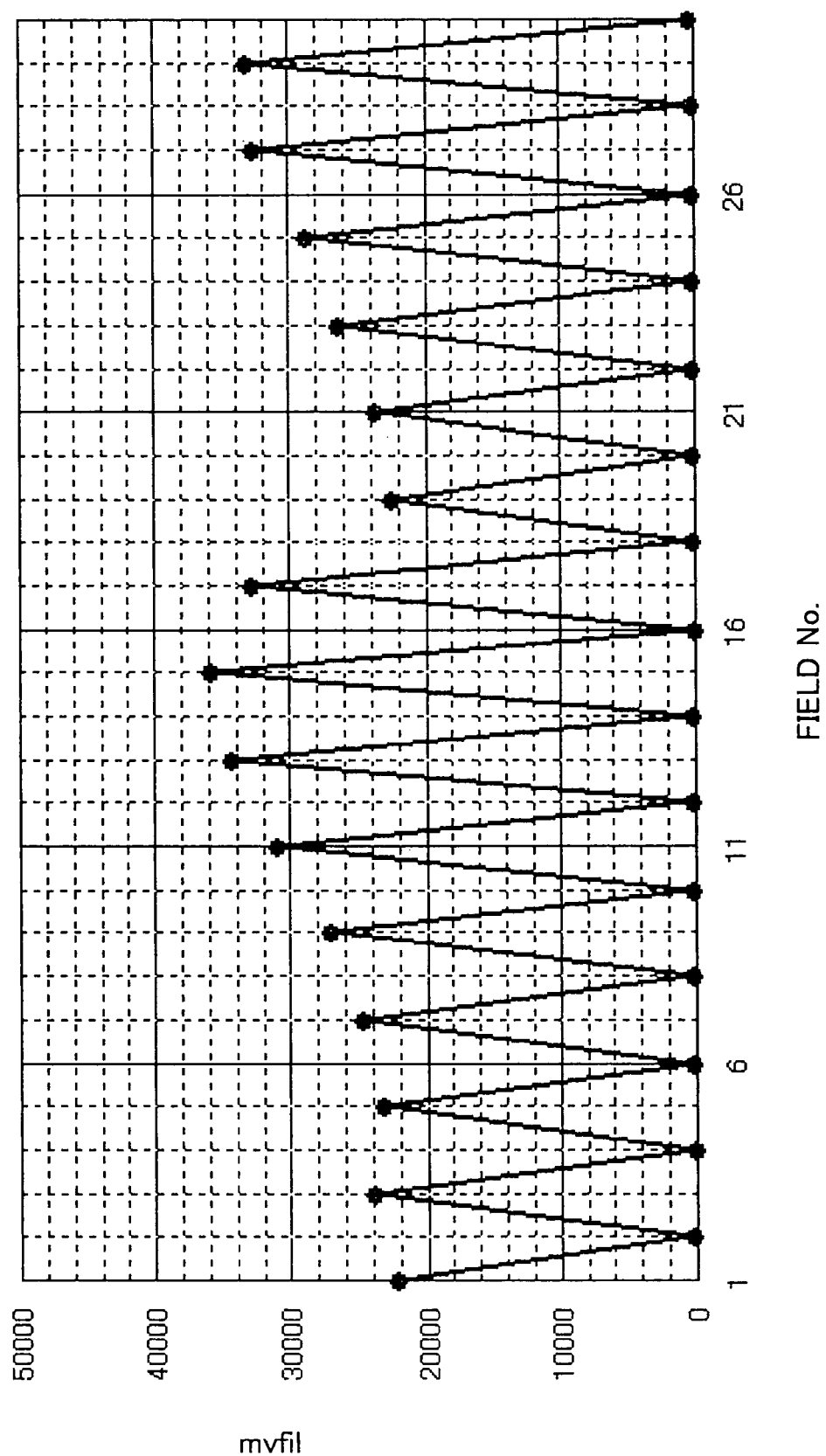
FIG. 16 is a diagram showing a relationship (in the case of a 2-2 pull-down signal) between an interfield motion-picture-element cumulative value 'mvfil' (a vertical axis) outputted from the interfield correlation detection means and a field number (a horizontal axis) in the video signal processing apparatus according to the first embodiment.

FIG. 16 is a diagram showing a relationship between the interfield motion-picture-element cumulative value 'mvfil' (a vertical axis) outputted from the interfield correlation detection means 12 and a field number (time, i.e., a horizontal axis). FIG. 16 shows a case where the interfield correlation detection means 12 performs processing of field pictures based on the 2-2 pull-down signal which is the same as that shown in FIG. 14 by picture simulation. As shown in FIG. 16 by the points of field Nos. 2, 4, . . . , 30, there are the still picture fields in which the interfield motion-picture-element cumulative value 'mvfil' becomes a value of zero or not larger than a predetermined value at intervals of two fields, and a still picture field appears in a position next to the motion picture field repeatedly.

Thus condition of being the 2-2 sequence can be detected by detecting the fact that the interframe motion-picture-element cumulative value 'mvfr' indicates a motion picture field and the interfield motion-picture-element cumulative value 'mvfil' indicates repetition of motion and still picture fields at intervals of two fields. Further, in order to detect the 2-2 pull-down sequence condition more reliably, in addition to the condition based on the interframe motion-picture-element cumulative value 'mvfr' and the interfield motion-picture-element cumulative value 'mvfil', condition that, at intervals of two fields, a still picture field of the interfield motion-picture-element cumulative value 'mvfil' and a field having a relatively small value of the motion-picture-element cumulative difference value 'dfmvfr' are repeated, can be added.

The 2-2 field sequence detection means 61 detects whether or not the field is a field still picture for each of the interframe motion-picture-element cumulative value 'mvfr' and the interfield motion-picture-element cumulative value 'mvfil', determines the field included in the same frame based on the motion-picture-element cumulative difference value 'dfmvfr', detects whether or not to satisfy the condition that the input video signal is the 2-2 sequence in accordance with a result of the determination, and outputs a detection signal 'tci1' indicative of the result (i.e., a result of the 2-2 sequence detection) and a 2-2 phase flag 'tcf22' indicative of a phase upon the telecine interpolation.

The occurrence frequency detection means 62 detects a 2-2 sequence occurrence frequency with use of the same condition of the detection of the 2-2 sequence as in the 2-2 field sequence detection means 61. The 2-2 field sequence detection means 61 outputs the result of the detection of the 2-2 sequence condition 'detfl2', the result of the detection of the frame still picture 'frstl', the result of the detection of the field still picture 'filstl2', and the count value of the 2-2 sequence phase 'seq2' detected by the 2-2 field sequence detection means 61, to the occurrence frequency detection means 62.

Referring to FIG. 13, the interframe motion-picture-element cumulative value 'mvfr' of one field unit inputted from the interframe correlation detection means 11 to the 2-2 field sequence detection means 61 is sent to the still picture detection means 161 and to the scene change detection means 178 of the reset detection means 168.

The still picture detection means 161 compares the interframe motion-picture-element cumulative value 'mvfr' received from the interframe correlation detection means 11 with a predetermined threshold 'FRTH2', and detects whether or not the field is a field still picture. When the received interframe motion-picture-element cumulative value 'mvfr' is smaller than the predetermined threshold 'FRTH2', the still picture detection means 161 determines that the field is a frame still picture, and sets a value of the result of the detection of the frame still picture 'frstl' at a value of one (i.e., frstl=1). Otherwise, the still picture detection means 161 sets a value of the result of the detection of the frame still picture 'frstl' at a value of zero (i.e., frstl=0, which indicates a frame motion picture). The predetermined threshold 'FRTH2' for the still picture detection is set at such a value as to be capable of detecting a frame motion picture field. Further, the still picture detection means 161 may also be arranged to detect that the field is a field motion picture when the interframe motion-picture-element cumulative value 'mvfr' is larger than the predetermined threshold 'FRTH2', and to detect the picture as a still picture otherwise.

In order to detect the 2-2 sequence, the result of the detection of the frame still picture 'frstl' from the still picture detection means 161 is sent to the sequence condition detection means 165 and to the successive motion-picture detection means 175 and the phase determination means 176 of the reset detection means 168. The result of the detection of the frame still picture 'frstl' is also outputted to the occurrence frequency detection means 62.

The motion-picture-element cumulative difference value 'dfmvfr' inputted from the interframe correlation detection means 11 to the 2-2 field sequence detection means 61 is sent to the same-frame determination means 162 and also to the comparison means 177 of the reset detection means 168.

The same-frame determination means 162 compares the motion-picture-element cumulative difference value 'dfmvfr' from the interframe correlation detection means 11 with a predetermined threshold 'DTH2', and determines succession of fields of the same frame. When the received motion-picture-element cumulative difference value 'dfmvfr' is smaller than the predetermined threshold 'DTH2', the same-frame determination means 162 determines succession of the same frames, and sets a value of the result of the same-frame determination 'frdiff' at a value of one (i.e., frdiff=1, which indicates the fields of the same frame). Otherwise, the same-frame determination means 162 sets a value of the result of the detection 'frdiff' at a value of zero (i.e., frdiff=0). The result of the same-frame determination 'frdiff' from the same-frame determination means 162 is sent to the sequence condition detection means 165.

The field-still-picture detection means 163 receives the interfield motion-picture-element cumulative value 'mvfil' of one field unit inputted from the interfield correlation detection means 12 to the 2-2 field sequence detection means 61. The field-still-picture detection means 163 compares the interfield motion-picture-element cumulative value 'mvfil' from the interfield correlation detection means 12 with a predetermined threshold FIL_TH2, and detects whether or not the field is a field still picture. When the interfield motion-picture-element cumulative value 'mvfil' is smaller than the predetermined threshold FIL_TH2, the field-still-picture detection means 163 sets a value of the result of the detection of the field still picture 'filstl2' at a value of one (i.e., filst2=1). Otherwise, the field-still-picture detection means 163 sets a value of the result of the detection 'filstl2' at a value of zero (i.e., filstl=0, which indicates a field motion picture). When the interfield motion-picture-element cumulative value 'mvfil' is larger than the predetermined threshold, the field-still-picture detection means 163 determines that the field is a field motion picture. Otherwise, the field-still-picture detection means detects that the field is a field still picture. The result of the detection of the field still picture 'filstl2' from the field-still-picture detection means 163 is sent to the motion picture field counter 164 and the sequence condition detection means 165, and also to the successive motion-picture detection means 175 and the phase determination means 176 of the reset detection means 168. The result of the detection of the field still picture 'filstl2' is further outputted to the occurrence frequency detection means 62.

The motion picture field counter 164 receives the result of the detection of the field still picture 'filstl2' from the field-still-picture detection means 163. The motion picture field counter 164, in accordance with the received result of the detection 'filstl2', counts successive field motion pictures, and outputs the number 'filcnt2' of successive fields of the field motion pictures until the previous field. In other words, when the received result of the detection 'filstl2' has a value of one (i.e., filstl2=1) indicative of being a field still picture, the motion picture field counter 164 resets its own count. When the result of the detection 'filstl2' has a value of zero (i.e., filstl2=0) indicative of being a motion picture, the motion picture field counter 164 counts, and outputs the count value of the successive field motion pictures 'filcnt2' at the timing of the next field.

The sequence condition detection means 165 receives the result of the detection of the frame still picture 'frstl' from the still picture detection means 161, the result of the same-frame determination 'frdiff' from the same-frame determination means 162, the result of the detection of the field still picture 'filstl2' from the field-still-picture detection means 163, and the count value of the successive field motion pictures 'filcnt2' until the previous field from the motion picture field counter 164. When a frame of the input video signal is a motion picture frame and a still picture field is detected, when a still picture field and a motion picture field are alternately detected, and when a field having the motion-picture-element cumulative difference value 'dfmvfr' not larger than the predetermined threshold is detected, the sequence condition detection means 165 determines that the field of the input video signal is a field still picture appearing once every two fields in the 2-2 pull-down signal, detects the 2-2 sequence condition, and outputs a result of the detection of the 2-2 sequence condition 'detfl2' indicative of detection of the sequence condition. More specifically, in accordance with the result of the detection of the frame still picture 'frstl', the result of the detection of the field still picture 'filstl2', the count value of the successive field motion pictures 'filcnt2', and the result of the same-frame determination 'frdiff'; the sequence condition detection means 165 detects a field satisfying four conditions that the result of the detection of the frame still picture 'frstl' has a value of zero (a frame motion picture), the result of the detection of the field still picture 'filstl2' has a value of one (a field still picture), the count value of the successive field motion pictures 'filcnt' has a value of one (a field motion picture after a field still picture), and the result of the same-frame determination 'frdiff' has a value of one (i.e., it is determined that the same frame having the motion-picture-element cumulative difference value 'dfmvfr' not larger than the predetermined value). When detecting a field satisfying the sequence condition, the sequence condition detection means 165 sets a value of the result of the detection of the 2-2 sequence condition 'detfl2' at a value of one (i.e., detfl2=1). Otherwise, the sequence condition detection means sets a value of the result of the detection 'detfl2' at a value of zero (i.e., detfl2=0).

The sequence condition detection means 165 in the first embodiment detects a field satisfying the sequence condition in accordance with the result of the detection of the frame still picture 'frstl', the result of the detection of the field still picture 'filstl2', the count value of the successive field motion pictures 'filcnt2', and the result of the same-frame determination 'frdiff'. However, when detecting a field satisfying three conditions that the result of the detection of the frame still picture 'stl1' has a value of zero (a frame motion picture), the result of the detection of the field still picture 'filstl2' has a value of one (a field still picture), and the count value of the successive field motion pictures 'filcnt' has a value of one (i.e., a field motion picture after a field still picture), the sequence condition detection means 165 can detect the 2-2 sequence condition.

The sequence phase detection means 166 receives the result of the detection of the 2-2 sequence condition 'detfl2' from the sequence condition detection means 165, detects the phase of the repetitive 2-2 sequences having two fields as a unit, and outputs a count value 'seq2' indicative of the sequence phase of two fields and a 2-2 phase flag 'tcf22'.

The sequence phase generation means 171 of the sequence phase detection means 166 receives the result of the detection of the 2-2 sequence condition 'detfl2' from the sequence condition detection means 165. The sequence phase generation means 171 generates a repetition signal of values of zero and one having a period of two fields for each field, and in accordance with the result of the detection of the 2-2 sequence condition 'detfl2', sets a repetitive period counter. More specifically, the sequence phase generation means 171 repeats and counts zero and one for each field. When the result of the detection of the 2-2 sequence condition 'detfl2' has a value of one, the sequence phase generation means determines that the field is a field still picture appearing once every two fields in the 2-2 pull-down signal, sets the count value 'seq2' at a value of one to generate the count value 'seq2', and outputs it. Since values of zero and one are repeated for each field, the count value 'seq2' repeats always zero, one, zero, one, .... When the result of the detection of the 2-2 sequence condition 'detfl2' has a value of one, the sequence phase generation means sets the count value 'seq2' at a value of one. In this case, the count value 'seq2' outputted from the sequence phase generation means 171 has been set at a value of one when the result of the detection of the 2-2 sequence condition 'detfl2' has a value of one. However, the count value 'seq2' may be set at a value of zero or at another value so long as the value is a count value repeated in fields.

Since the count value 'seq2' of the sequence phase generation means 171 is repeated at intervals of two fields, and the 2-2 pull-down signal is set in synchronism with the still picture field at intervals of two fields, the count value 'seq2' indicates repetitive sequenced of two fields, that is, the phase of the 2-2 sequences. The count value 'seq2' as the phase of the 2-2 sequence is sent to the interpolation-phase-flag generation means 172. The count value 'seq2' is also outputted to the phase determination means 176 and the comparison means 177 of the reset detection means 168 and also to the occurrence frequency detection means 62.

The interpolation-phase-flag generation means 172 of the sequence phase detection means 166 receives the count value 'seq2' from the sequence phase generation means 171, and generates a 2-2 phase flag 'tcf22' indicative of the directions of fields converted from the same frame in telecine interpolation processing. The count value 'seq2' from the sequence phase generation means 171 is a signal which is repeated at intervals of two fields as a unit and is synchronized with the phase of the 2-2 pull-down. Thus, the interpolation-phase-flag generation means 172 sets the 2-2 phase flag 'tcf22' at a value of one in the field phase for telecine interpolation processing, for example, from the preceding field in time to indicate a field direction at the time of interpolation in accordance with a count value 'seq2', and sets a 2-2 phase flag 'tcf22' at a value of zero in a field phase for telecine interpolation processing from the succeeding field in time. This value indicates the field phase at the time of interpolation based on the same set value as the 2-3 phase flag 'tcf23' outputted from the interpolation-phase-flag generation means 134 of the 2-3 field sequence detection means 51, and thus similar operation to the above-mentioned can be carried out regardless of a distinction between the 2-3 pull-down and the 2-2 pull-down upon the telecine interpolation processing. Even the value of the 2-2 phase flag 'tcf22' is not limited to the above-mentioned example. Other values may be employed so long as the values can distinguish between the telecine interpolation from the previous field and the telecine interpolation from the subsequent field. The 2-2 phase flag 'tcf22' from the interpolation-phase-flag generation means 172 is sent to the pull-down determination means 17.

Next, the reset detection means 168 receives the result of the detection of the frame still picture 'frstl' from the still picture detection means 161, the result of the detection of the field still picture 'filstl2' from the field-still-picture detection means 163, the count value of the successive field motion pictures 'filcnt2' until the previous field from the motion picture field counter 164, the interframe motion-picture-element cumulative value 'mvfr' and the motion-picture-element cumulative difference value 'dfmvfr' from the interframe correlation detection means 11. The reset detection means 168 further receives the count value 'seq2' from the sequence phase generation means 171. The reset detection means 168 detects a case where the input video signal does not meet the 2-2 sequence condition in accordance with the received signals. When the input video signal does not meet the 2-2 sequence condition, the reset detection means 168 generates a reset signal 'rst2' to reset the 2-2 sequence detection signal (i.e., to determine that the input video signal is not the 2-2 sequence) and outputs it. Explanation will be made as to each of blocks provided in the reset detection means 168.

The successive motion-picture detection means 175 of the reset detection means 168 receives the result of the detection of the frame still picture 'frstl' from the still picture detection means 161, the result of the detection of the field still picture 'filstl2' from the field-still-picture detection means 163, and the count value of the successive field motion pictures 'filcnt2' from the motion picture field counter 164. The successive motion-picture detection means 175 detects a case satisfying the following conditions: the result of the detection of the frame still picture 'frstl' has a value of zero (a frame motion picture), the result of the detection of the field still picture 'filstl' has a value of zero (a field motion picture), and the count value of the successive field motion pictures 'filcnt2' has a value of one; and outputs the result of the detection. In the 2-2 pull-down signal, one frame is converted to the corresponding two fields, and a field subsequent to a field motion picture is always a field still picture. Thus the number of the successive field motion pictures is always smaller than a value of one. Accordingly, when the detected field is a motion picture (i.e., filstl2=0) and the count value of the successive field motion pictures 'filcnt' until the previous field has a value of one (i.e., filcnt=1) in accordance with the result of the detection of the field still picture 'filstl2', this means that two motion picture fields are successive. For the motion picture, the result of the detection of the frame still picture 'frstl' also has a value of zero (a frame motion picture). For this reason, when the result of the detection of the frame still picture 'frstl' has a value of zero, the result of the detection of the field still picture 'filstl' has a value of zero (a field motion picture), and the count value of the successive field motion pictures 'filcnt' has a value of one; the successive motion-picture detection means outputs a result of the detection of, for example, a value of one as a signal indicative of reset of the 2-2 sequence detection signal, and sends it to the reset signal generation means 179.

The phase determination means 176 of the reset detection means 168 receives the result of the detection of the frame still picture 'frstl' from the still picture detection means 161, the result of the detection of the field still picture 'filstl2' from the field-still-picture detection means 163, the count value of the successive field motion pictures 'filcnt2' from the motion picture field counter 164, and the count value 'seq2' from the sequence phase generation means 171. The phase determination means 176 detects the presence of a field (e.g., a field motion picture) which does not meet sequence condition to be detected at the field position of the field still picture appearing once every two fields of the 2-2 sequence. The phase determination means 176, at the position (i.e., when the count value 'seq2' has a value of one or seq2=1) of the field still picture of two fields as one period of the count value 'seq2' synchronized with the 2-2 sequence phase, detects a case where the result of the detection of the frame still picture 'frstl' has a value of zero (a frame motion picture), when the result of the detection of the field still picture has a value of zero (a field motion picture), and when the count value of the successive field motion pictures 'filcnt2' has a value of zero, and outputs the result of the detection 'dph2'. In other words, in the 2-2 pull-down signal, a field still picture appears once every two fields. However, at the field, when the detected field is a field motion picture (i.e., filstl=0) in accordance with the result of the detection of the field still picture 'filstl2' and does not meet the 2-2 sequence condition, this means that the phase was shifted from the 2-2 sequence. Thus, at the position of the field still picture appearing once every two fields in the 2-2 pull-down signal, when the result of the detection of the frame still picture 'frstl' has a value of zero (a frame motion picture), the result of the detection of the field still picture 'filstl' has a value of zero (a field motion picture), and the count value of the successive field motion pictures 'filcnt2' has a value of zero; the phase determination means outputs the result of the detection 'dph2' of, for example, a value of one as a signal indicative of reset of the 2-2 sequence detection signal, and sends it to the reset signal generation means 179.

In this case, the determination of the fact that the phase was shifted from the 2-2 sequence in the phase determination means 176 has been made in accordance with the result of the detection of the frame still picture 'frstl', the result of the detection of the field still picture 'filstl', and the count value of the successive field motion pictures 'filcnt2'. However, the phase determination means 176 may determine the phase shift as the condition when the result of the detection of the frame still picture 'frstl' has a value of zero (a frame motion picture) and the result of the detection of the field still picture has a value of zero (a field motion picture), and may output the result of the detection 'dph2' indicative of reset of the 2-2 sequence detection signal.

The comparison means 177 of the reset detection means 168 receives the motion-picture-element cumulative difference value 'dfmvfr' from the interframe correlation detection means 11 and the count value 'seq2' from the sequence phase generation means 171. The comparison means 177, at the field position of a field still picture appearing once every two fields of the 2-2 sequence, detects a field having the motion-picture-element cumulative difference value 'dfmvfr' having a value larger than a predetermined threshold. In other words, when the count value 'seq2' has a value of one (i.e., seq2=1) indicating a field still picture appearing at intervals of two fields, the comparison means 177 compares the motion-picture-element cumulative difference value 'dfmvfr' from the interframe correlation detection means 11 with a predetermined threshold 'SQTH'. When the count value 'seq2' has a value of one and the motion-picture-element cumulative difference value 'dfmvfr' is larger than the predetermined threshold 'SQTH', the comparison means 177 sets a value of a result of the detection 'scoff' at a value of one (i.e., sqof=1). Otherwise, the comparison means 177 sets a value of the result of the detection 'sqof' at a value of zero (i.e., sqof=0). In the adjacent fields converted from the same frame of the 2-2 pull-down signal, the motion-picture-element cumulative difference value 'dfmvfr' has a relatively small value. Thus, when the motion-picture-element cumulative difference value 'dfmvfr' is larger than the predetermined threshold 'SQTH' at the position of a field still picture appearing at intervals of two fields, this means that the phase was shifted from the 2-2 sequence. Accordingly, the comparison means 177 sends the result of the detection 'sqof' as a signal indicative of reset of the 2-2 sequence detection signal to the reset signal generation means 179.

The scene change detection means 178 of the reset detection means 168 receives the interframe motion-picture-element cumulative value 'mvfr' from the interframe correlation detection means 11. The scene change detection means 178 compares the interframe motion-picture-element cumulative value 'mvfr' with a predetermined threshold 'STH2', and in accordance with a result of the comparison, detects a scene change in the field. The operation of the scene change detection means 178 is substantially the same as or similar to the operation of the scene change detection means 143 of the 2-3 field sequence detection means 51. However, when the interframe motion-picture-element cumulative value 'mvfr' is larger than the predetermined threshold 'STH2', the scene change detection means 178 determines the presence of a scene change in the field, sets a scene change result of the detection 'sch2' at a value of one, and outputs it. Otherwise, the scene change detection means 178 sets the result of the detection of the scene change 'sch' at a value of zero, and outputs it. The scene change result of the detection 'sch2' is outputted to the reset signal generation means 179.

The reset signal generation means 179 of the reset detection means 168 receives the result of the detection of the successive motion pictures from the successive motion-picture detection means 175, the result of the detection 'dph2' from the phase determination means 176, the result of the detection 'sqof' from the comparison means 177, and the result of the detection of the scene change 'sch2' from the scene change detection means 178. When a switching from the 2-2 pull-down signal or a phase shift takes place or when the 2-2 sequence condition are not satisfied, the reset signal generation means 179 generates a reset signal to reset the 2-2 sequence detection signal (i.e., to determine that the input video signal is not the 2-2 sequence) in accordance with any of the received results of the detecting. For example, at least one of the result of the detection of the successive motion pictures from the successive motion-picture detection means 175, the result of the detection 'dph2' from the phase determination means 176, the result of the detection 'sqof' of the comparison means 177, and the scene change result of the detection 'sch2' from the scene change detection means 178 have a value of one; the reset signal generation means 179 sets the reset signal 'rst2' at a value of one. When the 2-2 sequence detection signal is not reset, the reset signal generation means 179 sets the reset signal 'rst2' at a value of zero. In this case, in any of situations when two field motion pictures become successive, when the field motion picture is detected with the phase of the field still picture with a shifted phase, when the motion-picture-element cumulative difference value 'dfmvfr' has a large value for the field still picture field, and when a scene change is detected, the reset signal 'rst2' is set at a value of one.

In this connection, the generation of the reset signal 'rst2' in the reset signal generation means 179 is not limited to the above-mentioned condition. For example, the reset signal generation means 179 may be arranged to output the reset signal 'rst2' having a value of one when the respective results of the detecting have a value of one or when at least two of the results of the detecting have a value of one, in combined predetermined results of the detecting of the result of the detection of the successive motion pictures from the successive motion-picture detection means 175, the result of the detection 'dph2' from the phase determination means 176, the result of the detection 'sqof' from the comparison means 177, and the result of the detection of the scene change 'sch2' from the scene change detection means 178. Further, the condition that the reset signal 'rst2' having a value of one is outputted may be a case where successive two fields of field motion pictures are detected by the result of the detection of the successive motion pictures from the successive motion-picture detection means 175 and the result of the detection 'dph2' from the phase determination means 176 or a case when a phase shift is detected by the successive motion pictures detected in a field which should have been a field still picture.

The sequence determination means 167 receives the result of the detection of the 2-2 sequence condition 'detfl2' from the sequence condition detection means 165 and the reset signal 'rst2' from the reset signal generation means 179 of the reset detection means 168. The sequence determination means 167 detects repetition of the 2-2 sequence condition from the result of the detection of the 2-2 sequence condition 'detfl2', determines whether or not the sequence is the 2-2 sequence, and outputs a 2-2 sequence detection signal 'tci1' indicative of a result of the 2-2 sequence detection. Explanation will be made as to each of blocks provided in the sequence determination means 167.

The sequence startup counter 173 of the sequence determination means 167 receives the result of the detection of the 2-2 sequence condition 'detfl2' from the sequence condition detection means 165 and the reset signal 'rst2' from the reset signal generation means 179 of the reset detection means 168. The sequence startup counter 173, in accordance with the result of the detection of the 2-2 sequence condition 'detfl2', counts when a field meeting the 2-2 sequence condition is detected, that is, when two fields of the 2-2 sequence are detected. When the reset signal 'rst2' from the reset signal generation means 179 has a value of one (i.e., rst2=1), the sequence startup counter 173 resets the output of the 2-2 sequence-start-counter 'oncnt2' to a value of zero. In other words, when the result of the detection of the 2-2 sequence condition 'detfl2' has a value of one, the sequence startup counter 173 detects the sequence condition of two fields in the 2-2 pull-down signal, and counts the number of times of repetition of fields when the result of the detection of the 2-2 sequence condition 'detfl2' has a value of one. When receiving the reset signal 'rst2' having a value of one from the reset signal generation means 179, the sequence startup counter 173 determines that the input video signal is not the 2-2 pull-down signal, and sets the count value at a value of zero. After reset by the reset signal 'rst2', the sequence startup counter 173 again waits for input of a field having the result of the detection of the 2-2 sequence condition 'detfl2' having a value of one, and starts counting the number of times of repetition of the sequence from a value of zero. The 2-2 sequence count value 'oncnt2' of the sequence startup counter 173 is outputted to the sequence-detection-signal generation means 174.

The sequence-detection-signal generation means 174 receives the output of the 2-2 sequence-start-counter 'oncnt2' of the 2-2 sequence from the sequence startup counter 173. The sequence-detection-signal generation means 174 compares the 2-2 sequence count value 'oncnt2' from the sequence startup counter 173 with a predetermined threshold (referred to as a "startup count value") 'TH2'. When the 2-2 sequence count value 'oncnt2' becomes not smaller than the startup count value 'TH2', that is, when two fields of the 2-2 sequence is continuously detected by a predetermined number of times, the sequence-detection-signal generation means 174 sets the sequence detection signal 'tci1' indicative of a result of the 2-2 sequence detection at a value of one. When the 2-2 sequence count value 'oncnt2' is smaller than the startup count value 'TH2', the sequence-detection-signal generation means 174 outputs the detection signal 'tci1' having a value of zero. A case where the 2-2 sequence detection signal 'tci1' has a value of zero is a case where the 2-2 sequence is not counted (the input signal is not the 2-2 pull-down signal) or a case where the sequence count value is reset to zero before the 2-2 sequence is detected. The above-mentioned startup count value 'TH2' is a count value which is a set-up number of times of repetition of the sequence until the detection that the input video signal meets the 2-2 sequence is made. The above-mentioned startup count value 'TH2' is set as a count value counted until the 2-2 sequence detection signal 'tci1' is started. Further, the value of the 2-2 sequence detection signal is not limited to the above-mentioned example. Any other values may be employed so long as the values can distinguish between the case where the 2-2 sequence is continuously detected by a predetermined number of times and the other cases. The 2-2 sequence detection signal 'tci1' which is the output of the sequence-detection-signal generation means 174 is sent to the 2-2 predictive control means 63.

Referring to FIG. 12, next, the occurrence frequency detection means 62 of the 2-2 sequence detection means 16 receives the result of the detection of the 2-2 sequence condition 'detfl2' outputted from the 2-2 field sequence detection means 61, the result of the detection of the frame still picture 'frstl', the result of the detection of the field still picture 'filstl2', and the count value of the 2-2 sequence phase 'seq2'. The occurrence frequency detection means 62 also receives the motion-picture-element cumulative difference value 'dfmvfr' from the interframe correlation detection means 11. The occurrence frequency detection means 62 monitors the sequence of the input video signal to detect an occurrence frequency of the 2-2 sequence, thereby determining whether or not the input video signal meets the 2-2 sequence condition (that is, a certainty of being the 2-2 pull-down signal).

Figure 17:
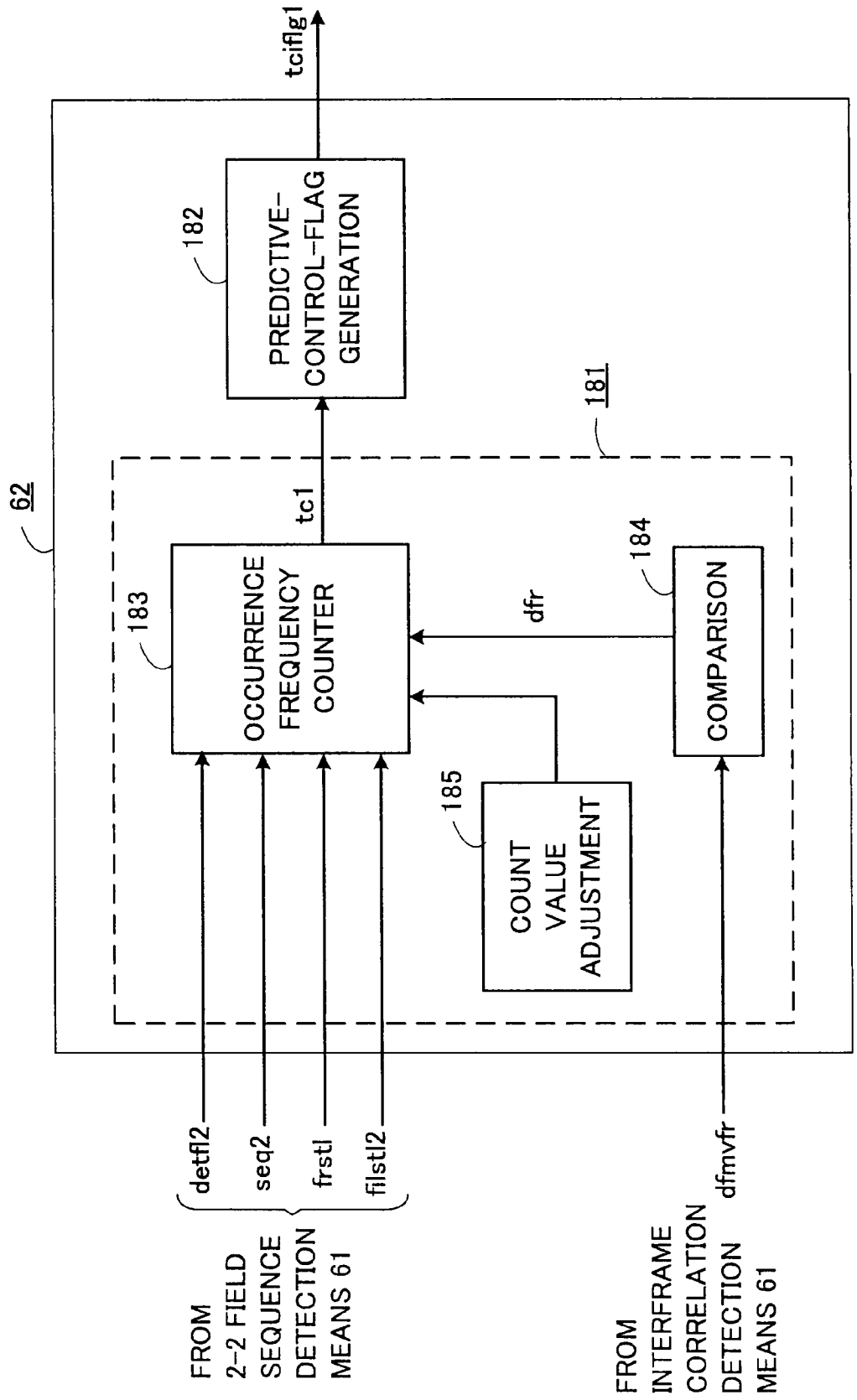
FIG. 17 is a block diagram showing an exemplary configuration of the occurrence frequency detection means of the 2-2 sequence detection means in the video signal processing apparatus according to the first embodiment.

FIG. 17 is a block diagram showing an exemplary configuration of the occurrence frequency detection means 62 in the first embodiment. Referring to FIG. 17, the occurrence frequency detection means 62 receives the result of the detection of the 2-2 sequence condition 'detfl2' outputted from the 2-2 field sequence detection means 61, the result of the detection of the frame still picture 'frstl', the result of the detection of the field still picture 'filstl2', and the count value of the 2-2 sequence phase 'seq2'. However, the occurrence frequency detection means 62 may be arranged to include similar means to obtain the result of the detection of the 2-2 sequence condition 'detfl2', the result of the detection of the frame still picture 'frstl', the result of the detection of the field still picture 'filstl2', and the count value of the 2-2 sequence phase 'seq2' from the 2-2 field sequence detection means 61. In this case, the occurrence frequency detection means 62 receives the interframe motion-picture-element cumulative value 'mvfr' and the motion-picture-element cumulative difference value 'dfmvfr' from the interframe correlation detection means 11 and the interfield motion-picture-element cumulative value 'mvfil' from the interfield correlation detection means 12, and detects the condition of the detection of the 2-2 sequence.

Explanation will be made in connection with the case where the occurrence frequency detection means 62 receives the result of the detection of the 2-2 sequence condition 'detfl2', the result of the detection of the frame still picture 'frstl', the result of the detection of the field still picture 'filstl2', and the count value of the 2-2 sequence phase 'seq2' outputted from the 2-2 field sequence detection means 61.

As shown in FIG. 17, the occurrence frequency detection means 62 of the 2-2 sequence detection means 16 in the first embodiment includes a sequence-determination number-of-times detection means 181 and a predictive-control-flag generation means 182. The sequence-determination number-of-times detection means 181 monitors the 2-2 sequence condition of an input video signal throughout a relatively long period of time (a field), and counts the number of times when the input video signal is determined to meet the 2-2 sequence condition. The sequence-determination number-of-times detection means 181 includes an occurrence frequency counter 183, a comparison means 184, and a count value adjustment means 185. Further, the predictive-control-flag generation means 182 compares a count value 'tc1' outputted from the sequence-determination number-of-times detection means 181 with a predetermined threshold 'PTH2', and outputs a result of the comparison as a predictive control flag 'tciflg1' as an index indicative of a certainty of being the 2-2 pull-down signal (i.e., determines a certainty of being the 2-2 pull-down signal and outputs a result of the determination).

The sequence-determination number-of-times detection means 181 receives the result of the detection of the 2-2 sequence condition 'detfl2', the result of the detection of the frame still picture 'frstl', the result of the detection of the field still picture 'filstl2', and the count value of the 2-2 sequence phase 'seq2' outputted from the 2-3 field sequence detection means 51. The sequence-determination number-of-times detection means 181 also receives the motion-picture-element cumulative difference value 'dfmvfr' from the interframe correlation detection means 11. The sequence-determination number-of-times detection means 181 monitors the 2-2 sequence condition in the input video signal throughout relatively long fields, and counts the number of times when the input video signal is determined to meet the 2-2 sequence condition. The sequence-determination number-of-times detection means 181 adds a predetermined value when it detects the 2-2 sequence condition; the sequence-determination number-of-times detection means 181 subtracts a predetermined value from the count value when it does not detect the 2-2 sequence condition at intervals of two fields and does not determine that the input video signal meets the 2-2 sequence condition.

A comparison means 184 of the sequence-determination number-of-times detection means 181 receives the motion-picture-element cumulative difference value 'dfmvfr' from the interframe correlation detection means 11. The comparison means 184 compares the motion-picture-element cumulative difference value 'dfmvfr' with a predetermined threshold 'OFTH'. The comparison means 184 sets a value of a result of the comparison 'dfr' at a value of one (i.e., dfr=1) when the motion-picture-element cumulative difference value 'dfmvfr' is larger than the predetermined threshold 'OFTH', but otherwise sets a value of the result of the comparison 'dfr' at a value of zero (i.e., dfr=0), thereby outputting the value of the result to the occurrence frequency counter 183 of the sequence-determination number-of-times detection means 181.

The occurrence frequency counter 183 of the sequence-determination number-of-times detection means 181 receives the result of the detection of the 2-2 sequence condition 'detfl2', the result of the detection of the frame still picture 'frstl', and the result of the detection of the field still picture 'filstl2' from the 2-2 field sequence detection means 61, and the count value of the 2-2 sequence phase 'seq2'. The occurrence frequency counter 183 also receives the result of the comparison 'dfr' from the comparison means 184 and a set value established in the count value adjustment means 185.

The occurrence frequency counter 183 is an up/down counter which adds a predetermined value 'Ad2' or subtracts a predetermined value 'Su2' in accordance with the result of the detection of the 2-2 sequence condition 'detfl2', the result of the detection of the frame still picture 'frstl', the result of the detection of the field still picture 'filstl2', the count value of the 2-2 sequence phase 'seq2', and the result of the comparison 'dfr'. The occurrence frequency counter 183 monitors the 2-2 sequence condition in the input video signal for relatively long period of time (a field), and counts the number of times when the input video signal is determined to meet the 2-2 sequence condition. When a field meeting the 2-2 sequence condition is detected, that is, when the result of the detection of the 2-2 sequence condition 'detfl2' has a value of one, the occurrence frequency counter 183 adds the predetermined value 'Ad2' to the count value 'tc1' (i.e., tc1←tc1+Ad2). Even in the phase of the second field (i.e., when the count value of the 2-2 sequence phase 'seq2' is a value of one and in the field position of the field still picture appearing once every two fields), when the result of the detection of the frame still picture 'frstl' has a value of zero (a frame motion picture) and the result of the detection of the field still picture has a value of zero (a field motion picture), or when the result of the comparison 'dfr' from the comparison means 184 has a value of one (having the motion-picture-element cumulative difference value 'dfmvfr' of a large value) and the 2-2 sequence is not detected; the occurrence frequency counter 183 subtracts the predetermined value 'Su2' from the count value 'tc1' (i.e., tc1←tc1−Su2). Otherwise, even when the result of the detection of the 2-2 sequence condition 'detfl2' has a value of zero and the 2-2 sequence is not detected, the occurrence frequency counter performs addition/subtraction on the count value 'tc1' (i.e., tc1←tc1±0).

The condition of not determining as the 2-2 sequence and subtracting the predetermined value 'Su2' from the count value 'tc1' may be set to be only when the result of the detection of the frame still picture 'frstl' has a value of zero (a field motion picture) and the result of the detection of the field still picture has a value of zero (a field motion picture), even in the phase (seq2=1) of the second field. In this case, when the result of the comparison 'dfr' from the comparison means 184 has a value of one in the phase (seq2=1) of the second field, the occurrence frequency counter performs no addition/subtraction of the count value 'tc1' (i.e., tc1←tc1±0).

The count value adjustment means 185 adjusts a balance ratio between the addition value 'Ad2' and the subtraction value 'Su2' in the count value of the occurrence frequency counter 183. For example, the count value adjustment means outputs a value corresponding to the subtraction value 'Su2' when the addition value 'Ad2' is set at a value of one to the occurrence frequency counter 183. By making the subtraction value 'Su2' when the input video signal is determined not to meet the 2-2 sequence condition to be larger than the addition value 'Ad2' when the input video signal is determined to meet the 2-2 sequence condition, an up/down variation width in the count value of the number of times of the sequence determination is adjusted. In other words, a degree of being determined as the 2-2 sequence can be adjusted in accordance with the balance ratio between the addition value 'Ad2' and the subtraction value 'Su2' set by the count value adjustment means 185. The addition value and the subtraction value in the count value of the occurrence frequency counter 183 is set in accordance with the value from the count value adjustment means 185.

The count value (count value of the occurrence frequency) 'tc1' as number of times of the sequence determination in the occurrence frequency counter 183 is sent to the predictive-control-flag generation means 182.

Next, the predictive-control-flag generation means 182 receives the occurrence frequency count value 'tc1' from the sequence-determination number-of-times detection means 181, and determines a certainty of being the 2-2 pull-down signal to output a predictive control flag 'tciflg1' indicative of a certainty of the determination.

The predictive-control-flag generation means 182 receives the occurrence frequency count value 'tc1' outputted from the occurrence frequency counter 183. The predictive-control-flag generation means 182 compares the occurrence frequency count value 'tc1' from the occurrence frequency counter 183 with the predetermined threshold (effective count value) 'PTH2', and determines a certainty of being the 2-2 pull-down signal. In other words, the predictive-control-flag generation means 182 compares the occurrence frequency count value 'tc1' and the effective count value 'PTH2'. When the occurrence frequency count value 'tc1' is not smaller than the effective count value 'PTH2', the predictive-control-flag generation means determines that the input video signal is the 2-2 pull-down signal, and sets the predictive control flag 'tciflg1' at a value of one. When the occurrence frequency count value 'tc1' is smaller than the effective count value 'PTH2', the predictive-control-flag generation means 182 determines that the input video signal is not likely to be the 2-2 pull-down signal, does not generate the predictive control signal predictive control flag 'tciflg1', and sets the predictive control flag 'tciflg1' at a value of zero. The predictive control flag 'tciflg1' which is the output of the predictive-control-flag generation means 182 is outputted to the 2-2 predictive control means 63.

The effective count value 'PTH2' in the predictive-control-flag generation means 182 is a count value which sets an occurrence frequency (number of times of the 2-2 sequence determination) until the input signal is determined as the 2-2 pull-down signal with respect to the occurrence frequency count value 'tc1' outputted from the occurrence frequency counter 183 and which determines a certainty of being the 2-2 pull-down signal. In accordance with the effective count value 'PTH2', a time until the input signal is determined as the 2-2 pull-down signal is adjusted.

Referring to FIG. 12, next, the 2-2 predictive control means 63 of the 2-2 sequence detection means 16 receives the 2-2 sequence detection signal 'tci1' outputted from the 2-2 field sequence detection means 61 and the predictive control flag 'tciflg1' outputted from the occurrence frequency detection means 62. In accordance with the predictive control flag 'tciflg1' indicative of a certainty of being the 2-2 pull-down signal determined by the occurrence frequency detection means 62, the 2-2 predictive control means 63 controls the result of the detection of the 2-2 sequence in the 2-2 field sequence detection means 61, and outputs a 2-2 pull-down detection signal 'tci22' indicative of detection of the 2-2 pull-down signal. As shown in FIG. 12, the 2-2 predictive control means 63 includes a selection means 64 for controlling the 2-2 sequence detection signal 'tci1' in the 2-2 field sequence detection means 61.

The selection means 64 of the 2-2 predictive control means 63 receives the 2-2 sequence detection signal 'tci1' which is an output of the 2-2 field sequence detection means 61 and the predictive control flag 'tciflg1' from the occurrence frequency detection means 62, and in accordance with the predictive control flag 'tciflg1' from the occurrence frequency detection means 62, switches between the 2-2 sequence detection signal 'tci1' from the 2-2 field sequence detection means 61 and a fixed signal. When the received predictive control flag 'tciflg1' has a value of one, the selection means 64 determines the input video signal is the 2-2 pull-down signal, selects the 2-2 sequence detection signal 'tci1' by the 2-2 field sequence detection means 61, and outputs it as the 2-2 pull-down detection signal 'tci22' indicative of detection of the 2-2 pull-down signal. When the predictive control flag 'tciflg1' has a value of zero, on the other hand, refers to when the input video signal is not likely to be the 2-2 pull-down signal or the field period (a time until the occurrence frequency count value 'tc1' becomes not smaller than the effective count value 'PTH2') until the input video signal is determined not to be likely to be the 2-2 pull-down signal. Thus, the selection means 64 does not select the 2-2 sequence detection signal 'tci1' by the 2-2 field sequence detection means 61, and selects the fixed signal 'tci22' (having a value of zero). At this time, the 2-2 sequence detection signal 'tci1' temporarily satisfies the commonly-used 2-2 sequence condition and thus, even when the 2-2 sequence detection signal 'tci1' has a value of one, the telecine interpolation processing is not started.

The 2-2 pull-down detection signal 'tci22' indicative of detection of the 2-2 pull-down signal controlled by the 2-2 predictive control means 63 is sent to the pull-down determination means together with the 2-2 phase flag 'tcf22' from the 2-2 field sequence detection means 61.

Explanation will next be made as to the pull-down determination means 17 of the pull-down sequence detection means 14 in FIG. 1.

The pull-down determination means 17 receives the 2-3 pull-down detection signal 'tci23' and the 2-3 phase flag 'tcf23' from the 2-3 sequence detection means 15, and also the 2-2 pull-down detection signal 'tci22' and the 2-2 phase flag 'tcf22' from the 2-2 sequence detection means 16. The pull-down determination means also receives the high-frequency-picture-element cumulative value 'filhv' from the field resolution determination means 13 of the telecine detection means 6. In accordance with the 2-3 pull-down detection signal 'tci23' and the 2-3 phase flag 'tcf23' from the 2-3 sequence detection means 15 and the 2-2 pull-down detection signal 'tci22' and the 2-2 phase flag 'tcf22' from the 2-2 sequence detection means 16; the pull-down determination means 17 detects whether or not the input video signal is the telecine video signal (either the 2-3 pull-down signal or the 2-2 pull-down signal), and outputs the telecine detection signal 'tci' and the sequence interpolation phase flag 'tcf'. In accordance with the high-frequency-picture-element cumulative value 'filhv' from the field resolution determination means 13, the pull-down determination means 17 also generates and outputs a mixing ratio signal 'tcmix' indicative of a mixing ratio of the interpolation signals (signals for interpolation) to be used in the mixing means 8 of the interpolation signal generation means 110.

Figure 18:
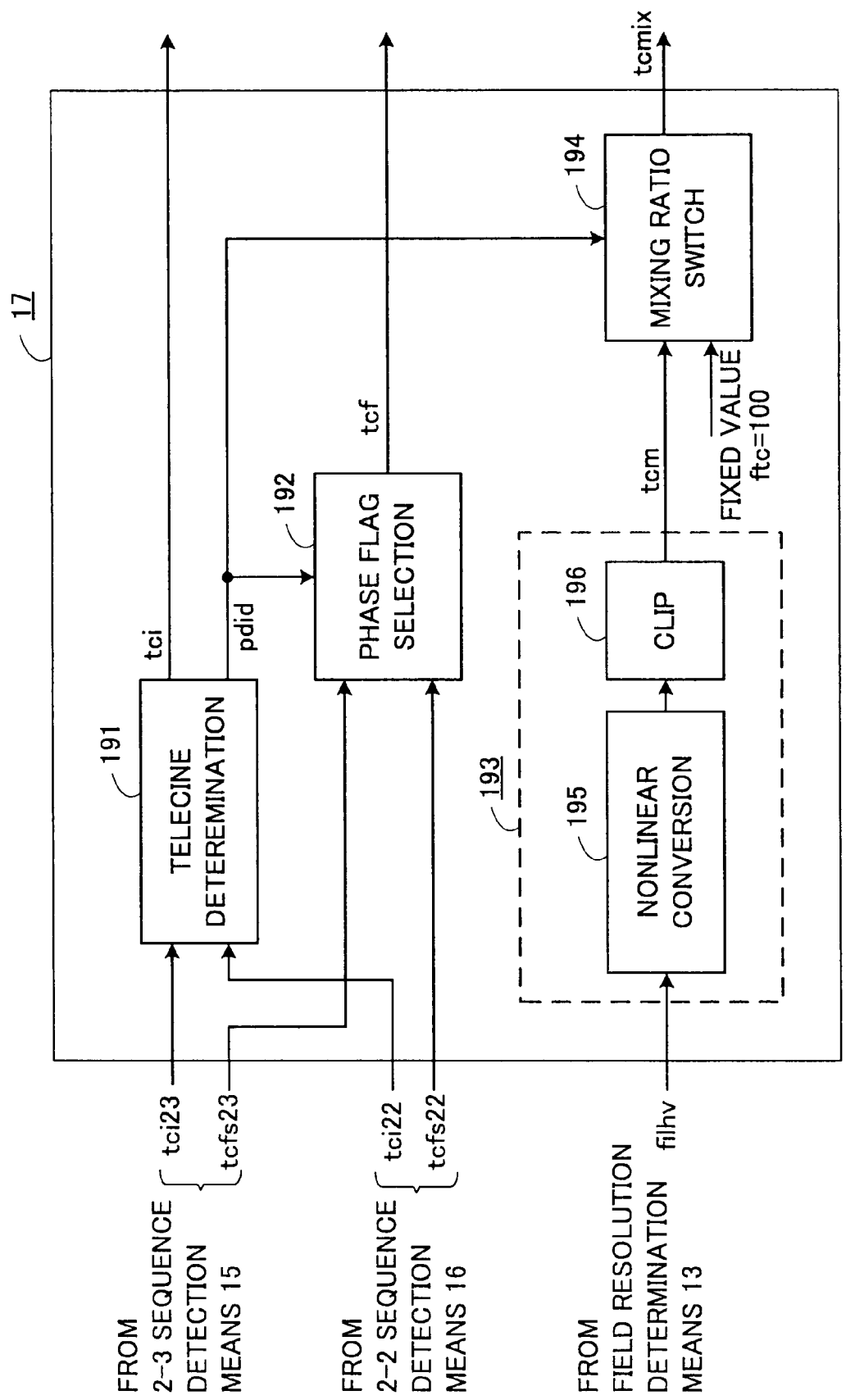
FIG. 18 is a block diagram showing an exemplary configuration of a pull-down determination means in the video signal processing apparatus according to the first embodiment.

FIG. 18 is a block diagram showing an exemplary configuration of the pull-down determination means 17 of the pull-down sequence detection means 14 in the first embodiment. Referring to FIG. 18, the pull-down determination means 17 in the first embodiment includes a telecine determination means 191, a phase flag selection means 192, an interpolation-mixing-ratio conversion means 193, and a mixing ratio switch means 194. The interpolation-mixing-ratio conversion means 193 includes, for example, a nonlinear conversion means 195 and a clip means 196.

Referring to FIG. 18, the telecine determination means 191 of the pull-down determination means 17 receives the 2-3 pull-down detection signal 'tci23' from the 2-3 sequence detection means 15 and the 2-2 pull-down detection signal 'tci22' from the 2-2 sequence detection means 16. In accordance with the 2-3 pull-down detection signal 'tci23' and the 2-2 pull-down detection signal 'tci22', the telecine determination means 191 determines whether or not the input video signal is the telecine video signal (i.e., either the 2-3 pull-down signal or the 2-2 pull-down signal), and as a result of the determination, generates and outputs a telecine detection signal 'tci' and an identification signal 'pdid' for distinction between the 2-3 pull-down signal and the 2-2 pull-down signal.

In accordance with the 2-3 pull-down detection signal 'tci23' and the 2-2 pull-down detection signal 'tci22', the telecine determination means 191 determines whether the 2-3 pull-down detection signal 'tci23' is a value of one or the 2-2 pull-down detection signal 'tci22' is a value of one. When either one of the signals is a value of one, the telecine determination means 191 determines the input video signal is the telecine video signal, and sets the telecine detection signal 'tci' indicative of detection of the telecine video signal at a value of one. When the signals 'tci23' and 'tci22' are both zero, the telecine determination means 191 determines the input video signal is not the telecine video signal, and sets the telecine detection signal 'tci' at a value of zero to output it. The fact that the telecine detection signal 'tci' has a value of one means when either one of the 2-3 pull-down signal and the 2-2 pull-down signal is detected. In accordance with the 2-3 pull-down detection signal 'tci23' and the 2-2 pull-down detection signal 'tci22', the telecine determination means 191 generates the identification signal 'pdid' for distinction of the converted pull-down method. For example, when the 2-3 pull-down detection signal 'tci23' has a value of one and when the signals 'tci23' and 'tci22' have a value of one or zero, the telecine determination means 191 sets a value of the identification signal 'pdid' at a value of zero to output it. When the 2-2 pull-down detection signal 'tci22' has a value of one, the telecine determination means 191 sets a value of the identification signal 'pdid' at a value of one to output it. In this case, when the video signal corresponds to the 2-3 pull-down detection signal 'tci23' having a value of one and also to the 2-3 pull-down signal having a value of one, the telecine determination means 191 determines that the input video signal is the 2-3 pull-down signal, and sets the identification signal 'pdid' at a value of zero to output it. In other words, with regard to the detection of the telecine video signal, the result of detection of the 2-3 pull-down is preferential.

With respect to the generation of the identification signal 'pdid', the result of detection of the 2-2 pull-down is preferential. For example, when the 2-2 pull-down detection signal 'tci22' has a value of one and when the signals 'tci23' and 'tci22' have both a value of one or zero, the telecine determination means sets a value of the identification signal 'pdid' at a value of one to output it. When the 2-3 pull-down detection signal 'tci23' has a value of one, the telecine determination means sets a value of the identification signal 'pdid' at a value of zero to output it. In this case, when the input video signal is such a video signal that the 2-3 pull-down detection signal 'tci23' has a value of one and the 2-2 pull-down detection signal 'tci22' also has a value of one, the telecine determination means determines that the input video signal is the 2-2 pull-down signal, and outputs the identification signal 'pdid' having a value of one. The value of the identification signal 'pdid' is not limited to the above-mentioned value. Another value may be employed so long as the value can distinguish between the 2-3 pull-down signal and the 2-2 pull-down signal.

The phase flag selection means 192 of the pull-down determination means 17 receives the 2-3 phase flag 'tcf23' from the 2-3 sequence detection means 15, the 2-2 phase flag 'tcf22' from the 2-2 sequence detection means 16, and the identification signal 'pdid' from the telecine determination means 191. The phase flag selection means 192, in accordance with the identification signal 'pdid', selects the interpolation phase flag 'tcf' (e.g., tcf=1 when the previous field is the same field and tcf=0 when the subsequent field is the same field) indicative of the sequence phase in the telecine interpolation from the 2-3 phase flag 'tcf23' and the 2-2 phase flag 'tcf22', and outputs it. In other words, for example, when detecting the 2-2 pull-down signal having a value of one of the identification signal 'pdid', the phase flag selection means selects the 2-2 phase flag 'tcf22' and outputs the interpolation phase flag 'tcf'. When the identification signal 'pdid' indicates zero, on the other hand, the phase flag selection means 192 selects the 2-3 phase flag 'tcf23' and outputs the interpolation phase flag 'tcf'.

The interpolation-mixing-ratio conversion means 193 of the pull-down determination means 17 receives the high-frequency-picture-element cumulative value 'filhv' from the field resolution determination means 13. The interpolation-mixing-ratio conversion means 193 determines a resolution indicative of the degree of high frequency components existing in each field period unit, converts it to a mixing ratio of the interpolation signals, and outputs a mixing ratio signal 'tcm' after converted based on the degree of the high frequency components existing in the target field.

The nonlinear conversion means 195 of the interpolation-mixing-ratio conversion means 193 nonlinearly converts the high-frequency-picture-element cumulative value 'filhv' to a mixing ratio of the interpolation signals. The nonlinear conversion is carried out by first subtracting a predetermined value 'HBSUB' from the high-frequency-picture-element cumulative value 'filhv', setting the negative value at a value of zero, and then multiplying the subtracted result by a predetermined value 'HBMLT'.

The clip means 196 of the interpolation-mixing-ratio conversion means 193 clips the converted value from the nonlinear conversion means 195 into a value within a predetermined range, that is, a value indicative of the mixing ratio. Accordingly, the clip means 196 outputs a mixing ratio signal 'tcm' which is obtained by nonlinearly converting the high-frequency-picture-element cumulative value 'filhv' and which indicates the mixing ratio within the predetermined range.

Figure 19:
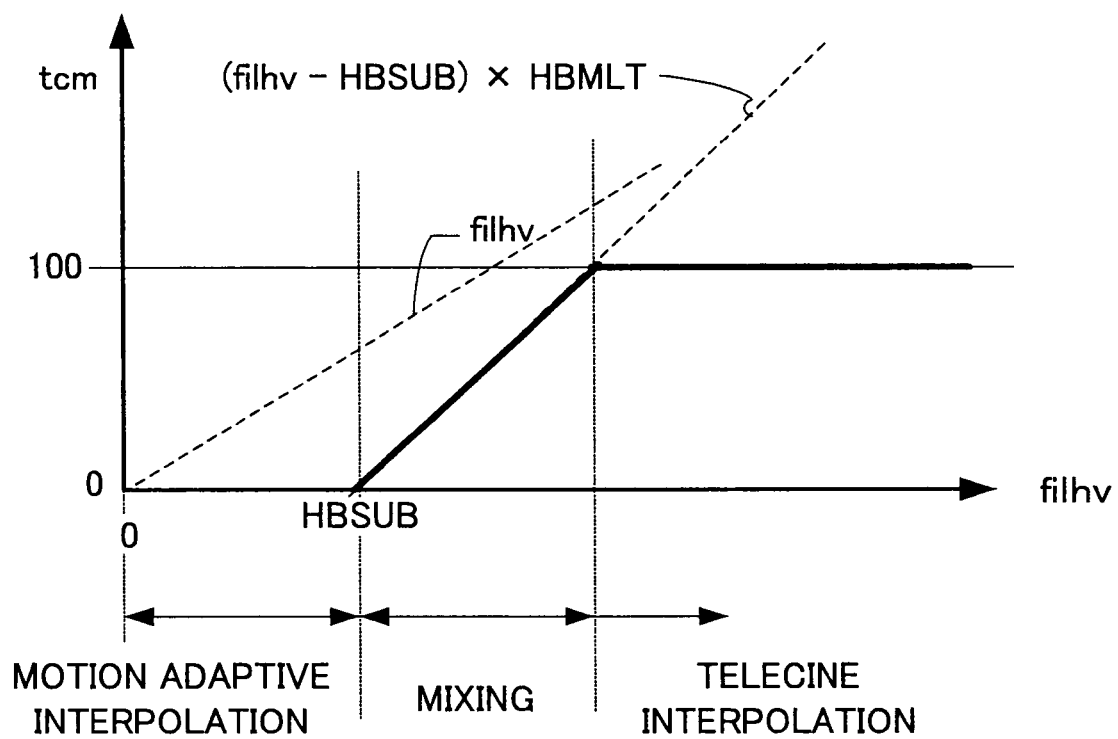
FIG. 19 is a diagram showing a characteristic of conversion from a high-frequency-picture-element cumulative value 'filhv' (a horizontal axis) to a mixing ratio signal 'tcm' (a vertical axis) in an interpolation-mixing-ratio conversion means of the pull-down determination means in the video signal processing apparatus according to the first embodiment.

FIG. 19 is a characteristic diagram showing conversion of the high-frequency-picture-element cumulative value 'filhv' (a horizontal axis) to the mixing ratio signal 'tcm' (a vertical axis) in the interpolation-mixing-ratio conversion means 193. The mixing ratio signal 'tcm' is shown when the mixing ratio is outputted in a range of 0 to 100%. As the mixing ratio signal 'tcm' approaches the value 100%, the degree of the high frequency components existing in the target field is increased, and the field is determined to have a high resolution. In the mixing means 8 of the interpolation signal generation means 110, the ratio of the telecine interpolation signal 'It' from the telecine interpolation processing means 7 is increased. This is because the higher the resolution is, the more the I/P conversion based on the telecine interpolation becomes effective. When the mixing ratio signal 'tcm' has a value of zero, on the other hand, the degree of the high frequency components existing in the target field is small and the field is determined to have a low resolution. In the mixing means 8, the interpolation signal 'Im' from the motion adaptive interpolation processing means 5 is used as the interlaced signal (i.e., a ratio between the interpolation signal 'Im' based on the motion adaptive interpolation processing 5 and the telecine interpolation signal 'It' is 100 to 0%). Thus in the field determined to have a low resolution, erroneous determination of an interfield difference tends to occur. However, since the interlaced signal can be obtained by mixing the telecine interpolation signal 'It' and the interpolation signal 'Im', picture degradation caused by a combing phenomenon can be reduced.

Explanation has been made in connection with the case where the interpolation-mixing-ratio conversion means 193 having the nonlinear conversion means 195 and the clip means 196 finds a mixing ratio of the interpolation signals in accordance with the degree of the high frequency components existing in the target field. However, when a ROM (Read Only Memory) or the like is formed based on the high-frequency-picture-element cumulative value 'filhv', the mixing ratio signal 'tcm' may be generated through predetermined conversion.

The mixing ratio switch means 194 of the pull-down determination means 17 receives the mixing ratio signal 'tcm' from the interpolation-mixing-ratio conversion means 193 and the identification signal 'pdid' from the telecine determination means 191. The mixing ratio switch means 194 switches between the mixing ratio signal 'tcm' and a fixed signal 'ftc' in accordance with the identification signal 'pdid', and outputs a mixing ratio signal 'tcmix' corresponding to the interlaced signal of one field period unit. In other words, when the identification signal 'pdid' has a value of one and the 2-2 pull-down signal is detected, the mixing ratio switch means 194 selects the mixing ratio signal 'tcm' and outputs it as the mixing ratio signal 'tcmix'. On the other hand, when the identification signal 'pdid' has a value of zero and the input video signal is other than the 2-3 pull-down signal or the telecine video signal, the mixing ratio switch means 194 outputs a fixed value '100' as the mixing ratio signal 'tcmix' with the telecine interpolation signal 'It' set at 100%. In other words, as has been described in the configurations of the 2-3 sequence detection means 15 and the 2-2 sequence detection means 16, when the 2-2 pull-down signal is detected, a sequence is detected based on the period of the interfield difference information. Thus the sequence can be detected based on the period of the interfield difference information for the 2-3 pull-down signal. In order to reduce the picture degradation caused by the erroneous determination of the interfield difference, the mixing ratio signal 'tcmix' may be arranged to be used only upon the detection of the 2-2 pull-down signal.

The interpolation phase flag 'tcf' which is the output of the phase flag selection means 192 of the pull-down determination means 17 is outputted to the telecine interpolation processing means 7 of the interpolation signal generation means 110. The telecine interpolation processing means 7 performs telecine interpolation processing in accordance with the interpolation phase flag 'tcf' and outputs the telecine interpolation signal 'It'.

The telecine detection signal 'tci' which is an output of the telecine determination means 191 of the pull-down determination means 17 and the mixing ratio signal 'tcmix' from the mixing ratio switch means 194 are sent to the mixing means 8 of the interpolation signal generation means 110. When the telecine determination means 191 determines that the telecine detection signal 'tci' has a value of zero and the input video signal is not the telecine video signal, the mixing means 8 in FIG. 1 determines that the input video signal is a commonly-used video signal, and selects the interpolation signal 'Im' from the motion adaptive interpolation processing means 5 as an interpolation signal 'I' even when the mixing ratio signal 'tcmix' has any value. When the telecine detection signal 'tci' has a value of one and the input video signal is the telecine video signal, the mixing means 8 mixes the interpolation signal 'Im' and the telecine interpolation signal 'It' to generate the interpolation signal 'I' in accordance with the mixing ratio of the mixing ratio signal 'tcmix'. When detecting the 2-2 pull-down signal, the mixing ratio switch means 194 selects the mixing ratio signal 'tcm'. Accordingly, the interpolation is carried out by the mixed signal based on the mixing ratio of the mixing ratio signal 'tcmix'. When the input video signal is the 2-3 pull-down signal, the mixing ratio signal 'tcmix' is outputted as a fixed value '100'. Thus the interpolation signal 'I' has a value based on the telecine interpolation signal 'It'.

Explanation will then be made in detail as to the operation of the pull-down sequence detection means 14 which detects the telecine video signal in the telecine detection means 6 and also as to the operation of the interpolation signal generation means 110 in the video signal processing apparatus according to the first embodiment. Explanation will first be made as to the operation when the 2-3 pull-down signal is inputted from the input terminal 100 as the input video signal 'Ia0'.

FIGS. 20A to 20C are explanatory diagrams showing 2-3 pull-down conversion, wherein FIG. 20A shows a film image signal of 24 frames per second, FIG. 20B shows a 2-3 pull-down signal, FIG. 20C shows field numbers. As shown in FIGS. 20A to 20C, a first frame 'A' in a signal such as a cinema film is converted to correspond to first and second fields 'At' and 'Ab' of the video signal; a second frame 'B' is to correspond to third to fifth fields 'Bt', 'Bb' and 'Bt' of the video signal; a third frame 'C' is to correspond to sixth and seventh fields 'Cb' and 'Ct' of the video signal; and a fourth frame 'D' is to correspond to eighth to tenth fields 'Db', 'Dt' and 'Db' of the video signal. In this connection, in the drawing, a suffix 't' indicates a top field as a field of relatively upper lines, and a suffix 'b' indicates a bottom field as a field of relatively lower lines.

As shown in FIGS. 20A to 20C, the third field 'Bt' and the fifth field 'Bt' have the same contents, and the eight field 'Db' and the tenth field 'Db' have the same contents. In this way, in the 2-3 pull-down signal, the same field as the field previous by two fields is repeated once every five fields. Accordingly, the interframe motion-picture-element cumulative value 'mvfr' from the interframe correlation detection means 11 in the fifth and tenth fields have a value of zero not larger than a predetermined value (a value established in consideration of a noise component close to zero). The interframe motion-picture-element cumulative value 'mvfr' is obtained based on the interframe difference information, and the relationship of the interframe difference information is repeatedly generated once every five fields. The interfield motion-picture-element cumulative value 'mvfil' from the interfield correlation detection means 12 have values of zero or not larger than a predetermined value (a value established in consideration of a noise component close to zero) in the second, fourth, fifth, seventh, ninth, tenth, . . . fields.

FIGS. 21A to 21D are explanatory diagrams showing a relationship between the telecine interpolation and the interpolation phase flag 'tcf' when the apparatus detects a 2-3 pull-down signal and performs I/P conversion, wherein FIG. 21A shows field numbers, FIG. 21B shows an interlaced scan video signal as the 2-3 pull-down signal, FIG. 21C shows the interpolation phase, and FIG. 21D shows a progressive scan video signal. Generation of an interpolation scan line signal is made for one-field delay signal. The target telecine video signal fields are repeated in such a way that the first field has an interpolation phase corresponding to a phase of the second field which is a succeeding field in time (i.e., an interpolation phase of the current field signal is shown by "succeeding" in FIG. 21C), the second field has an interpolation phase corresponding to a phase of the first field which is a preceding field in time (i.e., an interpolation phase of the two-field delayed field signal is shown by "preceding" in FIG. 21C), the third field has an interpolation phase corresponding to a phase of the fourth field which is a succeeding field in time, and the fourth and fifth fields have interpolation phases corresponding to phases of the third and fourth fields which are preceding fields in time respectively. The apparatus performs telecine interpolation processing in accordance with the interpolation phase so that the original frames (corresponding to a frame 'A', a frame 'B', . . . in FIG. 20A) are restored to form the progressive scan video signal, and outputs the progressive scan video signal.

Figure 22:
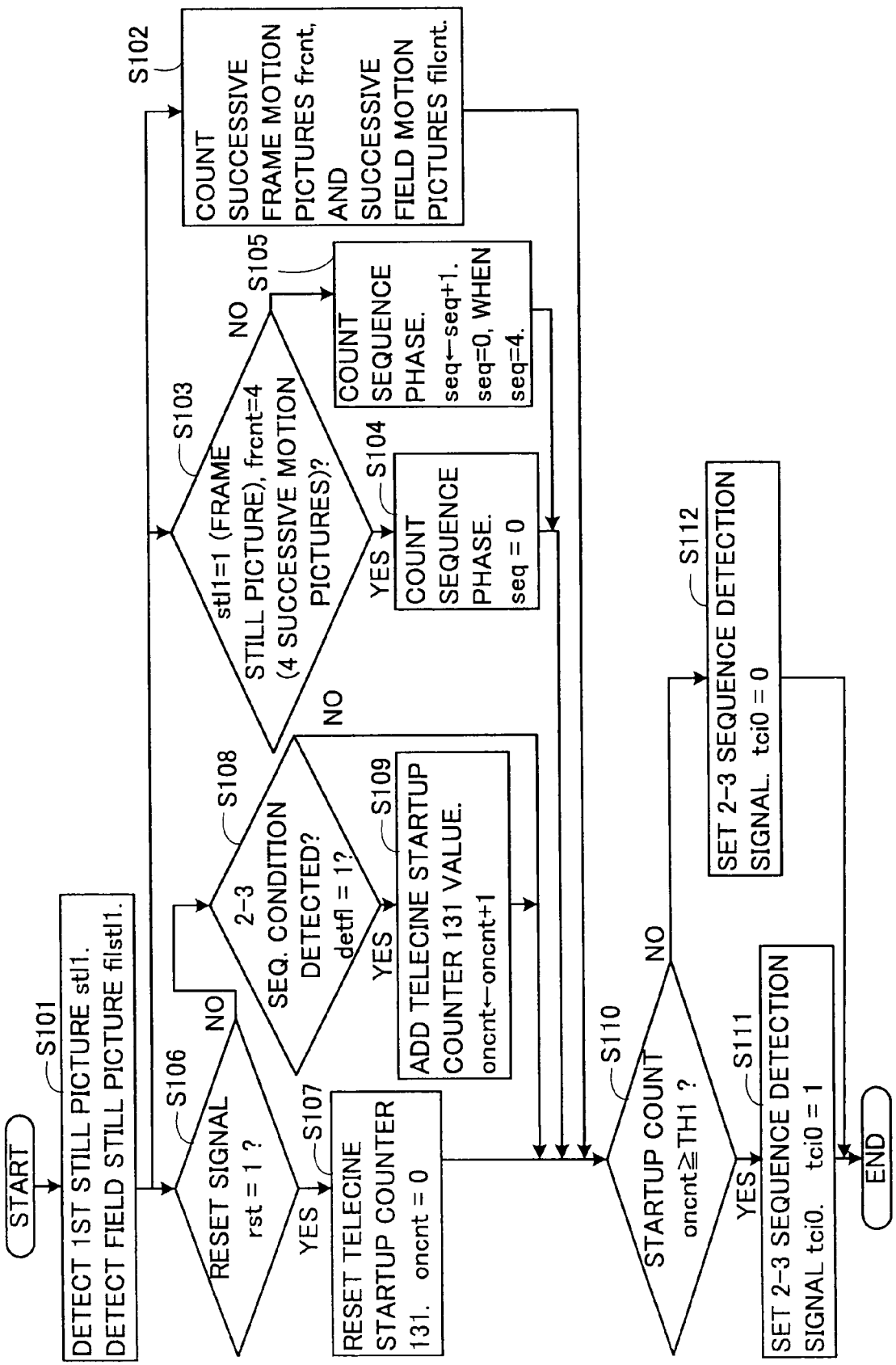
FIG. 22 is a flowchart showing operation of the 2-3 field sequence detection means of the 2-3 sequence detection means in the video signal processing apparatus according to the first embodiment.
Figure 23:
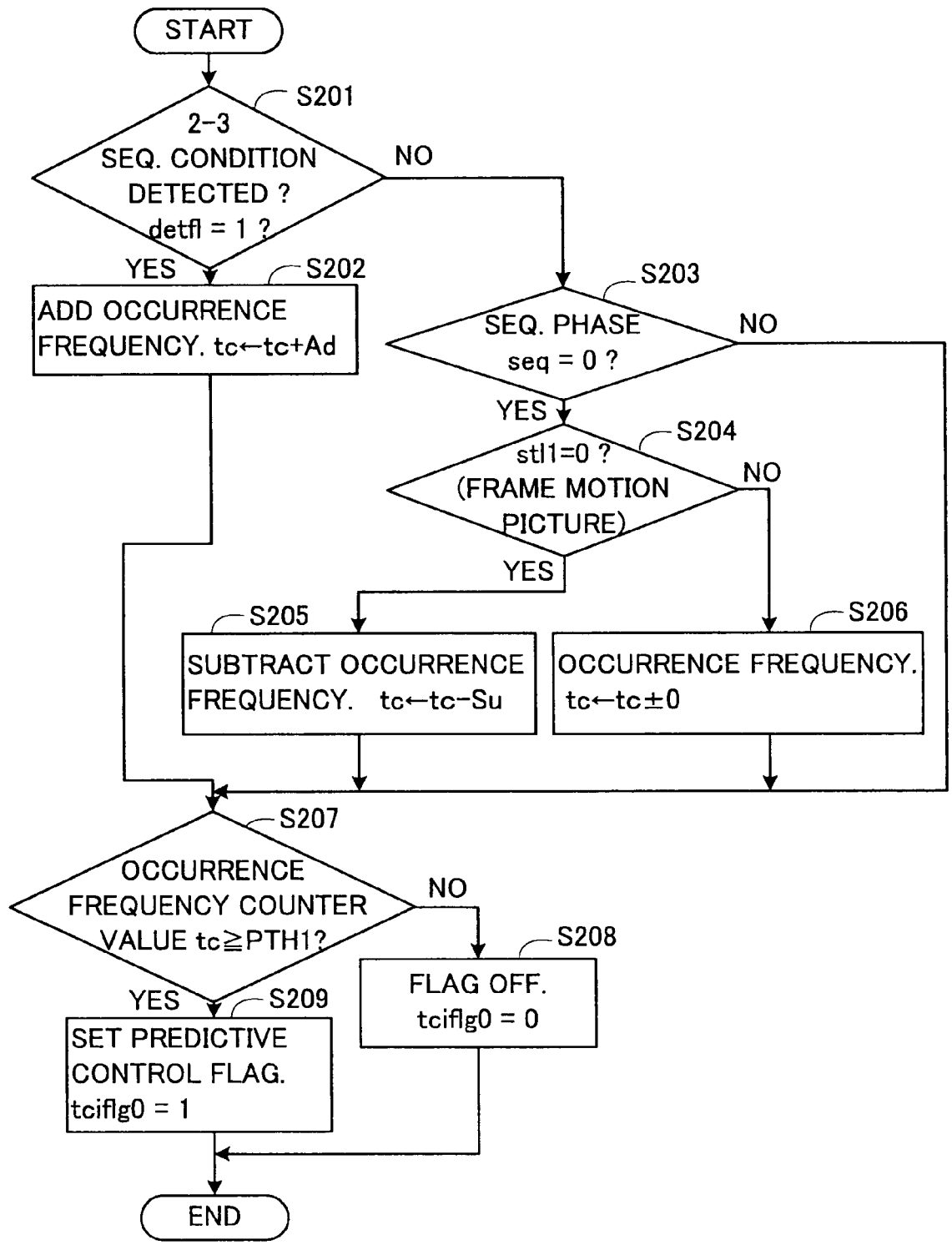
FIG. 23 is a flowchart showing operation of the occurrence frequency detection means of the 2-3 sequence detection means in the video signal processing apparatus according to the first embodiment.

FIG. 22 is a flowchart showing processes of detecting the repetition condition of a 2-3 field sequence in the 2-3 sequence detection means 15 of the pull-down sequence detection means 14, and FIG. 23 is a flowchart showing processes of monitoring a sequence of the input video signal to predictively control the 2-3 sequence detection signal 'tci0'. Since telecine detection is carried out in each field as has been described above, the processes shown in FIG. 22 and FIG. 23 are carried out for each field.

Figure 24:
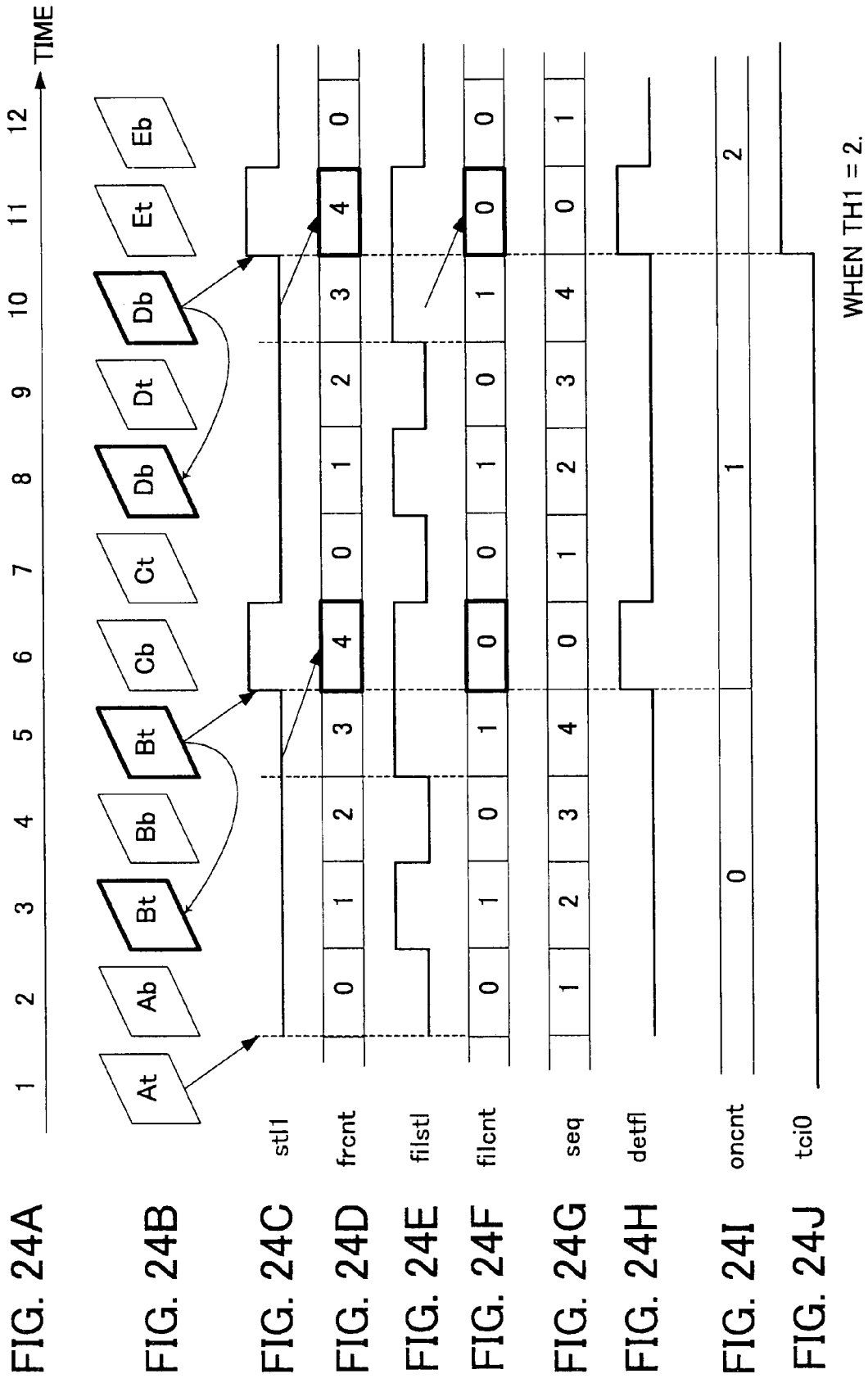

FIGS. 24A to 24J are explanatory diagrams showing operation of the 2-3 field sequence detection means 51 of the 2-3 sequence detection means 15, wherein FIG. 24A shows field numbers, FIG. 24B shows an interlaced scan video signal as the 2-3 pull-down signal, FIG. 24C shows a result of the detection of the frame still picture 'stl1' which is an output of the first still picture detection means 121a, FIG. 24D shows a count value of the successive frame motion pictures 'frcnt' which is the output of the first motion picture field counter 123, FIG. 24E shows a result of the detection of the field still picture 'filstl' which is the output of the field-still-picture detection means 122, FIG. 24F shows a count value of the successive field motion pictures 'filcnt' which is the output of the second motion picture field counter 124, FIG. 24G shows a count value of the 2-3 sequence phase 'seq' which is the output of the sequence phase counter 133, FIG. 24H shows a result of the detection of the 2-3 sequence condition 'detfl' outputted from the sequence condition detection means 125, FIG. 24I shows an output 'oncnt' of the telecine startup counter 131, and FIG. 24J shows a 2-3 sequence detection signal 'tci0' which is the output of the sequence-detection-signal generation means 132.

Explanation will be made below as to operation of detecting a sequence of the 2-3 pull-down signal with reference to FIG. 22, FIG. 23, and FIGS. 24A to 24J.

When such a 2-3 pull-down signal as shown in FIG. 20B is inputted from the input terminal 100 as an interlaced scan video signal, the interframe correlation detection means 11 detects interframe difference information between the current field signal 'Ia0' and the two-field delayed signal 'Ic0' to output the interframe motion-picture-element cumulative value 'mvfr' and the motion-picture-element cumulative difference value 'dfmvfr'. Further, the interfield correlation detection means 12 detects interfield difference information between the current field signal 'Ia0' and the one-field delayed signal 'Ib0' to output the interfield motion-picture-element cumulative value 'mvfil', and the field resolution determination means 13 outputs the high-frequency-picture-element cumulative value 'filhv' in the current field signal 'Ia0'. Next, the first still picture detection means 121a of the 2-3 field sequence detection means 51 detects a frame still picture from the obtained interframe motion-picture-element cumulative value 'mvfr' to obtain a result of the detection of the frame still picture 'stl1'. Further, the field-still-picture detection means 122 of the 2-3 field sequence detection means 51 detects a field still picture from the interfield motion-picture-element cumulative value 'mvfil' to obtain a result of the detection of the field still picture 'filstl'.

Referring to FIG. 22, when the result of the detection of the frame still picture 'stl1' and the result of the detection of the field still picture 'filstl' are obtained from the interframe motion-picture-element cumulative value 'mvfr' and the interfield motion-picture-element cumulative value 'mvfil' (step S101), the first and second motion picture field counters 123 and 124 count number of successive frame motion pictures and number of successive field motion pictures respectively to output the count value of the successive frame motion pictures 'frcnt' and the count value of the successive field motion pictures 'filcnt' at the timing of the next field respectively (step S102).

Since the interframe motion-picture-element cumulative value 'mvfr' and the interfield motion-picture-element cumulative value 'mvfil' for one field period are values obtained by accumulating motion picture elements in the field, the result of the detection of the still picture based on the interframe difference information and the interfield difference information from the input current field signal 'Ia' are outputted at the timing of the next field (one-field delay signal 'Ib'). Thus as shown in FIGS. 24C and 24E, the result of the detection of the frame still picture 'stl1' and the result of the detection of the field still picture 'filstl' are outputted at the timing of the field next to the input signal, the result of the detection of the frame still picture 'stl1' has a value of one and the result of the detection of the field still picture 'filstl' has a value of one at the field positions (the sixth and eleventh fields) subsequent to the fifth and tenth fields, and a complete still picture field is detected once every five fields.

Next, the sequence phase counter 133 repeatedly counts by ones for each field from zero to four as one period of five fields in accordance with the result of the detection of the frame still picture 'stl1' and the count value of the successive frame motion pictures 'frcnt' until the previous field (steps S103 and S105 in FIG. 22). When the result of the detection of the frame still picture 'stl1' has a value of one and the count value of the successive frame motion pictures 'frcnt' until the previous field has a value of four, the sequence phase counter 133 sets the count value of the 2-3 sequence phase 'seq' at a value of zero (step 104 in FIG. 22).

FIG. 24G shows the count value of the sequence phase 'seq', in which, when the result of the detection of the frame still picture 'stl1' has a value of one and the count value of the successive frame motion pictures 'frcnt' until previous field has a value of four, the count value of the sequence phase 'seq' has a value of zero. As shown in FIG. 24G, the count value of the sequence phase 'seq' is repeated at intervals of five fields and the interpolation target field is the one-field delay signal. Accordingly, the field corresponding to the count value of the sequence phase 'seq' having a value of zero appears once every five fields of the 2-3 pull-down signal, and the position where the count value of the sequence phase 'seq' having a value of zero corresponds to the position of the field which is the same as the field previous by two fields.

Referring to FIG. 22, when receiving the reset signal 'rst' having a value of one from the reset signal generation means 144, the telecine startup counter 131 determines that the input video signal is not the 2-3 pull-down signal and resets the count value (oncnt=0) (steps S106 and S107). When the telecine startup counter 131 receives the 2-3 pull-down signal, the reset signal 'rst' has a value of zero (step S106) and the sequence condition detection means 125 detects the 2-3 sequence condition (step S108). When the 2-3 sequence condition are detected and the result of the detection of the 2-3 sequence condition 'detfl' has a value of one, the telecine startup counter 131 counts the number of times of sequence repetition (step S109).

FIG. 24I shows the count value 'oncnt' of the telecine startup counter 131. When a field where the result of the detection of the 2-3 sequence condition 'detfl' has a value of one appears, the telecine startup counter 131 counts the number of times of repetition of the 2-3 sequence by adding one to the count value 'oncnt' (i.e., oncnt←oncnt+1). The sequence-detection-signal generation means 132 compares the count value 'oncnt' of the 2-3 sequence and the startup count value 'TH1' (step S110 in FIG. 22). When the count value of the 2-3 sequence 'oncnt' becomes not smaller than the startup count value 'TH1' and the sequence is continuously detected by 'TH1' times, the sequence-detection-signal generation means 132 sets the 2-3 sequence detection signal 'tci0' indicative of a result of the 2-3 sequence detection at a value of one (step S111 in FIG. 22). When the count value of the 2-3 sequence 'oncnt' becomes zero or smaller than the startup count value 'TH1', the sequence-detection-signal generation means 132 sets the 2-3 sequence detection signal 'tci0' at a value of zero (step S112 in FIG. 22). The 2-3 sequence detection signal 'tci0' in FIG. 24J shows when the sequence count is, for example, two or more and the input video signal is detected as the 2-3 pull-down signal (TH1=2). Accordingly, when the 2-3 sequence of five fields is detected continuously by two times or more and the 2-3 sequence detection signal 'tci0' has a value of one, the sequence-detection-signal generation means 132 determines that the input video signal meets the sequence condition of the 2-3 pull-down signal, thereby outputting the 2-3 sequence detection signal 'tci0' having a value of one to the 2-3 predictive control means 53.

Referring to FIG. 23, when the occurrence frequency detection means 52 of the 2-3 sequence detection means 15 detects the 2-3 sequence condition and the result of the detection of the 2-3 sequence condition 'detfl' has a value of one (step S201), the occurrence frequency detection means 52 adds a value 'Ad' to the count value of the occurrence frequency 'tc' (i.e., tc←tc+Ad) (step S202). On the other hand, when the 2-3 sequence condition is not detected, that is, when the count value of the 2-3 sequence phase 'seq' which is the phase of the fifth field has a value of zero (step S203), if the result of the detection of the frame still picture 'stl1' has a value of zero as a frame motion picture (step S204), the occurrence frequency detection means 52 subtracts the predetermined value 'Su' from the count value of the occurrence frequency 'tc' (i.e., tc←tc−Su) (step S205). When the phase of the fifth field, i.e., the count value of the 2-3 sequence phase 'seq' has a value of zero and the result of the detection of the frame still picture 'stl1' is different from the above-mentioned result, the occurrence frequency detection means 52 performs no addition/subtraction (i.e., tc←tc±0) (step S206). This is because, when the count value of the 2-3 sequence phase 'seq' has a value of zero and the result of the detection of the frame still picture 'stl1' has a value of one (a frame still picture), the occurrence frequency detection means 52 cannot determine whether or not the input video signal meets the 2-3 sequence condition.

The predictive-control-flag generation means 152 of the occurrence frequency detection means 52 compares the count value of the occurrence frequency 'tc' and the effective count value 'PTH1', and determines a certainty of being the 2-3 pull-down signal (step S207). When the count value of the occurrence frequency 'tc' becomes not smaller than the effective count value 'PTH1', the predictive-control-flag generation means 152 determines that the input video signal is the 2-3 pull-down signal, and sets the predictive control flag 'tciflg0' at a value of one (step S209). The predictive-control-flag generation means 152 sets the predictive control flag 'tciflg0' at a value of zero for a field period (i.e., for a time period until the count value of the occurrence frequency 'tc' becomes not smaller than the effective count value 'PTH1') until the input video signal is determined to be likely to be the 2-3 pull-down signal (step S208). Since the 2-3 sequence condition is not detected when the input video signal has frequent edit points and discontinuities of the 2-3 sequence occurs, the count value of the occurrence frequency 'tc' will not reach the effective count value 'PTH1'. Thus the input video signal is determined not to be likely to be the 2-3 pull-down signal, and the predictive control flag 'tciflg0' remains a value of zero.

When the predictive control flag 'tciflg0' has a value of one and the input video signal is determined as the 2-3 pull-down signal, the selection means 54 of the 2-3 predictive control means 53 outputs the 2-3 sequence detection signal 'tci0' from the 2-3 field sequence detection means 51 as a 2-3 pull-down detection signal 'tci23' indicative of detection of the 2-3 pull-down signal. The 2-3 pull-down detection signal 'tci23' is sent to the pull-down determination means 17, and the pull-down determination means 17 outputs the 2-3 pull-down detection signal 'tci23' as the telecine detection signal 'tci' to the mixing means 8 in FIG. 1. When the 2-3 pull-down detection signal 'tci23' has a value of one (tci23=1) and the pull-down determination means 17 outputs the telecine detection signal 'tci' as a value of one, telecine interpolation processing is initiated and the mixing means 8 selects the signal from the telecine interpolation processing means 7 to output it. Since the mixing ratio signal 'tcmix' having a fixed value '100' is outputted from the pull-down determination means 17 when the 2-3 pull-down detection signal 'tci23' has a value of one and the input video signal is detected as the 2-3 pull-down signal, the interpolation signal 'I' has a value of the telecine interpolation signal 'It'.

Explanation will next be made as to operation of resetting the telecine interpolation processing when the input video signal is changed to a signal other than the 2-3 pull-down signal or when the input video signal inputted to the input terminal 100 is a 2-3 pull-down signal, the regularity of sequence of which is disturbed by broadcasting edit, insertion of a CM or a telop, or the like in the course of the 2-3 pull-down signal. The telecine interpolation processing is reset by setting the telecine detection signal 'tci' from the pull-down determination means 17 at a value of zero, that is, by setting the 2-3 pull-down detection signal 'tci23' at a value of zero. When the reset signal 'rst' from the reset signal generation means 144 of the 2-3 field sequence detection means 51 has a value of one or when the predictive control flag 'tciflg0' in the predictive-control-flag generation means 152 has a value of zero, the input video signal is determined not to be the 2-3 pull-down signal and the 2-3 pull-down detection signal 'tci23' having a value of zero is outputted.

When edit points are frequently present in the input video signal and discontinuous points appear in the 2-3 sequence signal, the 2-3 sequence detection means 15 does not detect the 2-3 sequence condition. Thus, the count value of the occurrence frequency 'tc' does not reach the effective count value 'PTH1', the input video signal is determined not to be likely to be the 2-3 pull-down signal, and the predictive control signal 'tciflg0' is set at a value of zero. Accordingly, the 2-3 pull-down detection signal 'tci23' has a value of zero and the interpolation signal generation means 110 outputs the interpolation signal 'Im' from the motion adaptive interpolation processing means 5 as the interpolation signal 'I'.

When the input video signal is changed from the 2-3 pull-down signal to a video signal for commonly-used television broadcast or the like, the interframe motion-picture-element cumulative value 'mvfr' from the interframe correlation detection means 11 has a large value, and the result of the detection of the frame still picture 'stl1' is successive zeros (frame motion pictures). Thus, when the successive five fields have a value of zero as the result of the detection of the frame still picture 'stl1', the successive frame motion-picture detection means 135 outputs the result of the detection of the successive five fields of frame motion pictures to the reset signal generation means 144, and the reset signal generation means 144 sends a value of one as the reset signal 'rst' to the telecine startup counter 131. When receiving a value of one as the reset signal 'rst', the telecine startup counter 131 determines that the input video signal is not the 2-3 pull-down signal and resets the count value (oncnt=0) (steps S106 and S107 in FIG. 22), and then the sequence-detection-signal generation means 132 sets the 2-3 sequence detection signal 'tci0' at a value of zero.

In the above-described case, the interfield motion-picture-element cumulative value 'mvfil' from the interfield correlation detection means 12 also has a large value and the result of the detection of the field still picture 'filstl' becomes successive zeros (field motion pictures). When two successive fields have a value of zero as the result of the detection of the field still picture 'filstl', the successive field motion-picture detection means 136 outputs the result of the detection of the successive two fields of motion picture fields to the reset signal generation means 144, and the reset signal generation means 144 sends a value of one as the reset signal 'rst' to the telecine startup counter 131. The subsequent operation is substantially the same as or similar to the above-mentioned operation when successive fields of frame motion pictures are detected.

When the input video signal is switched from the 2-3 pull-down signal to a video signal of successive still picture fields, the interframe motion-picture-element cumulative value 'mvfr' from the interframe correlation detection means 11 becomes a small value, and the result of the detection of the frame still picture 'stl2' of the second still picture detection means 121b becomes successive ones one (still pictures). Thus when successive five fields of frame still pictures are successively counted by the successive still-picture detection means 137, the comparison means 138 detects the successive five fields of the frame still pictures and outputs a result of the detection to the reset signal generation means 144. The subsequent operation is substantially the same as or similar to the above-mentioned operation when the successive fields of frame motion pictures are detected.

Further, when discontinuous points appear in the 2-3 sequence signal due to edit points, switching of a video signal, or the like, and when the current field is in, and when the result of the detection of the frame still picture 'stl1' has a value of zero (a frame motion picture) at the phase of the fifth field (i.e., the count value of the 2-3 sequence phase 'seq' has a value of zero), the phase determination means 142 detects that the result of the detection of the frame still picture 'stl1' has a value of zero (motion picture) at the position of the frame still picture appearing once every five fields, and outputs a value of one as the result of the detection 'dph' to the reset signal generation means 144. The reset signal generation means 144 sends a value of one as the reset signal 'rst' to the telecine startup counter 131. The subsequent operation is substantially the same as or similar to the above-mentioned operation when the successive fields of frame motion pictures are detected.

The sequence shift detection means 139 detects a shift in the sequence phase of such a 2-3 pull-down that a still picture field different from the still picture field appearing once every five fields is present. When the 2-3 sequence detection signal 'tci0' has a value of one, the in-sequence still-picture counter 140 of the sequence shift detection means 139 resets the count value to zero each time the count value of the 2-3 sequence phase 'seq' becomes zero. When the sequence phase of the 2-3 pull-down signal is regularly sent, the field having the count value of the 2-3 sequence phase 'seq' having a value of zero is a frame still picture after four successive fields (i.e., a frame still picture appearing once every five fields) (see FIG. 24). In this field, the count value of the in-sequence still-picture counter 140 is reset to a value of zero. Until the next zero reset (until the frame still picture of the next field sequence), the counter counts up when the result of the detection of the frame still picture 'stl3' from the third still picture detection means 121c becomes one. As a result, the in-sequence still-picture counter 140 detects a case where a field different from the frame still picture appearing once every five fields is a frame still picture, and outputs the number of such detected fields.

The comparison means 141 of the sequence shift detection means 139 compares the count value from the in-sequence still-picture counter 140 with a predetermined threshold (e.g., the threshold is a value of one), and when the count value is not smaller than the predetermined threshold one, sets the result of the detection 'dbe' of the frame still picture in the course of the sequence of five fields at a value of one.

The output 'dbe' of the comparison means 141 of the sequence shift detection means 139 is outputted to the reset signal generation means 144. When set to use the result of the sequence shift detection means 139, the reset signal generation means 144 sets the reset signal 'rst' at a value of one when the output 'dbe' from the comparison means 141 is a value of one, and sends the reset signal 'rst' to the telecine startup counter 131. When the input video signal is determined not to be the 2-3 pull-down signal, the count value is reset (oncnt=0) (steps S106 and S107 in FIG. 22) and the sequence-detection-signal generation means 132 sets the 2-3 sequence detection signal 'tci0' at a value of zero. Thus when a sequence phase shift is detected in the course of the 2-3 pull-down signal, the 2-3 sequence detection signal 'tci0' is reset to be a value of zero. Even after the reset, the 2-3 sequence detection means 15 performs operation for detecting the 2-3 pull-down signal. Thus, if the sequence of five fields is regularly inputted and accurately detected, the 2-3 sequence detection means 15 determines that the input video signal satisfies the 2-3 sequence condition, and again outputs a value of one as the 2-3 sequence detection signal.

Further, when such a video signal as to cause a scene change is inputted from the input terminal 100 in the course of the 2-3 pull-down signal, the interframe motion-picture-element cumulative value 'mvfr' from the interframe correlation detection means 11 is largely changed when compared with the value in the commonly-used sequence. Thus when the interframe motion-picture-element cumulative value 'mvfr' is larger than the threshold 'STH', the scene change detection means 143 determines that a scene change took place in this field and outputs a value of one as the result of the detection of the scene change 'sch'. The result of the detection of the scene change 'sch' is outputted to the reset signal generation means 144, which sets the reset signal 'rst' at a value of one for the result of the detection of the scene change one and sends the reset signal 'rst' to the telecine startup counter 131, when set to use the result of the detection of the scene change detection means 143. When receiving the reset signal 'rst' having a value of one, the telecine startup counter 131 determines that the input video signal is not the 2-3 pull-down signal and resets the count value (oncnt=0) (steps S106 and S107 in FIG. 22). The sequence-detection-signal generation means 132 sets the 2-3 sequence detection signal 'tci0' at a value of zero. Accordingly, when a scene change is detected in the course of the 2-3 pull-down signal, the 2-3 sequence detection signal 'tci0' is reset to be a value of zero. Even after the reset, the 2-3 sequence detection means 15 detects the above-mentioned 2-3 pull-down signal. Thus when the sequence of five fields is regularly inputted and accurately detected, the 2-3 sequence detection means 15 determines that the input video signal meets the 2-3 sequence condition, and sets the 2-3 sequence detection signal 'tci0' again at a value of one to output it.

As has been described above, the 2-3 sequence detection means 15 in the first embodiment detects repetition condition of a 2-3 sequence of five fields from the interframe difference information and the interfield difference information. When there is a switching point of the video signal or an edit point in the video signal, the 2-3 sequence detection means 15 temporarily resets the 2-3 sequence detection signal 'tci0' in accordance with the result of the reset detection means 128. The 2-3 sequence detection means 15 monitors the sequence throughout a relatively long period (a field) by measuring an occurrence frequency of the 2-3 sequence, and in accordance with the predictive control flag 'tciflg0' as an index indicative of a certainty of being the 2-3 pull-down signal, predictively controls the 2-3 sequence detection signal 'tci0', and outputs the 2-3 pull-down detection signal 'tci23'. Therefore, the reliability of the 2-3 pull-down detection signal 'tci23' is increased, so that, even when the 2-3 sequence condition are temporarily satisfied for example, such control as not to perform telecine interpolation processing can be realized. As a result, frequent occurrence of picture quality degradation caused by such a combing phenomenon that takes place due to erroneous detection of the 2-3 pull-down signal can be reduced, and the 2-3 pull-down signal can be converted to a good progressive scan video signal 'Prog'.

Explanation will next be made as to operation when the 2-2 pull-down signal is inputted as an input video signal 'Ia0' from the input terminal 100.

Figure 25:
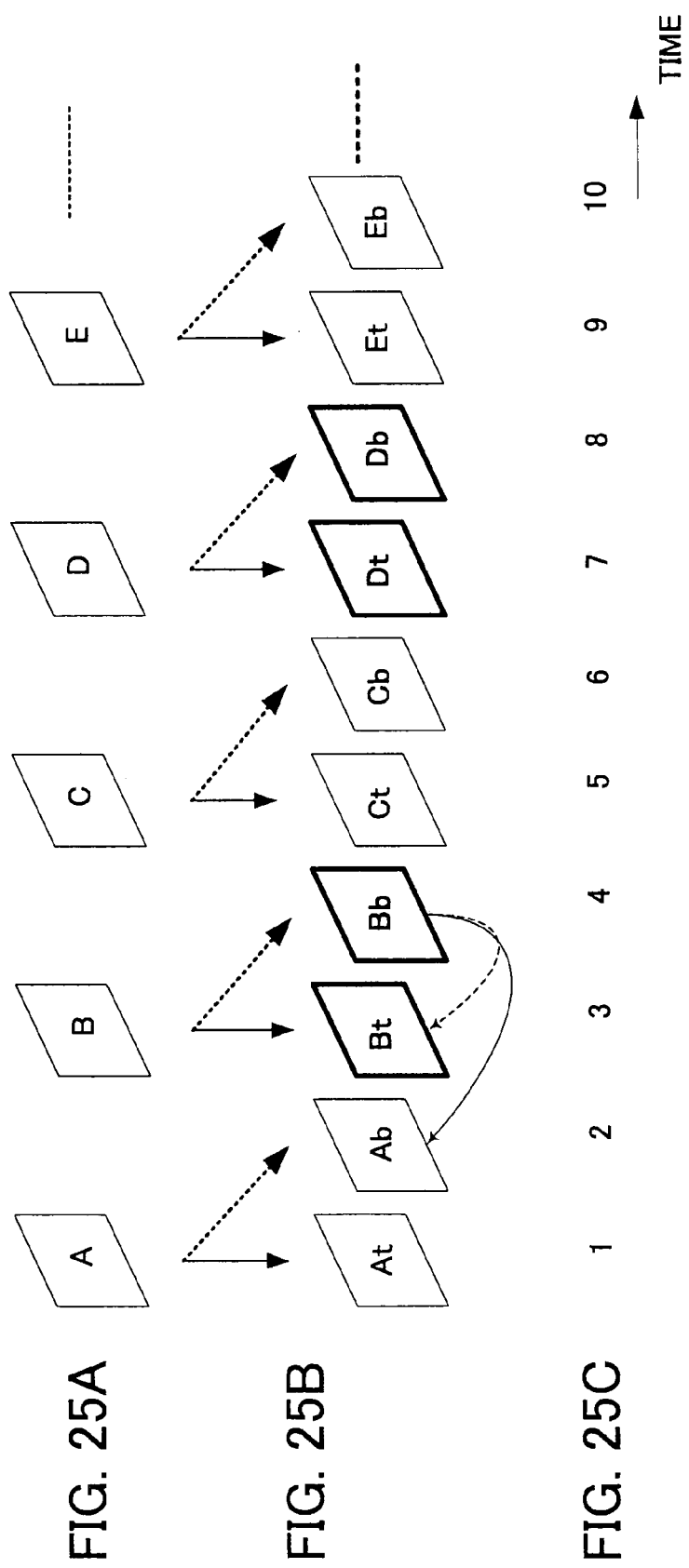

FIGS. 25A to 25C are explanatory diagrams showing the 2-2 pull-down conversion, wherein FIG. 25A shows a video signal of 30 frames per second, FIG. 25B shows a 2-2 pull-down signal, and FIG. 25C shows field numbers. As shown in FIGS. 25A to 25C, a first frame 'A' of a signal such as a cinema film corresponds to first and second fields 'At' and 'Ab' of the video signal; a second frame 'B' corresponds to third and fourth fields 'Bt' and 'Bb' of the video signal; a third frame 'C' corresponds to fifth and sixth fields 'Ct' and 'Cb' of the video signal; and a fourth frame 'D' corresponds to seventh and eighth fields 'Dt' and 'Db' of the video signal. In the drawings, a suffix 't' indicates a top field as a field of relatively upper lines and a suffix 'b' indicates a bottom field as a field of relatively lower lines.

As shown in FIGS. 25A to 25C, in the 2-2 pull-down signal, a frame corresponding to an interlaced scan video signal of two fields is repeated. Accordingly, since the interframe motion-picture-element cumulative value 'mvfr' from the interframe correlation detection means 11 is difference information based on different frames, there are successive fields having large number of the motion picture elements. The interfield motion-picture-element cumulative value 'mvfil' from the interfield correlation detection means 12 has values of zero or not larger than a predetermined value (a value established in consideration of a noise component close to zero) at intervals of two fields of the second field, the fourth field, the sixth field, the eighth field, the tenth field, . . . .

As shown in FIGS. 25A to 25C, interframe difference information between the first field 'At' and the third field 'Bt' and interframe difference information between the second field 'Ab' and the fourth field 'Bb' correspond to a first frame 'A' and a second frame 'B' respectively. Similarly, interframe difference information between the third field 'Bt' and the fifth field 'Ct' and interframe difference information between the fourth field 'Bb' and the sixth field 'Cb' correspond to interframe difference information between the second frame 'B' and the third frame 'C' respectively. In the fourth field, the motion-picture-element cumulative difference value 'dfmvfr' outputted from the interframe correlation detection means 11 is a difference value in the interframe motion-picture-element cumulative value 'mvfr' between the third and fourth fields. In the sixth field, the motion-picture-element cumulative difference value 'dfmvfr' is a difference value in the interframe motion-picture-element cumulative value 'mvfr' between the fifth and sixth fields. Thus, the motion-picture-element cumulative difference value 'dfmvfr' outputted from the interframe correlation detection means 11 has values of zero or not larger than a predetermined value (a value established in consideration of a noise component close to zero) at intervals of two fields of the second field, the fourth field, the sixth field, the eighth field, the tenth field, . . . .

Figure 26:
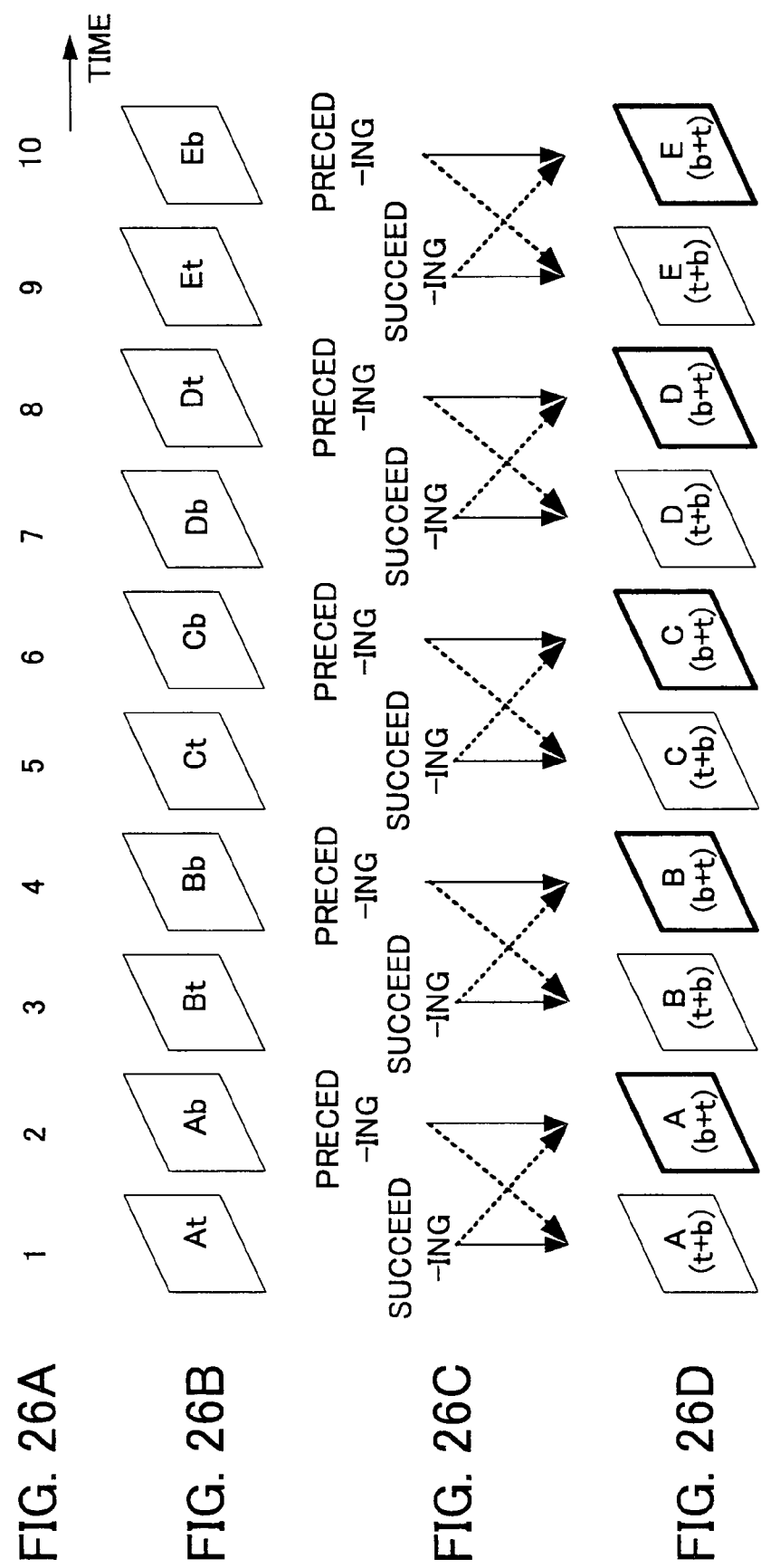

FIGS. 26A to 26D are explanatory diagrams showing a relationship between telecine interpolation and the interpolation phase flag 'tcf' when the apparatus detects a 2-2 pull-down signal and performs I/P conversion, wherein FIG. 26A shows field numbers, FIG. 26B shows an interlaced scan video signal as the 2-2 pull-down signal, FIG. 26C shows the interpolation phase, and FIG. 26D shows a progressive scan video signal. Generation of an interpolation scan line signal is made for one-field delay signal. The target telecine video signal fields are repeated in such a way that the first field has an interpolation phase corresponding to a phase of the second field which is a succeeding field in time (i.e., an interpolation phase of the current field signal is shown by "succeeding" in FIG. 21C) the second field has an interpolation phase corresponding to a phase of the first field which is a preceding field in time (i.e., an interpolation phase of the two-field delayed field signal is shown by "preceding" in FIG. 21C), the third field has an interpolation phase corresponding to a phase of the fourth field which is a succeeding field in time, and the fourth field has an interpolation phase corresponding to a phase of the third fields which are preceding fields in time respectively. The apparatus performs telecine interpolation processing in accordance with the interpolation phase so that the original frames (corresponding to frame 'A', frame 'B', . . . in FIG. 25A) are restored to form the progressive scan video signal, and outputs the progressive scan video signal.

Figure 27:
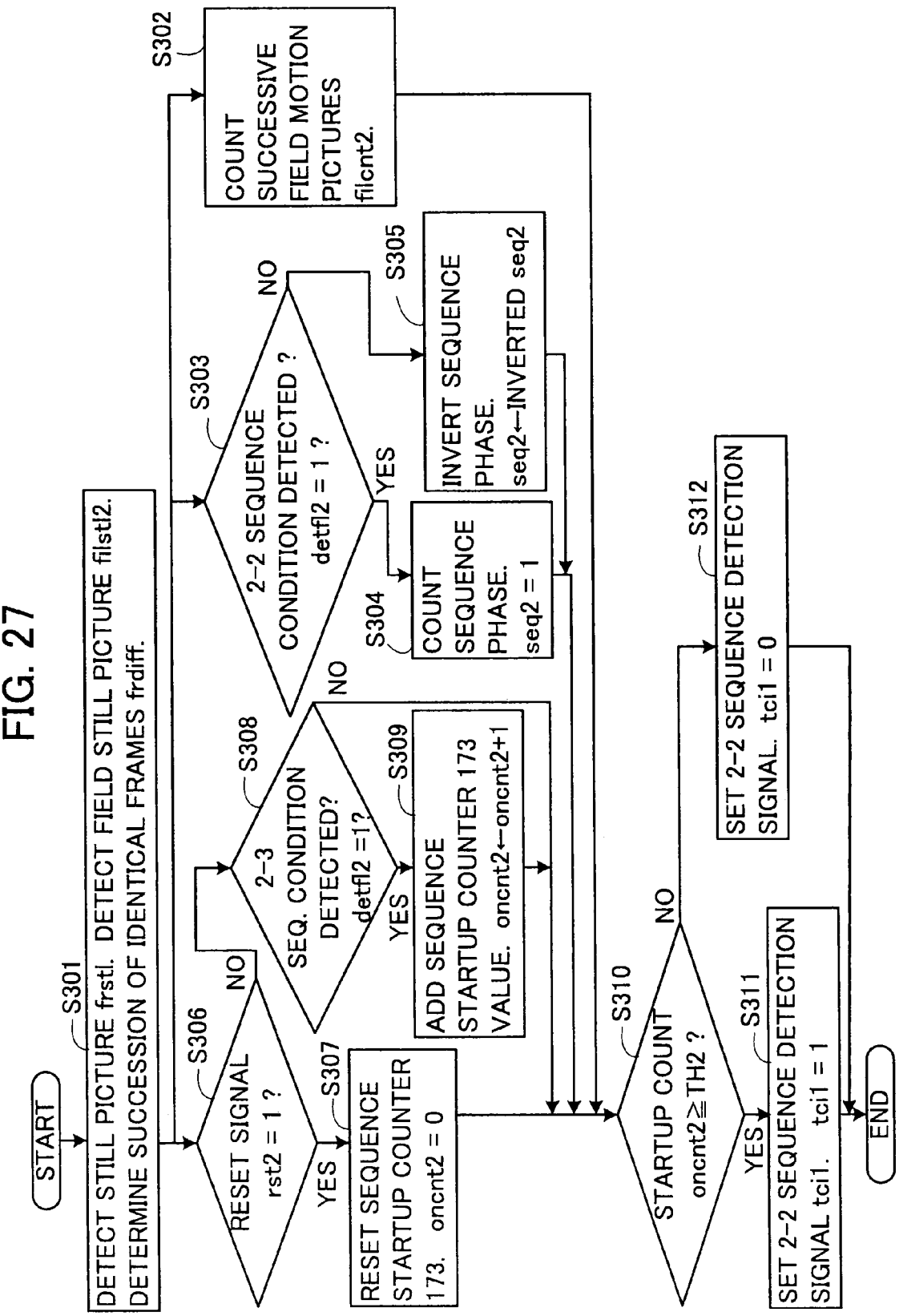
FIG. 27 is a flowchart showing operation of the 2-2 field sequence detection means of the 2-2 sequence detection means in the video signal processing apparatus according to the first embodiment.
Figure 28:
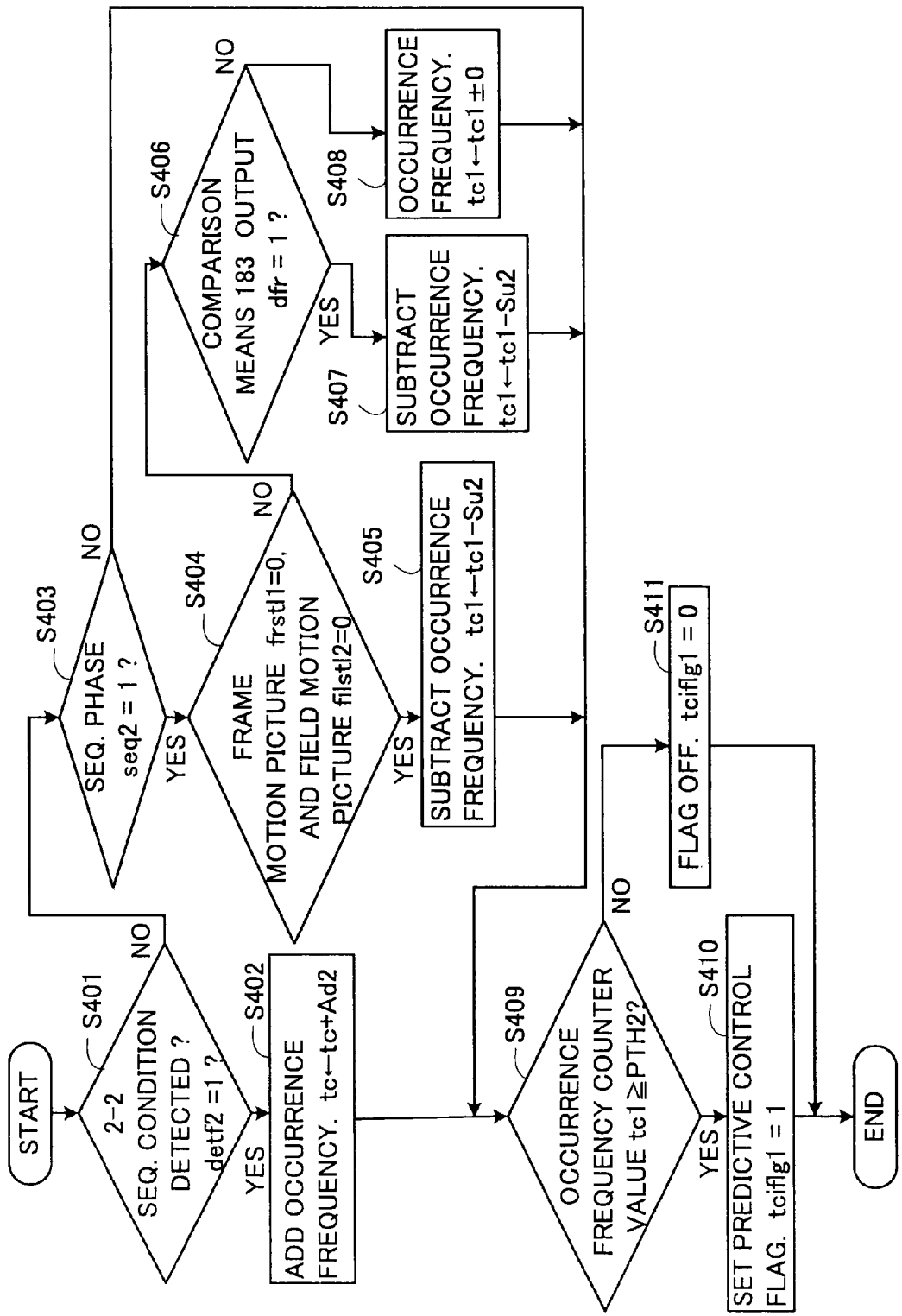
FIG. 28 is a flowchart showing operation of the occurrence frequency detection means of the 2-2 sequence detection means in the video signal processing apparatus according to the first embodiment.

FIG. 27 is a flowchart showing processes of detecting a case where the 2-2 sequence detection means 16 of the pull-down sequence detection means 14 satisfies repetition condition of a 2-2 field sequence. FIG. 28 is a flowchart showing processes of predictively controlling the 2-2 sequence detection signal 'tci1'. As has been mentioned above, telecine detection is carried out for each field, and the processes shown in FIG. 27 and FIG. 28 are executed every one field period.

Figure 29:
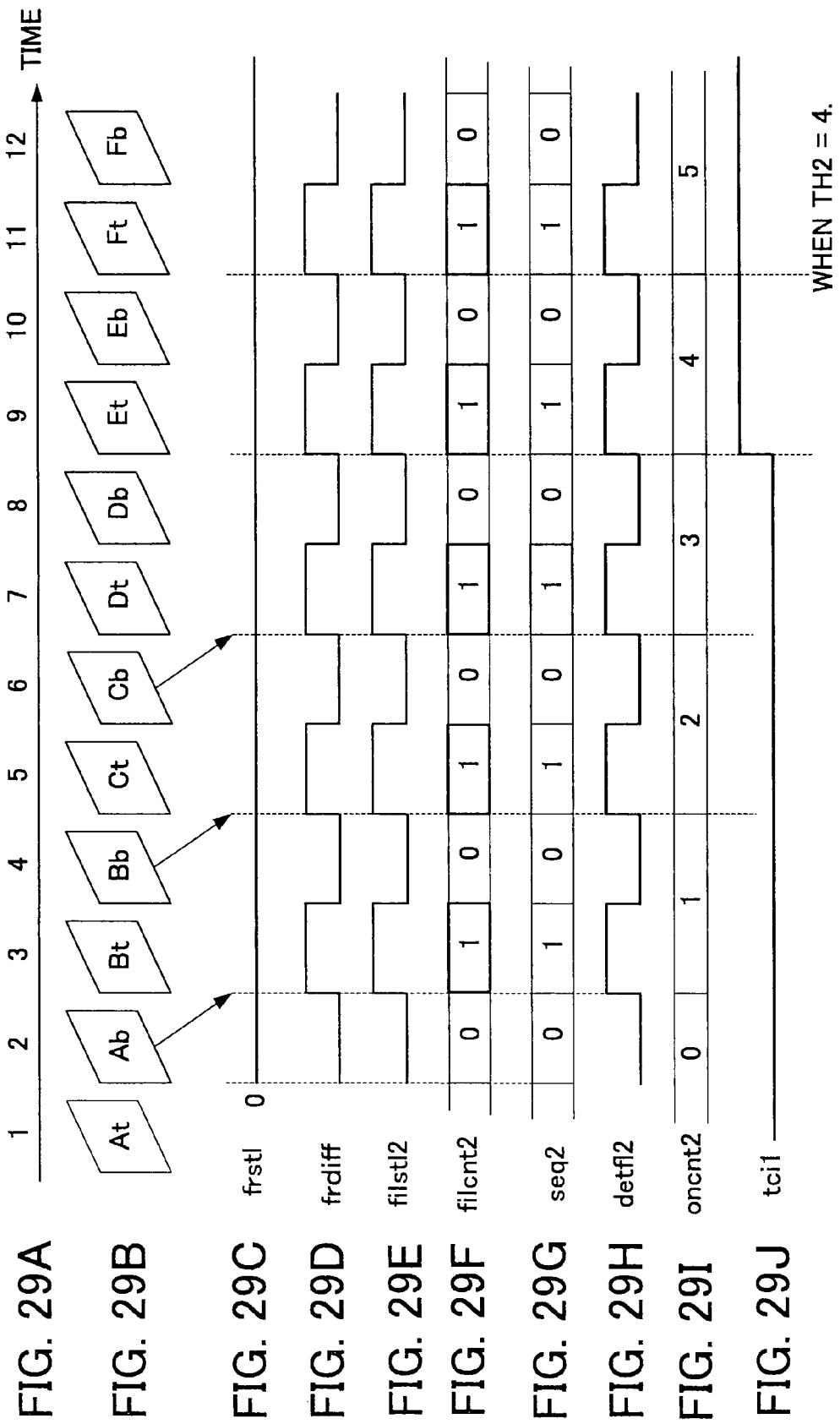

FIGS. 29A to 29J are explanatory diagrams showing operation of the 2-2 field sequence detection means 61 of the 2-2 sequence detection means 16, wherein FIG. 29A shows field numbers, FIG. 29B shows an interlaced scan video signal as the 2-2 pull-down signal, FIG. 29C shows the result of the detection of the frame still picture 'frstl' which is the output of the still picture detection means 161, FIG. 29D shows the result of the same-frame determination 'frdiff' from the same-frame determination means 162, FIG. 29E shows the result of the detection of the field still picture 'filstl2' which is the output of the field-still-picture detection means 163, FIG. 29F shows the count value of the successive field motion pictures 'filcnt2' which is the output of the motion picture field counter 164, FIG. 29G shows the count value of the 2-2 sequence phase 'seq2' which is the output of the sequence phase generation means 171, FIG. 29H shows the result of the detection of the 2-2 sequence condition 'detfl2' from the sequence condition detection means 165, FIG. 29I shows the output 'oncnt2' of the sequence startup counter 173, and FIG. 29J shows the 2-2 sequence detection signal 'tci1' which is the output of the sequence-detection-signal generation means 174.

The operation of detecting the sequence of the 2-2 pull-down signal will be explained with reference to FIG. 27, FIG. 28, and FIGS. 29A to 29J.

When receiving such a 2-2 pull-down signal as shown in FIG. 25B from the input terminal 100 as an interlaced scan video signal, the interframe correlation detection means 11 detects interframe difference information between the current field signal 'Ia0' and the two-field delayed signal 'Ic0', and outputs the interframe motion-picture-element cumulative value 'mvfr' and the motion-picture-element cumulative difference value 'dfmvfr'. The interfield correlation detection means 12 detects interfield difference information between the current field signal 'Ia0' and the one-field delayed signal 'Ib0' and outputs the interfield motion-picture-element cumulative value 'mvfil'. The field resolution determination means 13 outputs the high-frequency-picture-element cumulative value 'filhv' in the current field signal 'Ia0'. Next, the still picture detection means 161 of the 2-2 field sequence detection means 61 detects a frame still picture from the obtained interframe motion-picture-element cumulative value 'mvfr' and obtains the result of the detection of the frame still picture 'frstl'. Further, the same-frame determination means 162 compares the motion-picture-element cumulative difference value 'dfmvfr' from the interframe correlation detection means 11 with the predetermined threshold 'DTH2' and obtains the result of the same-frame determination 'frdiff'. The field-still-picture detection means 163 of the 2-2 field sequence detection means 61 detects a field still picture from the interfield motion-picture-element cumulative value 'mvfil' and obtains the result of the detection of the field still picture 'filstl'.

Referring to FIG. 27, the result of the detection of the frame still picture 'frstl' and the result of the same-frame determination 'frdiff' are obtained from the interframe motion-picture-element cumulative value 'mvfr' and the motion-picture-element cumulative difference value 'dfmvfr'. When the result of the detection of the field still picture 'filstl2' is obtained from the interfield motion-picture-element cumulative value 'mvfil' (step S301), the motion picture field counter 164 counts the number of the successive field motion pictures and outputs the count value of the successive field motion pictures 'filcnt2' at the timing of the next field (step S302).

As has been described above, since the interframe motion-picture-element cumulative value 'mvfr' and the interfield motion-picture-element cumulative value 'mvfil' every one field period are each a cumulative value of the motion picture elements in the field, the result of the detection based on the interframe difference information from the received current field signal 'Ia' and the interfield difference information is outputted at the timing of the next field (one-field delay signal 'Ib'). Thus as shown in FIGS. 29C, 29D, and 29E, the result of the detection of the frame still picture 'frstl', the result of the same-frame determination 'frdiff', and the result of the detection of the field still picture 'filstl2' are outputted at the timing of the next field to the input signal. At the field positions (the third, the fifth, . . . , and the eleventh fields) after the second, the fourth, . . . , and the tenth fields, the result of the detection of the frame still picture 'frstl' has a value of zero, the result of the same-frame determination 'frdiff' has a value of one, and the result of the detection of the field still picture 'filstl2' has a value of one, whereby a field still picture appearing once every two fields is detected.

Next, in accordance with the result of the detection of the 2-2 sequence condition 'detfl2' from the sequence condition detection means 165, the sequence phase generation means 171 counts the number of times of repetition of zero and one as the period of two fields for each field (steps S303, S304, and S305 in FIG. 27). More specifically, when the result of the detection of the 2-2 sequence condition 'detfl2' from the sequence condition detection means 165 has a value of one in the current field, the sequence phase generation means 171 sets the count value of the 2-2 sequence phase 'seq2' at a value of one (steps S303 and S304 in FIG. 27). Otherwise, the sequence phase generation means 171 inverts the phase count value 'seq2' of the previous field sequence (steps S305 in FIG. 27) to repeat two fields.

FIG. 29G shows the count value of the sequence phase 'seq2'. At the field meeting a condition that the result of the detection of the 2-2 sequence condition 'detfl2' has a value of one (i.e., the result of the detection of the frame still picture 'frstl' has a value of zero, the result of the detection of the field still picture 'filstl2' has a value of one, the count value of the successive field motion pictures 'filcnt' has a value of one, and the result of the same-frame determination 'frdiff' has a value of one), the count value of the sequence phase 'seq2' is set at a value of one. As shown in FIG. 29G, the count value of the sequence phase 'seq2' is repeated at intervals of two fields and the interpolation target field is the one-field delay signal. Thus, the field having the count value of the sequence phase 'seq2' having a value of one corresponds to the position of the field converted from the same frame of the adjacent field previous by one field.

Referring to FIG. 27, when receiving a value of one as the reset signal 'rst2' from the reset signal generation means 179, the sequence startup counter 173 determines that the input video signal is not the 2-2 pull-down signal and resets the count value (oncnt2=0) (steps S306 and S307). When the input video signal is the 2-2 pull-down signal, the reset signal 'rst2' has a value of zero (step S306), and the sequence condition detection means 165 detects the 2-2 sequence condition (step S308). When the 2-2 sequence condition is detected and the result of the detection of the 2-2 sequence condition 'detfl2' has a value of one, number of times of sequence repetition is counted (step S309).

FIG. 29I shows the count value 'oncnt2' of the sequence startup counter 173. When a field where the result of the detection of the 2-2 sequence condition 'detfl2' has a value of one appears, the telecine startup counter counts the number of times of repetition of the 2-2 sequence by adding one to the count value 'oncnt2' (i.e., oncnt2←oncnt2+1). The sequence-detection-signal generation means 174 compares the output of the 2-2 sequence-start-counter 'oncnt2' with a startup count value 'TH2' (step S310 in FIG. 27). When the output of the 2-2 sequence-start-counter 'oncnt2' is not smaller than the startup count value 'TH2' and the sequence is detected continuously by number of times 'TH2', the counter sets the 2-2 sequence detection signal 'tci1' indicative of a result of the 2-2 sequence detection at a value of one (step S311 in FIG. 27). When the output of the 2-2 sequence-start-counter 'oncnt2' has values of zero or smaller than the startup count value 'TH2', the counter sets the 2-2 sequence detection signal 'tci1' at a value of zero (step S312 in FIG. 27). The 2-2 sequence detection signal 'tci1' of FIG. 29J shows when the sequence count is, e.g., four or more and the input video signal is determined as the 2-2 pull-down signal (TH2=4). Accordingly, when the sequence of repetition of two fields is detected continuously by four times or more and the 2-2 sequence detection signal 'tci1' has a value of one, the input video signal is determined to meet the sequence condition of a 2-2 pull-down signal, and the 2-2 sequence detection signal 'tci1' having a value of one is outputted to the 2-2 predictive control means 63.

Referring to FIG. 28, the occurrence frequency detection means 62 of the 2-2 sequence detection means 16 detects the 2-2 sequence condition. When the result of the detection of the 2-2 sequence condition 'detfl2' has a value of one (step S401), the occurrence frequency detection means 62 adds the value 'Ad2' to the occurrence frequency count value 'tc1' (i.e., tc1←tc1+Ad2) (step S402). When the 2-2 sequence condition are not detected and the phase is in the phase of the second field, that is, the count value of the 2-2 sequence phase 'seq2' has a value of one (step S403); and when the result of the detection of the frame still picture 'frstl' has a value of zero and the result of the detection of the field still picture 'filstl2' has a value of zero (step S404); the occurrence frequency detection means 62 subtracts the predetermined value 'Su2' from the occurrence frequency count value 'tc1' (i.e., tc1←tc1−Su2) (step S405). Even when the current phase is in the phase of the second field and the result of the comparison 'dfr' from the comparison means 184 has a value of one (step S406), the occurrence frequency detection means 62 similarly subtracts the predetermined value 'Su2' from the occurrence frequency count value 'tc1' (i.e., tc1←tc1−Su2) (step S407). In the phase of the second field (i.e., when the count value of the 2-2 sequence phase 'seq2' has a value of one) and in the cases other than the above-mentioned condition, the occurrence frequency detection means 62 performs no addition/subtraction (i.e., tc1←tc1±0) (step S408). This is because, when the count value of the 2-2 sequence phase 'seq2' has a value of one, the result of the detection of the frame still picture 'stl1' has a value of one (a frame still picture) or the result of the detection of the field still picture 'filstl2' has a value of one (a field still picture); whether or not to be the 2-2 sequence cannot be determined, or it is possible not to perform the subtraction of the count value 'tc1' when the result of the comparison 'dfr' in the steps S406 and S407 in FIG. 28 has a value of one.

The predictive-control-flag generation means 182 of the occurrence frequency detection means 62 compares the occurrence frequency count value 'tc1' with the effective count value 'PTH2', and determines a certainty of being the 2-2 pull-down signal (step S409). When the occurrence frequency count value 'tc1' becomes not smaller than the effective count value 'PTH2', the predictive-control-flag generation means 182 determines that the input video signal is the 2-2 pull-down signal and sets the predictive control signal 'tciflg1' at a value of one (step S410). During a field period (i.e., during a time until the occurrence frequency count value 'tc1' becomes not smaller than the effective count value 'PTH2') until the input signal is determined to be likely to be the 2-2 pull-down signal, the predictive control signal 'tciflg1' is set at a value of zero (step S411). When an edit point or the like causes discontinuation of the 2-2 sequence, the 2-2 sequence condition cannot be detected. Thus, the occurrence frequency count value 'tc1' will not reach the effective count value 'PTH2'. Therefore, the input signal is determined not as the 2-2 pull-down signal and the value of the predictive control signal 'tciflg1' remains a value of zero.

When the predictive control signal 'tciflg1' has a value of one and the input signal is determined as the 2-2 pull-down signal, the selection means 64 of the 2-2 predictive control means 63 outputs the 2-2 pull-down detection signal 'tci22' indicative of detection of the 2-2 pull-down signal with respect to the 2-2 sequence detection signal 'tci1' from the 2-2 field sequence detection means 61. The 2-2 pull-down detection signal 'tci22' is sent to the pull-down determination means 17. The pull-down determination means 17 outputs the telecine detection signal 'tci' to the mixing means 8 in FIG. 1.

The pull-down determination means 17 receives the high-frequency-picture-element cumulative value 'filhv' from the field resolution determination means 13. When the 2-2 pull-down detection signal 'tci22' has a value of one and the 2-2 pull-down signal is detected, the pull-down determination means 17 generates and outputs the mixing ratio signal 'tcmix' indicative of a mixing ratio of the interpolation signals for use in the mixing means 8 of the interpolation signal generation means 110 in accordance with the high-frequency-picture-element cumulative value 'filhv'. Similarly to the interframe motion-picture-element cumulative value 'mvfr' and the interfield motion-picture-element cumulative value 'mvfil', the high-frequency-picture-element cumulative value 'filhv' is a cumulative value of the high frequency picture elements. Thus, the result of the detection of the received current field signal 'Ia' is outputted at the timing of the next field (one-field delay signal 'Ib').

When the 2-2 pull-down detection signal 'tci22' has a value of one (tci22=1) and the telecine detection signal 'tci' having a value of one is outputted from the pull-down determination means 17, the mixing ratio signal 'tcmix' converted from the high-frequency-picture-element cumulative value 'filhv' is outputted to the mixing means 8. When the 2-2 pull-down signal is detected and the telecine detection signal 'tci' has a value of one, the mixing means 8 of the interpolation signal generation means 110, in accordance with the mixing ratio of the mixing ratio signal 'tcmix', mixes the interpolation signal 'Im' from the motion adaptive interpolation processing means 5 and the telecine interpolation signal 'It' from the telecine interpolation processing means 7 to form an interpolation signal 'I' as the mixed value signal. In other words, upon detection of the 2-2 pull-down signal, the sequence is detected based on the period of the interfield difference information and this reduces the degradation of picture quality caused by erroneous determination of the interfield difference. To this end, the mixing of the interpolation signal 'I' is carried out.

Explanation will next be made as to operation of resetting the telecine interpolation processing when the input video signal is not the 2-2 pull-down signal or when the 2-2 pull-down signal having a sequence whose regularity is disturbed by an edit point or the like is inputted from the input terminal 100 in the course of the 2-2 pull-down signal. The reset of the telecine interpolation processing is carried out by setting the telecine detection signal 'tci' from the pull-down determination means 17 at a value of zero, that is, setting the 2-2 pull-down detection signal 'tci22' at a value of zero for the 2-2 pull-down signal. When the reset signal 'rst2' of the reset signal generation means 179 has a value of one or when the predictive control signal 'tciflg1' of the predictive-control-flag generation means 182 has a value of one, the value of zero of the 2-2 pull-down detection signal 'tci22' is outputted indicating that the input video signal is not the 2-2 pull-down signal.

When an edit point is frequently present in the input video signal and the 2-2 sequence becomes discontinuous, the 2-2 sequence detection means 16 does not detect the 2-2 sequence condition. Thus, the occurrence frequency count value 'tc1' will not reach the effective count value 'PTH2', the input video signal is determined to be likely to be the 2-2 pull-down signal, and the predictive control signal 'tciflg1' has a value of zero. Accordingly, the 2-2 pull-down detection signal 'tci22' has a value of zero and the interpolation signal generation means 110 outputs the interpolation signal 'Im' from the motion adaptive interpolation processing means 5 as an interpolation signal 'I'.

When the input video signal is switched from the 2-2 pull-down signal to a video signal of commonly-used television broadcast or the like, the interframe motion-picture-element cumulative value 'mvfr' from the interframe correlation detection means 11 has a large value and the interfield motion-picture-element cumulative value 'mvfil' from the interfield correlation detection means 12 has also a large value. At this time, the value of zero (a frame motion picture) of the result of the detection of the frame still picture 'frstl' becomes successive and the value of zero (a field motion picture) of the result of the detection of the field still picture 'filstl2' also becomes successive. Thus, when the result of the detection of the frame still picture 'frstl' has a value of zero and the value of zero of the result of the detection of the field still picture 'filstl' becomes successive for continuous two fields, the result of the detection of the two successive fields of the field motion pictures is outputted from the pull-down determination means 17 to the reset signal generation means 179, and the value of one of the reset signal 'rst2' is sent from the successive motion-picture detection means 175 to the sequence startup counter 173. When the value of one of the reset signal 'rst2' is inputted, the input video signal is determined not as the 2-2 pull-down signal, and the count value is reset (oncnt2=0) (steps S306 and S307 in FIG. 27). Thus, the pull-down determination means 17 sets the 2-2 sequence detection signal 'tci1' at a value of zero.

When an edit point, video signal switching or the like causes discontinuation of the 2-2 sequence, and in the phase of the second field (i.e., when the count value of the 2-2 sequence phase 'seq2' has a value of one), the result of the detection of the frame still picture 'frstl' has a value of zero, the result of the detection of the field still picture is a value of zero (a field motion picture), and the count value of the successive field motion pictures 'filcnt2' has a value of zero; the phase determination means 176 detects a phase shift from the 2-2 sequence at the position of the field still picture appearing once every two fields, sets the result of the detection 'dph2' at a value of one, and outputs it to the reset signal generation means 179. The value of one of the reset signal 'rst2' is outputted from the reset signal generation means 179 to the sequence startup counter 173. The subsequent operation is substantially the same as or similar to the above-mentioned operation in the case of the successive field motion pictures.

When an edit point, video signal switching or the like causes discontinuation of the 2-2 sequence and at the phase (i.e., when the count value of the 2-2 sequence phase 'seq2' has a value of one) of the second field, the motion-picture-element cumulative difference value 'dfmvfr' from the interframe correlation detection means 11 is larger than a predetermined threshold; the comparison means 177 detects a phase shift from the 2-2 sequence, sets the result of the detection 'sqof' at a value of one, and outputs it to the reset signal generation means 179. The value of one of the reset signal 'rst2' is sent from the reset signal generation means 179 to the sequence startup counter 173. The subsequent operation is substantially the same as or similar to the above-mentioned operation in the case of the successive field motion pictures.

When such a video signal as to cause a scene change is inputted from the input terminal 100 in the course of the 2-2 pull-down signal, the interframe motion-picture-element cumulative value 'mvfr' from the interframe correlation detection means 11 is changed largely when compared with a value in the commonly-used sequence. Thus when the interframe motion-picture-element cumulative value 'mvfr' is larger than the threshold 'STH2', the scene change detection means 178 determines the presence of a scene change in this field, sets a value of the scene change result of the detection 'sch2' at a value of one, and then outputs it. The scene change result of the detection 'sch2' is outputted to the reset signal generation means 179. When the result of the detection of the scene change detection means 178 is set to be used, the reset signal generation means 179 sets the reset signal 'rst2' at a value of one when the scene change result of the detection 'sch2' has a value of one, and sends the reset signal 'rst2' to the sequence startup counter 173. When the value of one of the reset signal 'rst2' is inputted, the sequence startup counter 173 determines that the input video signal is not the 2-2 pull-down signal, resets the count value (oncnt2=0) (steps S306 and S307 in FIG. 27). The sequence-detection-signal generation means 174 sets the 2-2 sequence detection signal 'tci1' at a value of one. Accordingly, when the scene change is detected in the course of the 2-2 pull-down signal, the 2-2 sequence detection signal 'tci1' is reset to be zero. Even after the reset, the 2-2 sequence detection means 16 still detects the 2-2 pull-down signal. Thus when the sequence of two fields is regularly inputted and accurately detected, the 2-2 sequence detection means 16 determines that the input video signal meets the 2-2 sequence condition, sets the 2-2 sequence detection signal 'tci1' again at a value of one, and outputs it.

As has been mentioned above, the 2-2 sequence detection means 16 of the first embodiment detects the repetition condition of a 2-2 sequence of two fields in accordance with the interframe difference information and the interfield difference information. When a video signal switching or an edit signal is present in the video signal, the 2-2 sequence detection means 16 temporarily resets the 2-2 sequence detection signal 'tci1' in accordance with the result of the reset detection means 168. The 2-2 sequence detection means 16 monitors the sequence throughout a relatively long period (a field) by measuring the occurrence frequency of the 2-2 sequence, predictively controls the 2-2 sequence detection signal 'tci1' in accordance with the predictive control flag 'tciflg1' as an index indicative of a certainty of being the 2-2 pull-down signal, and outputs the 2-2 pull-down detection signal 'tci22'. Further, the mixing ratio signal 'tcmix' indicative of a mixing ratio of the interpolation signals for use in the mixing means 8 of the interpolation signal generation means 110 is generated upon detection of the 2-2 pull-down signal in accordance with the high-frequency-picture-element cumulative value 'filhv' from the field resolution determination means 13; and in accordance with the mixing ratio signal 'tcmix', the telecine interpolation signal 'It' and the interpolation signal 'Im' based on motion adaptive interpolation are mixed to generate the interpolation signal 'I'. As a result, the reliability of the 2-2 pull-down detection signal 'tci22' is increased and, even when the 2-2 sequence condition are temporarily satisfied, such control as not to perform the telecine interpolation processing can be realized. Since the telecine interpolation signal and the signal based on the motion adaptive interpolation are mixed in accordance with the mixing ratio signal, the degradation of picture quality caused by erroneous determination of the interfield difference can be reduced, a frequency of generation of the picture quality degradation caused by such a combing phenomenon as to be generated by erroneous detection of the 2-2 pull-down signal can be reduced, and the 2-2 pull-down signal can be converted to a good progressive scan video signal 'Prog'.

As has been described above, in accordance with the video signal processing apparatus or the video signal processing method of the first embodiment, it is detected whether or not the interlaced scan video signal 'Ia' sequentially input satisfies the sequence repetition condition of a 2-3 pull-down signal or the 2-2 pull-down signal in accordance with the interframe difference information and the interfield difference information, the sequence is monitored throughout a relatively long period (a field) by measuring an occurrence frequency of each sequence, and the telecine detection signal 'tci' based on the predictive control signals 'tciflg0' and 'tciflg1' as an index indicative of a certainty of being the telecine video signal is outputted. In accordance with the high-frequency-picture-element cumulative value 'filhv' in each field, a resolution is determined from the degree of the high frequency components existing in the target field, the mixing ratio signal 'tcmix' indicative of a mixing ratio of the interpolation signals for used in the mixing means 8 of the interpolation signal generation means 110 is generated, the telecine interpolation signal 'It' and the interpolation signal 'Im' based on the motion adaptive interpolation are mixed in accordance with the generated mixing ratio signal, and the telecine interpolation signal is outputted. Accordingly, the reliability of the telecine detection signal 'tci' can be increased, and the interpolation scan line signal 'Im' or the telecine interpolation signal 'It' selected based on the telecine detection signal 'tci' can be suitably selected. Further, since the interpolation signal are mixed in accordance with the mixing ratio signal 'tcmix' based on the high-frequency-picture-element cumulative value 'filhv', erroneous detection of the sequence of the 2-3 or 2-2 pull-down signal can be avoided, a frequency of generation of picture quality degradation caused by such a combing phenomenon as to be generated in the presence of the erroneous sequence detection can be reduced, and the video signal subjected to telecine conversion can be converted to a good progressive scan video signal 'Prog'.

The interframe correlation detection means 11 and the interfield correlation detection means 12 in the above-described first embodiment find number of the motion picture elements in a predetermined area in one field, and the 2-3 sequence detection means 15 and the 2-2 sequence detection means 16 compare the motion picture element number with a predetermined threshold, and detect a still picture field and a scene change. However, the present invention is not limited to such an arrangement. another arrangement may be employed, so long as the arrangement can find the strength of a correlation between the field previous by one frame and the field previous by one field, as when the interframe correlation detection means 11 and the timing signal generation means 1 find the number of the still picture elements, and the 2-3 sequence detection means 15 and the 2-2 sequence detection means 16 compare the number of the still picture elements with a predetermined threshold to thereby detect a still picture field and to detect a scene change. This arrangement can exhibit effects substantially the same as or similar to the above-mentioned effects.

In the telecine detection means 6 in the first embodiment, explanation has been made in connection with the case where the difference detection means 21 is provided in the interframe correlation detection means 11 to detect interframe difference information. However, the present invention is not limited to this example. Such an arrangement may be employed as to find an interframe correlation with use of one-interframe difference information in the motion detection means 4 which finds difference information between the current field signal 'Ia0' and the two-field delayed signal 'Ic0'.

Explanation has further been made in connection with the case where the interframe correlation detection means 11 and the interfield correlation detection means 12 find absolute values of differences between frames and between fields, and output difference information. However, the present invention is not limited to such an exemplary arrangement. Non-linear conversion may be made, for example, by multiplying the absolute value of the difference by a predetermined value and subtracting a predetermined value from the multiplied result, and the converted value may be used as the interframe difference information and the interfield difference information, so long as the strength of the interframe correlation and between fields can be detected from the obtained difference information and whether the field is a still picture field or a motion picture field can be detected.

Explanation has been made in connection with the case where the sequence phase counter 133 of the 2-3 sequence detection means 15 in the first embodiment repeatedly counts from zero to four at intervals of five fields, and when the result of the detection of the frame still picture 'stl1' has a value of one (a frame still picture) and the count value of the successive frame motion pictures 'frcnt' has a value of four, resets the count value to zero. However, the present invention is not limited to the above-mentioned number of times of repetitions and the above-mentioned reset value. Another arrangement may be employed, so long as the input video signal can be repeated at intervals of five fields, and when the result of the detection of the frame still picture 'stl1' has a value of one (a frame still picture) and the count value of the successive frame motion pictures 'frcnt' has a value of four, that is, in synchronism with the frame still picture field appearing once every five fields, the counter can be reset to a predetermined value. This arrangement can exhibit effects substantially the same as or similar to the above.

In I/P conversion to the commonly-used video signal in the first embodiment, explanation has been made in connection with the motion adaptive interpolation. However, the present invention is not limited to the above-mentioned example. Another arrangement may be employed so long as the arrangement can use an interpolation signal based only on intrafield interpolation. This arrangement can exhibit effects substantially the same as or similar to the above-mentioned effects.

Although the above-mentioned explanation has been made in connection with the case where the constituent elements of the video signal processing apparatus are implemented in a hardware form, the functions of the elements may be implemented under control of a software program.

Second Embodiment

In the above-described first embodiment, explanation has been made in connection with the video signal processing apparatus and the video signal processing method which detects the telecine video signal and performs an I/P conversion in accordance with a result of the detection of the telecine video signal. However, the present invention can be applied even to a video signal display apparatus which performs an I/P conversion from the input interlaced scan video signal to a progressive scan video signal to display the progressive scan video signal with a high picture quality. In the second embodiment which will be described below, explanation will be made as to a video signal display apparatus which performs an I/P conversion from an interlaced scan video signal such as a TV broadcast signal or an input signal from a DVD player, a VCR, or other recording/reproducing apparatus, to a progressive scan video signal by using the video signal processing apparatus or the video signal processing method described in the first embodiment, and then displays an image based on the converted progressive scan video signal.

Figure 30:
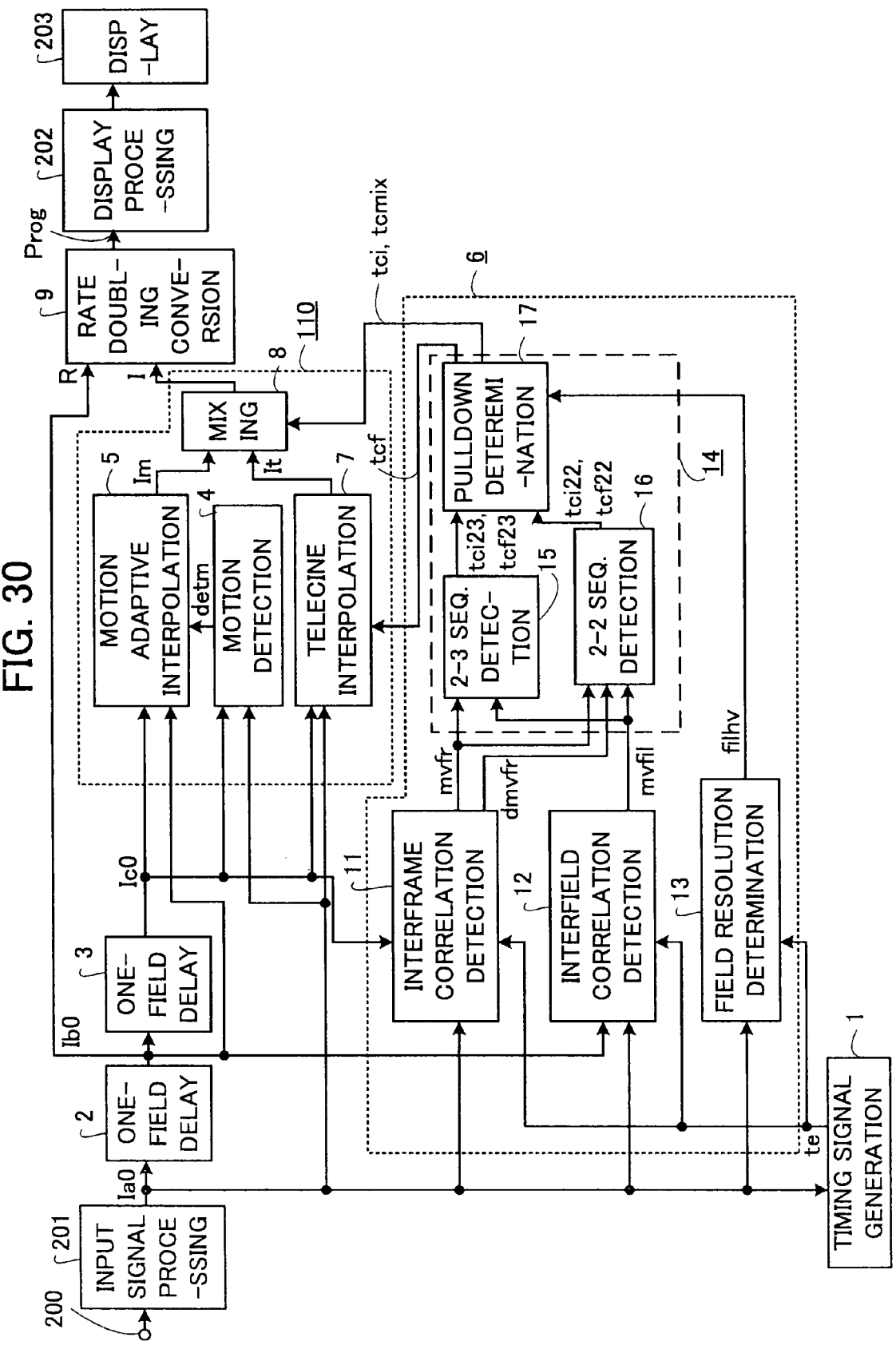
FIG. 30 is a block diagram showing an exemplary configuration of a video signal display apparatus according to the second embodiment of the present invention.

FIG. 30 is a block diagram showing an exemplary configuration of a video signal display apparatus according to the second embodiment of the present invention. Constituent elements in FIG. 30 which are the same as or correspond to those in FIG. 1 are assigned the same reference numerals or symbols. Referring to FIG. 30, the video signal display apparatus according to the second embodiment includes, in addition to the constituent elements of the video signal processing apparatus according to the first embodiment (see FIG. 1), an input terminal 200, an input signal processing means 201, a display processing means 202, and a display means 203, and is arranged so as to display an image based on the progressive scan video signal 'Prog' after the I/P conversion. Except for the constituent elements and operation of the input terminal 200, the input signal processing means 201, the constituent elements and operation of the display processing means 202, the constituent elements and operation of the second embodiment is substantially the same as those of the first embodiment.

A TV broadcast signal or a signal supplied from a recording/reproducing apparatus such as a DVD player or a VCR is inputted to the input terminal 200. The signal inputted to the input terminal 200 is supplied to the input signal processing means 201. In this case, the TV broadcast signal or the signal supplied from a DVD player, a VCR or other apparatus is a standard television signal, such as an NTSC signal, a high definition signal or a PAL signal, which is an interlaced scan video signal.

The input signal processing means 201 performs input-signal processing of the inputted TV broadcast signal, the signal supplied from a recording/reproducing apparatus such as a DVD player of a VCR, or other inputted signals. This signal-processing includes, for example, conversion from an analog signal to a digital signal, separation of a synchronization signal from the input-signal, and other processing. An output of the input signal processing means 201, which is an interlaced scan video signal 'Ia0', is supplied to the timing signal generation means 1, the one-field delay means 2, the interpolation signal generation means 110, and the telecine detection means 6.

The video signal display apparatus according to the second embodiment detects a telecine video signal from the interlaced scan video signal 'Ia0' supplied from the input signal processing means 201 and performs I/P conversion of the interlaced scan video signal in accordance with a result of the detection of the telecine video signal. In the video signal display apparatus, the rate doubling conversion means 9 outputs the progressive scan video signal 'Prog' to the display processing means 202. The operation of the I/P conversion described here is substantially the same as that described in the first embodiment.

The progressive scan video signal 'Prog' generated through I/P conversion processing and outputted from the rate doubling conversion means 9 is inputted to the display processing means 202. The display processing means 202 performs signal-processing on the progressive scan video signal 'Prog' such as scaling processing, for example, to convert the progressive scan video signal to a display signal, and outputs the display signal to the display means 203 to be displayed as a progressive image.

The display means 203 displays an image based on the display signal received from the display processing means 202, as a progressive image.

As has been described above, since the video signal display apparatus according to the second embodiment uses the video signal processing apparatus or the video signal processing method according to the first embodiment, the video signal display apparatus can display a high quality image based on a good progressive scan video signal, in which probability of picture quality degradation caused by a combing phenomenon is suppressed.

What is claimed is:

1. A video signal processing apparatus for converting an interlaced scan video signal to a progressive scan video signal by using a field delay which delays the interlaced scan video signal by a period of one or several fields, comprising:

a field resolution determiner which detects high frequency components in a target field of the interlaced scan video signal, thereby outputting a signal indicative of a degree of the high frequency components existing in the target field in accordance with a result of the detecting of the high frequency components; and a pull-down sequence detector which detects whether or not the interlaced scan video signal satisfies a field sequence condition of a video signal subjected to telecine conversion by using an interframe correlation and an interfield correlation, thereby determining a result of detecting whether or not the interlaced scan video signal is a video signal subjected to telecine conversion, if the result of the detecting indicates that the interlaced scan video signal is not a video signal subjected to telecine conversion, the pull-down sequence detector outputting the result, if the result of the detecting indicates that the interlaced scan video signal is a video signal subjected to telecine conversion and the signal indicative of a degree of the high frequency components indicates a value equal to or greater than a predetermined value, the pull-down sequence detector outputting a result that the interlaced scan video signal is a video signal subjected to telecine conversion, if the result of the detecting indicates that the interlaced scan video signal is a video signal subjected to telecine conversion and the signal indicative of a degree of the high frequency components indicates a value smaller than the predetermined value, the pull-down sequence detector outputting a result that the interlaced scan video signal is not a video signal subjected to telecine conversion.

2. A video signal processing apparatus for converting an interlaced scan video signal to a progressive scan video signal by using a field delay which delays the interlaced scan video signal by a period of one or several fields, comprising:

a field resolution determiner which detects high frequency components in a target field of the interlaced scan video signal, thereby outputting a signal indicative of a degree of the high frequency components in the target field in accordance with a result of the detecting of the high frequency components; and a pull-down sequence detector which detects whether or not the interlaced scan video signal satisfies a field sequence condition of a video signal subjected to telecine conversion by using an interframe correlation and an interfield correlation, thereby determining a result of detecting whether or not the interlaced scan video signal is a video signal subjected to telecine conversion, wherein the pull-down sequence detector has a first predetermined value and a second predetermined value, the first predetermined value is smaller than the second predetermined value, a first interpolation signal is a signal generated by using intrafield interpolation or interfield interpolation, and a second interpolation signal is a signal generated from the video signal subjected to telecine conversion by interpolation based on the video signal of the field prior to the interpolation field by one field or subsequent to the interpolation field by one field, when the result of the detecting indicates that the interlaced scan video signal is not a video signal subjected to telecine conversion, the pull-down sequence detector outputs the result;

when the result of the detecting indicates that the interlaced scan video signal is a video signal subjected to telecine conversion, if the signal indicative of the degree of the high frequency components indicates a value equal to or less than the first predetermined value, the pull-down sequence detector outputs a result that the interlaced scan video signal is not a video signal subjected to telecine conversion, if the signal indicative of the degree of the high frequency components indicates a value equal to or greater than the second predetermined value, the pull-down sequence detector outputs a result that the interlaced scan video signal is a video signal subjected to telecine conversion, if the signal indicative of the degree of the high frequency components indicates a value between the first predetermined value and the second predetermined value, the pull-down sequence detector calculates a mixing ratio of the first interpolation signal and the second interpolation signal in accordance with the signal indicative of the degree of the high frequency components, thereby outputting a result of the calculating, wherein the mixing ratio is set so that a ratio of the second interpolation signal increases, as the degree of the high frequency components becomes higher;

the video signal processing apparatus further comprising an interpolation signal generator, wherein if the signal indicative of the degree of the high frequency components indicates a value between the first predetermined value and the second predetermined value, the interpolation signal generator mixes the first interpolation signal and the second interpolation signal in accordance with the mixing ratio, thereby generating an interpolation signal to output the interpolation signal.

3. The video signal processing apparatus according to claim 1, wherein the field resolution determiner determines a value of high frequency components in each picture element in the target field, compares the value of high frequency components in each picture element with a predetermined value, accumulates number of picture elements whose values of high frequency components are larger than the predetermined value, thereby outputting a result of the accumulating as a signal indicative of a degree of the high frequency components in the target field.

4. The video signal processing apparatus according to claim 1, wherein the field resolution determiner includes:

a horizontal high-frequency-component extractor which extracts high frequency components in a horizontal direction in picture elements of a predetermined area or an entire area of the target field of the interlaced scan video signal;

a vertical high-frequency-component extractor which extracts high frequency components in a vertical direction in the picture elements of the predetermined area or the entire area of the target field of the interlaced scan video signal;

a selector which selects any of the high frequency components in each picture element in accordance with an output of the horizontal high-frequency-component extractor and an output of the vertical high-frequency-component extractor, thereby outputting a result of the selecting as high frequency components in each picture element;

a comparator which compares the high frequency components from the selector with a predetermined value to determine whether or not each picture element has high frequency components, thereby outputting a signal indicative of a high-frequency-component picture element in accordance with a result of the determining of the comparator; and an accumulator which accumulates, in the picture elements of the predetermined area or the entire area of the target field, number of picture elements which are determined as having high frequency components in accordance with the signal indicative of the high-frequency-component picture element received from the comparator, thereby outputting a result of the accumulating for each field;

wherein the field resolution determiner outputs the signal indicative of the degree of the high frequency components existing in the target field, which includes the result of the accumulating outputted from the accumulator.

5. The video signal processing apparatus according to claim 1, further comprising an interfield correlation detector, wherein the interfield correlation detector finds difference values, each of which is a value between a picture element value of a picture element of the target field and a picture element value of a picture element of a field prior to the target field by one field in the vicinity of the same position in a predetermined area or an entire area of the target field of the interlaced scan video signal, compares each of the difference values with a predetermined value, and determines presence or absence of a motion in each picture element, the interfield correlation detector includes:

a vertical edge determiner which determines an edge in a vertical direction in accordance with the picture elements in the field prior to the target field by one field, thereby outputting a signal indicative of the edge in the vertical direction in accordance with a result of the determining of the edge; and an accumulator which accumulates, in the picture elements of the predetermined area or the entire area of the target field, number of picture elements which are determined as a motion picture element or a still picture element in accordance with a result of the determining presence or absence of a motion in each picture element and an output from the vertical edge determiner, thereby outputting a result of the accumulating for each field;

wherein the interfield correlation detector outputs a signal indicative of the strength of the interfield correlation, which includes the result of the accumulating outputted from the accumulator.

6. The video signal processing apparatus according to claim 1, wherein the pull-down sequence detector includes:

a 2-3 sequence detector which determines whether or not the interlaced scan video signal satisfies a field sequence condition of a video signal subjected to 2-3 pull-down conversion, thereby outputting a result of the determining of the 2-3 sequence detector;

a 2-2 sequence detector which determines whether or not the interlaced scan video signal satisfies a field sequence condition of a video signal subjected to 2-2 pull-down conversion, thereby outputting a result of the determining of the 2-2 sequence detector; and a pull-down determiner which determines whether or not the interlaced scan video signal is a video signal subjected to telecine conversion in accordance with an output of the 2-3 sequence detector, an output of the 2-2 sequence detector, and the signal indicative of the degree of the high frequency components in the target field, thereby generating a telecine detection signal and a mixing ratio signal in accordance with a result of the determining of the pull-down determiner to output the telecine detection signal and the mixing ratio signal.

7. The video signal processing apparatus according to claim 6, wherein the 2-3 field sequence detector includes:

a 2-3 field sequence detector which determines whether or not the interlaced scan video signal satisfies the field sequence condition of a video signal subjected to 2-3 pull-down conversion in accordance with the signal indicative of the strength of the interframe correlation and the signal indicative of the strength of the interfield correlation;

a first occurrence frequency detector which measures an occurrence frequency of a field sequence satisfying the field sequence condition of a video signal subjected to 2-3 pull-down conversion in accordance with the signal indicative of the strength of the interframe correlation and the signal indicative of the strength of the interfield correlation, thereby outputting a predictive control signal based on a result of the measuring of the first occurrence frequency detector; and a first predictive controller which determines whether or not the interlaced scan video signal satisfies the field sequence condition of a video signal subjected to 2-3 pull-down conversion in accordance with an output of the 2-3 field sequence detector and the predictive control signal, thereby outputting a result of the determining of the first predictive controller.

8. The video signal processing apparatus according to claim 7, wherein the first occurrence frequency detector includes:

a first sequence-determination number-of-times detector which counts number of times of detecting a case where the interlaced scan video signal satisfies the field sequence condition of a video signal subjected to 2-3 pull-down conversion in accordance with the signal indicative of the strength of the interframe correlation and the signal indicative of the strength of the interfield correlation; and a first predictive-control-flag generator which compares a count value counted by the first sequence-determination number-of-times detector with a predetermined threshold, thereby outputting a result of the comparing of the first predictive-control-flag generator, which is the predictive control signal as an index indicative of a certainty of being a video signal subjected to 2-3 pull-down conversion.

9. The video signal processing apparatus according to claim 6, wherein the 2-2 sequence detector includes:

a 2-2 field sequence detector which determines whether or not the interlaced scan video signal satisfies the field sequence condition of a video signal subjected to 2-2 pull-down conversion in accordance with the signal indicative of the strength of the interframe correlation and the signal indicative of the strength of the interfield correlation;

a second occurrence frequency detector which measures an occurrence frequency of a field sequence satisfying the field sequence condition of a video signal subjected to 2-2 pull-down conversion in accordance with the signal indicative of the strength of the interframe correlation and the signal indicative of the strength of the interfield correlation, thereby outputting a predictive control signal based on a result of the measuring of the second occurrence frequency detector; and a second predictive controller which determines whether or not the interlaced scan video signal satisfies the field sequence condition of a video signal subjected to 2-2 pull-down conversion in accordance with an output of the 2-2 field sequence detector and the predictive control signal, thereby outputting a result of the determining of the second predictive controller.

10. The video signal processing apparatus according to claim 9, wherein the second occurrence frequency detector includes:
   a second sequence-determination number-of-times detector which counts number of times of detecting a case where the interlaced scan video signal satisfies the field sequence condition of a video signal subjected to 2-2 pull-down conversion in accordance with the signal indicative of the strength of the interframe correlation and the signal indicative of the strength of the interfield correlation; and
   a second predictive-control-flag generator which compares a result of the detecting of the second sequence-determination number-of-times detector with a predetermined threshold, thereby outputting a result of the comparing of the second predictive-control-flag generator, which is the predictive control signal as an index indicative of a certainty of being a video signal subjected to 2-2 pull-down conversion.

11. The video signal processing apparatus according to claim 6, wherein the pull-down determiner includes:
   a telecine determiner which determines whether the interlaced scan video signal is a video signal subjected to 2-3 pull-down conversion or a video signal subjected to 2-2 pull-down conversion in accordance with an output of the 2-3 sequence detector and an output of the 2-2 sequence detector, thereby generating the telecine detection signal and an identification signal indicative of the pull-down method in telecine conversion in accordance with a result of the determining of the telecine determiner to output the telecine detection signal and the identification signal;
   a phase flag selector which selects a signal indicative of an interpolation phase from an output of the 2-3 sequence detector and an output of the 2-2 sequence detector in accordance with the identification signal from the telecine determiner, thereby outputting the selected signal;
   an interpolation-mixing-ratio converter which calculates a mixing ratio of the interpolation signals in accordance with the signal indicative of the degree of the high frequency components existing in the target field; and
   a mixing ratio switch which generates a mixing ratio signal indicative of a mixing ratio of the interpolation signals in accordance with the mixing ratio calculated by the interpolation-mixing-ratio converter and the identification signal from the telecine determiner, thereby outputting the mixing ratio signal;
   wherein the pull-down determiner outputs the telecine detection signal outputted from the telecine determiner and the mixing ratio signal outputted from the mixing ratio switch.

12. The video signal processing apparatus according to claim 11, wherein the interpolation-mixing-ratio converter includes:
   a nonlinear converter which performs nonlinear conversion of the signal indicative of the degree of the high frequency components existing in the target field; and
      a clip which clips a value obtained by the nonlinear conversion of the nonlinear converter so as to be kept within a predetermined range, thereby calculating the mixing ratio of the interpolation signals.

13. The video signal processing apparatus according to claim 2, wherein the interpolation signal generator includes:
   a motion adaptive interpolation processor which generates a first interpolation signal from the interlaced scan video signal and the video signal delayed by the field delay by using intrafield interpolation of generating an interpolation signal through computation based on the video signal in the interpolation field or by using interfield interpolation of generating an interpolation signal through computation based on the video signal in the field adjacent to the interpolation field, thereby outputting the first interpolation signal;
   a telecine interpolation processor which generates a second interpolation signal from the video signal subjected to telecine conversion in accordance with the video signal of the field prior to the interpolation field by one field or subsequent to the interpolation field by one field, thereby outputting the second interpolation signal; and
   a mixer which mixes the first interpolation signal and the second interpolation signal in accordance with the telecine detection signal outputted from the pull-down sequence detector and the mixing ratio signal, thereby generating the interpolation signal to output the interpolation signal.

14. A video signal processing method of converting an interlaced scan video signal to a progressive scan video system, comprising the steps of:
   delaying the interlaced scan video signal by a period of one or several fields;
   detecting an interframe correlation between a target field of the interlaced scan video signal and a field prior to the target field by one frame, thereby outputting a signal indicative of strength of the interframe correlation between the fields in accordance with a result of the detecting of the interframe correlation;
   detecting an interfield correlation between a target field of the interlaced scan video signal and a field prior to the target field by one field, thereby outputting a signal indicative of strength of the interfield correlation between the fields in accordance with a result of the detecting of the interfield correlation;
   detecting high frequency components in the target field of the interlaced scan video signal, thereby outputting a signal indicative of a degree of the high frequency components in the target field in accordance with a result of the detecting of the high frequency components;
   determining a result of detecting whether or not the interlaced scan video signal satisfies a field sequence condition of a video signal subjected to telecine conversion in accordance with the signal indicative of the strength of the interframe correlation and the signal indicative of the strength of the interfield correlation;
   if the result of the detecting indicates that the interlaced scan video signal is not a video signal subjected to telecine conversion, generating a telecine detection signal in accordance with the result of the detecting, thereby outputting the telecine detection signal; and
   if the result of the detecting indicates that the interlaced scan video signal is a video signal subjected to telecine conversion and the signal indicative of the degree of the high frequency components indicates a value equal to or greater than a predetermined value, outputting a result that the interlaced scan video signal is a video signal subjected to telecine conversion, and if the result of the detecting indicates that the interlaced scan video signal is a video signal subjected to telecine conversion and the signal indicative of the degree of the high frequency components indicates a value less than the predetermined value, outputting the result that the interlaced scan video signal is not a video signal subjected to telecine conversion.

15. A video signal processing method of converting an interlaced scan video signal to a progressive scan video signal, comprising the steps of:

delaying the interlaced scan video signal by a period of one or several fields;

detecting an interframe correlation between a target field of the interlaced scan video signal and a field prior to the target field by one frame, thereby outputting a signal indicative of strength of the interframe correlation between the fields in accordance with a result of the detecting of the interframe correlation;

detecting an interfield correlation between a target field of the interlaced scan video signal and a field prior to the target field by one field, thereby outputting a signal indicative of strength of the interfield correlation between the fields in accordance with a result of the detecting of the interfield correlation;

detecting high frequency components in the target field of the interlaced scan video signal, thereby outputting a signal indicative of a degree of the high frequency components existing in the target field in accordance with a result of the detecting of the high frequency components;

determining a result of detecting whether or not the interlaced scan video signal satisfies a field sequence condition of a video signal subjected to telecine conversion in accordance with the signal indicative of the strength of the interframe correlation and the signal indicative of the strength of the interfield correlation, wherein a first interpolation signal is generated by intrafield interpolation or interfield interpolation, a second interpolation signal is generated by interpolation of a video signal subjected to telecine conversion signal in accordance with the video signal of the field prior to the interpolation field by one field or subsequent to the interpolation field by one field, and a first predetermined value is smaller than a second predetermined value, when the result of the detecting indicates that the interlaced scan video signal is not a video signal subjected to telecine conversion, generating a telecine detection signal in accordance with the result of the detecting, thereby outputting the telecine detection signal;

when the result of the detecting indicates that the interlaced scan video signal is a video signal subjected to telecine conversion, if the signal indicative of the degree of the high frequency components indicates a value equal to or less than the first predetermined value, outputting a result that the interlaced scan video signal is not a video signal subjected to telecine conversion, if the signal indicative of the degree of the high frequency components indicates a value equal to or greater than the second predetermined value, outputting a result that the interlaced scan video signal is a video signal subjected to telecine conversion, if the signal indicative of the degree of the high frequency components indicates a value between the first predetermined value and the second predetermined value, calculating a mixing ratio of the first interpolation signal and the second interpolation signal in accordance with the signal indicative of the degree of the high frequency components, thereby outputting a result of the calculating, wherein the mixing ratio is set so that a ratio of the second interpolation signal increases, as a degree of the high frequency components becomes higher, if the signal indicative of the degree of the high frequency components indicates a value between the first predetermined value and the second predetermined value, mixing the first interpolation signal and the second interpolation signal in accordance with the mixing ratio, thereby generating an interpolation signal to output the interpolation signal.

16. A video signal display apparatus comprising:

a video signal processing apparatus of claim 1;

a display which displays an image; and a display processor which causes the display to display the image based on the progressive scan video signal outputted from the video signal processing apparatus.

* * * * *